US012679024B2

(12) United States Patent
Petros et al.

(10) Patent No.: US 12,679,024 B2
(45) Date of Patent: Jul. 14, 2026

(54) DEVICES, SYSTEMS AND METHODS FOR PRINTING THREE- DIMENSIONAL OBJECTS

(71) Applicant: 3DEO, Inc., Gardena, CA (US)

(72) Inventors: Matthew Petros, Tarzana, CA (US); Payman Torabi, Los Angeles, CA (US)

(73) Assignee: 3DEO, Inc., Torrance, CA (US)

( * ) Notice: Subject to any disclaimer, the term of this patent is extended or adjusted under 35 U.S.C. 154(b) by 866 days.

(21) Appl. No.: 16/983,812

(22) Filed: Aug. 3, 2020

(65) Prior Publication Data

US 2021/0016501 A1    Jan. 21, 2021

Related U.S. Application Data

(63) Continuation of application No. PCT/US2019/016879, filed on Feb. 6, 2019.
(Continued)

(51) Int. Cl.
*B29C 64/182*        (2017.01)
*B29C 64/165*        (2017.01)
(Continued)

(52) U.S. Cl.
CPC .......... *B29C 64/182* (2017.08); *B29C 64/165* (2017.08); *B29C 64/268* (2017.08);
(Continued)

(58) Field of Classification Search
CPC .......... B22F 10/14; B22F 10/16; B22F 10/32; B22F 10/322; B29C 64/25; B29C 64/165;
(Continued)

(56) References Cited

U.S. PATENT DOCUMENTS

| | | | |
|---|---|---|---|
| 4,575,330 | A | 3/1986 | Hull et al. |
| 4,863,538 | A | 9/1989 | Deckard |

(Continued)

FOREIGN PATENT DOCUMENTS

| | | | |
|---|---|---|---|
| AU | 2001239917 A1 | 9/2001 |
| CA | 2400144 A1 | 9/2001 |

(Continued)

OTHER PUBLICATIONS

Cao et al. Freeform fabrication of aluminum parts by direct deposition of molten aluminum. Journal of Materials Processing Technology. vol. 173, Issue 2, Apr. 10, 2006, pp. 209-212.
(Continued)

*Primary Examiner* — Seyed Masoud Malekzadeh
(74) *Attorney, Agent, or Firm* — Perkins Coie LLP

(57) ABSTRACT

The present disclosure provides systems and methods for printing three-dimensional objects. A method for printing a three-dimensional object may comprise alternately and sequentially applying a stream comprising a binding substance to an area of a layer of powder material in a powder bed, and generating at least one perimeter of the three-dimensional object in the area. The stream may be applied in accordance with a model design of the three-dimensional object. The at least one perimeter may generated in accordance with the model design.

20 Claims, 33 Drawing Sheets

Related U.S. Application Data

(60) Provisional application No. 62/627,597, filed on Feb. 7, 2018, provisional application No. 62/627,610, filed on Feb. 7, 2018.

(51) Int. Cl.

| | |
|---|---|
| *B29C 64/268* | (2017.01) |
| *B29C 64/35* | (2017.01) |
| *B29C 64/371* | (2017.01) |
| *B29C 64/393* | (2017.01) |
| *B33Y 10/00* | (2015.01) |
| *B33Y 30/00* | (2015.01) |
| *B33Y 40/20* | (2020.01) |
| *B33Y 50/02* | (2015.01) |

(52) U.S. Cl.
CPC ............ *B29C 64/35* (2017.08); *B29C 64/371* (2017.08); *B29C 64/393* (2017.08); *B33Y 10/00* (2014.12); *B33Y 30/00* (2014.12); *B33Y 40/20* (2020.01); *B33Y 50/02* (2014.12)

(58) Field of Classification Search
CPC ... B29C 64/255; B29C 64/364; B29C 64/371; B29C 64/386; B29C 64/393
See application file for complete search history.

(56) References Cited

U.S. PATENT DOCUMENTS

| | | | |
|---|---|---|---|
| 5,147,587 A | 9/1992 | Marcus et al. | |
| 5,204,055 A | 4/1993 | Sachs et al. | |
| 5,207,371 A | 5/1993 | Prinz et al. | |
| 5,387,380 A * | 2/1995 | Cima | B33Y 10/00 264/109 |
| 5,807,437 A | 9/1998 | Sachs et al. | |
| 5,902,441 A | 5/1999 | Bredt et al. | |
| 6,027,324 A | 2/2000 | Hull | |
| 6,209,420 B1 * | 4/2001 | Butcher | B22F 10/16 419/5 |
| 6,375,874 B1 | 4/2002 | Russell et al. | |
| 6,423,255 B1 | 7/2002 | Hoechsmann et al. | |
| 6,585,930 B2 | 7/2003 | Liu et al. | |
| 6,589,471 B1 | 7/2003 | Khoshnevis | |
| 6,736,249 B2 | 5/2004 | Howell et al. | |
| 6,955,776 B1 | 10/2005 | Feenstra | |
| 7,120,512 B2 | 10/2006 | Kramer et al. | |
| 7,241,415 B2 | 7/2007 | Khoshnevis | |
| 7,329,379 B2 | 2/2008 | Boyd et al. | |
| 7,563,397 B2 | 7/2009 | Schulman et al. | |
| 8,827,681 B2 | 9/2014 | Chen et al. | |
| 8,858,772 B2 | 10/2014 | Crane et al. | |
| 8,905,742 B2 | 12/2014 | Knighton | |
| 9,056,396 B1 | 6/2015 | Linnell | |
| 9,156,204 B2 | 10/2015 | Knighton | |
| 9,182,591 B2 | 11/2015 | Crane et al. | |
| 9,586,315 B2 | 3/2017 | Guerin et al. | |
| 9,643,314 B2 | 5/2017 | Guerin et al. | |
| 9,844,890 B2 | 12/2017 | Hashish et al. | |
| 9,987,682 B2 * | 6/2018 | Torabi | B22F 3/24 |
| 10,396,422 B1 | 8/2019 | Rojas et al. | |
| 10,737,323 B2 | 8/2020 | Torabi et al. | |
| 10,792,731 B2 | 10/2020 | Torabi et al. | |
| 10,807,162 B2 | 10/2020 | Connor et al. | |
| 10,843,415 B1 | 11/2020 | Crane et al. | |
| 11,170,493 B2 | 11/2021 | Crane et al. | |
| 11,478,992 B2 | 10/2022 | Crane et al. | |
| 11,643,366 B2 | 5/2023 | Gardiner et al. | |
| 11,741,594 B2 | 8/2023 | Crane et al. | |
| 12,138,857 B2 * | 11/2024 | Torabi | B29C 64/165 |
| 12,269,781 B2 | 4/2025 | Gardiner et al. | |
| 2001/0045678 A1 * | 11/2001 | Kubo | B29C 64/35 425/375 |
| 2001/0050031 A1 | 12/2001 | Bredt et al. | |
| 2002/0015654 A1 | 2/2002 | Das et al. | |
| 2002/0079601 A1 | 6/2002 | Russell et al. | |
| 2002/0106412 A1 | 8/2002 | Rowe et al. | |
| 2002/0125592 A1 | 9/2002 | Schulman et al. | |
| 2002/0129485 A1 | 9/2002 | Mok et al. | |
| 2003/0062655 A1 | 4/2003 | Lohner et al. | |
| 2004/0003741 A1 * | 1/2004 | Iskra | B22F 12/70 427/372.2 |
| 2004/0004303 A1 | 1/2004 | Iskra | |
| 2004/0169699 A1 * | 9/2004 | Hunter | B29C 64/40 425/375 |
| 2005/0079086 A1 * | 4/2005 | Farr | B33Y 10/00 419/36 |
| 2006/0045787 A1 | 3/2006 | Jandeska et al. | |
| 2006/0093992 A1 | 5/2006 | Wen | |
| 2006/0230984 A1 | 10/2006 | Bredt et al. | |
| 2007/0238056 A1 | 10/2007 | Baumann et al. | |
| 2009/0132088 A1 | 5/2009 | Taitler | |
| 2011/0282482 A1 * | 11/2011 | Knighton | B29C 64/188 700/110 |
| 2013/0055568 A1 | 3/2013 | Dusel et al. | |
| 2014/0147328 A1 | 5/2014 | Abe et al. | |
| 2014/0224152 A1 | 8/2014 | Fukuda et al. | |
| 2014/0241961 A1 | 8/2014 | Maroske et al. | |
| 2014/0322501 A1 | 10/2014 | Ederer et al. | |
| 2015/0069649 A1 | 3/2015 | Bai et al. | |
| 2015/0076739 A1 | 3/2015 | Batchelder | |
| 2015/0079215 A1 | 3/2015 | Knighton | |
| 2015/0135897 A1 | 5/2015 | Sutcliffe et al. | |
| 2015/0158251 A1 * | 6/2015 | Carrouset | B29C 64/153 700/119 |
| 2015/0159007 A1 | 6/2015 | Hirata | |
| 2015/0217367 A1 | 8/2015 | Dickey et al. | |
| 2015/0224575 A1 | 8/2015 | Hirata | |
| 2015/0251247 A1 | 9/2015 | Monsheimer et al. | |
| 2015/0251354 A1 | 9/2015 | Bredt | |
| 2015/0258707 A1 | 9/2015 | Hirata | |
| 2015/0258744 A1 | 9/2015 | Muller et al. | |
| 2015/0266239 A1 | 9/2015 | Okamoto et al. | |
| 2015/0273764 A1 | 10/2015 | Okamoto | |
| 2015/0273766 A1 | 10/2015 | Denda et al. | |
| 2015/0273769 A1 | 10/2015 | Korn | |
| 2015/0298393 A1 | 10/2015 | Suarez | |
| 2015/0306664 A1 | 10/2015 | Klint et al. | |
| 2015/0306822 A1 | 10/2015 | Hirata | |
| 2015/0314530 A1 | 11/2015 | Rogren | |
| 2015/0328680 A1 | 11/2015 | Tuffile et al. | |
| 2015/0343533 A1 | 12/2015 | Park et al. | |
| 2015/0375459 A1 | 12/2015 | Sato et al. | |
| 2016/0001506 A1 | 1/2016 | Hirata et al. | |
| 2016/0009069 A1 | 1/2016 | Mou et al. | |
| 2016/0023375 A1 | 1/2016 | Uram | |
| 2016/0024293 A1 | 1/2016 | Nestle et al. | |
| 2016/0031161 A1 | 2/2016 | Knighton | |
| 2016/0038655 A1 | 2/2016 | Weisman et al. | |
| 2016/0039147 A1 | 2/2016 | Crump et al. | |
| 2016/0052054 A1 | 2/2016 | Orange et al. | |
| 2016/0052166 A1 | 2/2016 | Hartmann | |
| 2016/0059445 A1 | 3/2016 | Tummala et al. | |
| 2016/0067928 A1 | 3/2016 | Mark et al. | |
| 2016/0068696 A1 | 3/2016 | Xu | |
| 2016/0075085 A1 | 3/2016 | Sasaki | |
| 2016/0089720 A1 | 3/2016 | Kamakura et al. | |
| 2016/0101470 A1 | 4/2016 | Kamakura | |
| 2016/0101574 A1 | 4/2016 | Mou et al. | |
| 2016/0107383 A1 | 4/2016 | Dikovsky et al. | |
| 2016/0107385 A1 | 4/2016 | Takahashi et al. | |
| 2016/0107386 A1 | 4/2016 | Hartmann et al. | |
| 2016/0107387 A1 | 4/2016 | Ooba et al. | |
| 2016/0107396 A1 | 4/2016 | Berman | |
| 2016/0114529 A1 | 4/2016 | Nakamura | |
| 2016/0114533 A1 | 4/2016 | Grasegger et al. | |
| 2016/0129643 A1 | 5/2016 | Mark et al. | |
| 2016/0136885 A1 | 5/2016 | Nielsen-Cole et al. | |
| 2016/0136887 A1 | 5/2016 | Guillemette et al. | |
| 2016/0151833 A1 | 6/2016 | Tsao | |
| 2016/0151840 A1 | 6/2016 | Mccoy et al. | |
| 2016/0151975 A1 | 6/2016 | Hara et al. | |
| 2016/0151979 A1 | 6/2016 | Urban et al. | |
| 2016/0157963 A1 | 6/2016 | Abels et al. | |

(56) References Cited

U.S. PATENT DOCUMENTS

| 2016/0332236 | A1 | 11/2016 | Stoyanov | |
| 2016/0368057 | A1 | 12/2016 | Hopkins et al. | |
| 2017/0120335 | A1 | 5/2017 | Demuth et al. | |
| 2017/0136545 | A1* | 5/2017 | Yoshimura | B22F 12/53 |
| 2017/0173879 | A1 | 6/2017 | Myerberg et al. | |
| 2017/0203514 | A1 | 7/2017 | Mccoy et al. | |
| 2017/0341143 | A1 | 11/2017 | Tsumuraya | |
| 2018/0001553 | A1 | 1/2018 | Buller et al. | |
| 2018/0036800 | A1 | 2/2018 | Torabi et al. | |
| 2018/0178290 | A1 | 6/2018 | Urata et al. | |
| 2018/0200795 | A1 | 7/2018 | Morimoto et al. | |
| 2018/0206952 | A1 | 7/2018 | Korten et al. | |
| 2018/0326660 | A1 | 11/2018 | Gifford et al. | |
| 2018/0339337 | A1 | 11/2018 | Torabi et al. | |
| 2018/0345365 | A1 | 12/2018 | Torabi et al. | |
| 2018/0370133 | A1 | 12/2018 | Provencher | |
| 2019/0210294 | A1 | 7/2019 | Hudelson et al. | |
| 2021/0016501 | A1 | 1/2021 | Petros et al. | |
| 2021/0069783 | A1 | 3/2021 | Torabi et al. | |
| 2021/0205886 | A1 | 7/2021 | Torabi et al. | |
| 2022/0055112 | A1 | 2/2022 | Torabi et al. | |
| 2024/0059010 | A1 | 2/2024 | Torabi et al. | |

FOREIGN PATENT DOCUMENTS

| CN | 104191619 | A | 12/2014 |
| CN | 105524195 | A | 4/2016 |
| DE | 69206357 | T2 | 1/1996 |
| EP | 1452298 | A1 | 9/2004 |
| EP | 1764208 | A2 | 3/2007 |
| EP | 4342605 | A2 | 3/2024 |
| JP | H05192767 | A | 8/1993 |
| JP | 2004506097 | A | 2/2004 |
| JP | 2005120475 | A | 5/2005 |
| JP | 2009107352 | A | 5/2009 |
| JP | 2015205485 | A | 11/2015 |
| MX | 431819 | | 1/2026 |
| WO | 2001065134 | A1 | 9/2001 |
| WO | 2004005014 | A2 | 1/2004 |
| WO | 2011084597 | A2 | 7/2011 |
| WO | 2011146244 | A2 | 11/2011 |
| WO | 2013167194 | A1 | 11/2013 |
| WO | 2014093684 | A1 | 6/2014 |
| WO | 2015023729 | A1 | 2/2015 |
| WO | 2015106832 | A1 | 7/2015 |
| WO | 2015162905 | A1 | 10/2015 |
| WO | 2015167530 | A2 | 11/2015 |
| WO | 2015183796 | A1 | 12/2015 |
| WO | 2016009602 | A1 | 1/2016 |
| WO | 2016011098 | A2 | 1/2016 |
| WO | 2015167530 | A3 | 3/2016 |
| WO | 2016043900 | A1 | 3/2016 |
| WO | 2016079192 | A1 | 5/2016 |
| WO | 2016085965 | A1 | 6/2016 |
| WO | 2016103686 | A1 | 6/2016 |
| WO | 2016186609 | A1 | 11/2016 |
| WO | 2018026962 | A1 | 2/2018 |
| WO | 2019028465 | A1 | 2/2019 |
| WO | 2019032224 | A1 | 2/2019 |
| WO | 2019157074 | A2 | 8/2019 |
| WO | 2020086630 | A1 | 4/2020 |

OTHER PUBLICATIONS

Co-pending U.S. Appl. No. 16/998,503, inventors Torabi; Payman et al., filed Aug. 20, 2020.
EP17837633.1 The Extended European Search Report dated Mar. 18, 2020.
GB1712514.7 Examination Search Report dated Jan. 25, 2018.
International Search Report and Written Opinion dated Nov. 15, 2017 for International PCT Patent Application No. PCT/US2017/045173.
Office Action dated Dec. 4, 2017 for U.S. Appl. No. 15/668,618.
PCT/US19/16879 International Search Report dated Apr. 23, 2019.
U.S. Appl. No. 15/668,618 Notice of Allowance dated Mar. 13, 2018.
U.S. Appl. No. 15/966,742 Notice of Allowance dated May 21, 2020.
U.S. Appl. No. 15/966,742 Office Action dated Apr. 1, 2020.
U.S. Appl. No. 15/966,742 Office Action dated Nov. 26, 2019.
U.S. Appl. No. 15/966,746 Notice of Allowance dated Apr. 1, 2020.
U.S. Appl. No. 15/966,746 Office Action dated Nov. 26, 2019.
Co-pending U.S. Appl. No. 17/209,530, inventors Torabi; Payman et al., filed Mar. 23, 2021.
Co-pending U.S. Appl. No. 17/234,374, inventors Torabi; Payman et al., filed Apr. 19, 2021.
PCT/US2019/057502 International Search Report dated Feb. 21, 2020.
Co-pending U.S. Appl. No. 18/309,121, inventors Torabi; Payman et al., filed Apr. 28, 2023.
U.S. Appl. No. 17/209,530 Final Office Action dated Nov. 30, 2022.
U.S. Appl. No. 16/998,503 Office Action dated May 11, 2022.
U.S. Appl. No. 17/209,530 Office Action dated Jun. 7, 2022.
"Examination Search Report", from GB1712514.7 dated Jan. 25, 2018.
"Examiner Requisition", from PCT Application No. PCT/US2017/045173, CA Application No. 3,032,821 dated Oct. 7, 2024, 4 pages.
"Examiner Requisition", Office Action from Canadian Patent Application No. 3,032,821 dated Oct. 10, 2023.
"Extended European Search Report", from European Patent Application No. 17837633.1 dated Mar. 18, 2020.
"Final Office Action", from U.S. Appl. No. 15/966,742 dated Apr. 1, 2020.
"Final Office Action", from U.S. Appl. No. 17/209,530 dated Nov. 30, 2022.
"International Search Report and Written Opinion", from PCT Application No. PCT/US2017/045173 dated Nov. 15, 2017.
"International Search Report and Written Opinion", from PCT Application No. PCT/US2019/016879 dated Apr. 23, 2019.
"International Search Report and Written Opinion", from PCT Application No. PCT/US2019/057502 dated Feb. 21, 2020.
"Non-Final Office Action", from U.S. Appl. No. 15/668,618 dated Dec. 4, 2017.
"Non-Final Office Action", from U.S. Appl. No. 15/966,742 dated Nov. 26, 2019.
"Non-Final Office Action", from U.S. Appl. No. 15/966,746 dated Nov. 26, 2019.
"Non-Final Office Action", from U.S. Appl. No. 16/983,812 dated Sep. 27, 2023.
"Non-Final Office Action", from U.S. Appl. No. 16/998,503 dated May 11, 2022.
"Non-Final Office Action", from U.S. Appl. No. 17/209,530 dated Jun. 7, 2022.
"Notice of Allowance", from U.S. Appl. No. 15/668,618 dated Mar. 13, 2018.
"Notice of Allowance", from U.S. Appl. No. 15/966,742 dated May 21, 2020.
"Notice of Allowance", from U.S. Appl. No. 15/966,746 dated Apr. 1, 2020.
"Notice of Allowance", from U.S. Appl. No. 18/309,121 dated Jul. 2, 2024.
Cao, et al., "Freeform Fabrication of Aluminum Parts by Direct Deposition of Molten Aluminum", Journal of Materials Processing Technology, Apr. 10, 2006, 173(2):209-212.
Yang, et al., "New laser machining technology of of Al2O3 ceramic with complex shape", Ceramics International vol. 38 Issue 5., 2012, 3643-3648.

* cited by examiner

DEVICES, SYSTEMS AND METHODS FOR PRINTING THREE- DIMENSIONAL OBJECTS

CROSS-REFERENCE

This application is a continuation of PCT Application No. PCT/US2019/016879, filed Feb. 6, 2019, which claims priority to U.S. Provisional Patent Application No. 62/627, 597 filed Feb. 7, 2018 and U.S. Provisional Patent Application No. 62/627,610 filed Feb. 7, 2018, each of which is entirely incorporated herein by reference.

STATEMENT REGARDING FEDERALLY SPONSORED RESEARCH

This invention was made with government support under grant no. 1646942 awarded by the National Science Foundation. The government has certain rights in the invention.

BACKGROUND

Three-dimensional printing (3D printing) is a process for making three-dimensional objects of various shapes. The three-dimensional objects may be formed based on a model design, where the model design is formed via a computer, a drawing, or another object.

Different materials may be used in three-dimensional printing, including metals, metal alloys, polymers, paper, and ceramics. Three-dimensional printing may efficiently form objects in may be difficult to make via traditional methods. Layers of a material may be laid adjacent to one another until the entire three-dimensional object is formed in accordance to the model design.

SUMMARY

In an aspect, the present disclosure provides a method for simultaneously printing a plurality of three-dimensional (3D) objects, comprising: (a) providing a powder bed comprising powder material, and applying a first binding substance to a first area of a first layer of powder material of the powder bed; (b) using a first set of perimeter generators of a plurality of perimeter generators to generate a plurality of perimeters in the first layer, wherein each of the plurality of perimeters of the first layer is in accordance with a model design of each of the plurality of three-dimensional objects in computer memory; (c) depositing a second layer of powder material adjacent to the first layer, and applying a second binding substance to a second area of the second layer of powder material of the powder bed; (d) using a second set of perimeter generators of the plurality of perimeter generators to generate a plurality of perimeters in the second layer of powder material, wherein the plurality of perimeters of the second layer is in accordance with the model design of each of the plurality of three-dimensional objects, thereby simultaneously generating at least a portion of each of the plurality of three-dimensional objects.

In some embodiments, the first set of perimeter generators and the second set of perimeter generators are the same. In some embodiments, the first set of perimeter generators and the second set of perimeter generators are different. In some embodiments, the first set of perimeter generators or the second set of perimeter generators includes contact cutters. In some embodiments, the first set of perimeter generators or the second set of perimeter generators includes non-contact cutters.

In some embodiments, the method further comprises repeating (c)-(d) one or more times to generate the plurality of three-dimensional objects. In some embodiments, the plurality of 3D objects are generated in a time period that is less than or equal to about 24 hours. In some embodiments, the plurality of 3D objects are generated in time period that is less than or equal about 4 hours.

In some embodiments, the plurality of three-dimensional objects have different shapes or sizes. In some embodiments, the plurality of three-dimensional objects have the same shapes or sizes.

In another aspect, the present disclosure provides a system for simultaneously printing a plurality of three-dimensional (3D) objects, comprising: a container configured to contain a powder bed comprising powder material; a binder application unit configured to apply a first binding substance and a second binding substance; a powder application unit configured to supply powder material to the powder bed; a plurality of perimeter generators; and one or more computer processors operatively coupled to the binder application unit, the powder application unit and the plurality of perimeter generators, wherein the one or more computer processors are individually or collectively programmed to (i) direct the binder application unit to apply the first binding substance to a first area of a first layer of powder material of the powder bed, (ii) direct a first set of perimeter generators of the plurality of perimeter generators to generate a plurality of perimeters in the first layer, wherein each of the plurality of perimeters of the first layer is in accordance with a model design of each of the plurality of three-dimensional objects in computer memory, (iii) direct the powder application unit to supply the powder material to provide deposit a second layer of powder material adjacent to the first layer, (iv) direct the binder application unit to apply the second binding substance to a second area of the second layer of powder material of the powder bed, and (v) direct a second set of perimeter generators of the plurality of perimeter generators to generate a plurality of perimeters in the second layer of powder material, wherein the plurality of perimeters of the second layer is in accordance with the model design of each of the plurality of three-dimensional objects, thereby simultaneously generating at least a portion of each of the plurality of three-dimensional objects.

In some embodiments, the first set of perimeter generators and the second set of perimeter generators are the same. In some embodiments, the first set of perimeter generators and the second set of perimeter generators are different. In some embodiments, the first set of perimeter generators or the second set of perimeter generators includes contact cutters. In some embodiments, the first set of perimeter generators or the second set of perimeter generators includes non-contact cutters.

In some embodiments, the system further comprises a spreader that is configured to spread the powder material subsequent to supply of the powder material by the powder application unit. In some embodiments, the system further comprises a multi-axis machine unit.

In another aspect, the disclosure provides a system for printing a plurality of three-dimensional (3D) objects, comprising: a first enclosure comprising a plurality of three-dimensional printing systems, wherein the first enclosure is within a second enclosure, and wherein a printing system of the plurality of three-dimensional printing systems comprises: a container configured to hold a powder bed comprising powder material; at least one perimeter generator configured to generate one or more perimeters in the powder bed, which one or more perimeters correspond to a three-dimensional object of the plurality of three-dimensional objects; a binder application unit, wherein the binder application unit is configured to apply a binding substance to an area of a layer of powder material in the powder bed; and an environmental control unit in fluid communication with the first enclosure, wherein the environmental control unit is configured to regulate an environmental in the first enclosure.

In some embodiments, the system further comprises one or more computer processors operatively coupled to the binding substance applicator and the at least one perimeter generator.

In some embodiments, the at least one perimeter generator is a plurality of perimeter generators.

In some embodiments, the system further comprises one or more computer processors that are individually or collectively programmed to (a) direct the binding substance application unit to apply a stream comprising the binding substance to the area of the layer of powder material in the powder bed, wherein the stream is applied in accordance with a model design of the three-dimensional object, and (b) direct the at least one perimeter generator to generate the at least one perimeter of the three-dimensional object in the area, wherein the at least one perimeter is in accordance with the model design.

In some embodiments, the system further comprises an energy source that is configured to provide an energy beam directed to at most a portion of the layer of powder material.

In some embodiments, the one or more computer processors are individually or collectively programmed to (a) direct the binding substance applicator to apply a stream comprising the binding substance to an area of a layer of powder material in the powder bed, wherein the stream is applied in accordance with a model design of the three-dimensional object, and (b) direct the energy source to provide the energy beam directed to at most a portion of the layer of powder material, wherein the energy beam is directed in accordance with the model design of the three-dimensional object, wherein the stream has a first cross-sectional dimension and the energy beam has a second cross-sectional dimension, wherein the first cross-sectional dimension is greater than the second cross-sectional dimensional.

In some embodiments, the energy source comprises at least one laser.

In some embodiments, the system further comprises a feedback control unit for regulating a level of binder in the binder application unit.

In some embodiments, the environmental control unit is configured to regulate humidity in the enclosure. In some embodiments, the environmental control unit is configured to regulate temperature in the enclosure. In some embodiments, the environmental control unit is configured to regulate the oxygen level in the enclosure. In some embodiments, the environmental control unit further comprises a control panel.

In some embodiments, the system further comprises a cleaning unit configured to remove powder material from the plurality of three-dimensional objects subsequent to printing. In some embodiments, the cleaning unit is external to the first enclosure and within the second enclosure.

In some embodiments, the system further comprises a powder dispenser configured to dispense the powder material. In some embodiments, the system further comprises a roller configured to remove excess powder material from the powder bed and/or smooth a top surface of the powder bed. In some embodiments, the at least one perimeter generator is a multi-axis machine unit.

In another aspect, the present disclosure proves a method for generating a three-dimensional object, comprising: (a) providing a computer model of the (3D) object, wherein the computer model identifies a largest dimension of the 3D object; (b) providing a powder bed comprising powder material; (c) applying a binding substance to the powder bed; (d) using a perimeter generator to generate a perimeter in a layer of the powder bed, wherein the perimeter corresponds to the largest dimension of the 3D object in the powder bed of (b); and (e) depositing powder over the layer of the powder bed.

In some embodiments, the system further comprises using the perimeter generator to generate an additional perimeter in the powder bed. The additional perimeter corresponds to a dimension of the 3D object that is less than the largest dimension.

In some embodiments, the perimeter generator comprises a contact cutter. In some embodiments, the perimeter generator comprises a non-contact cutter. In some embodiments, the non-contact cutter comprises a laser source.

In some embodiments, in (c), the binder is applied to a first area of the powder bed, and, in (d), the perimeter generator is used to generate the perimeter in a second area of the powder bed, wherein the first area is greater than the second area.

In some embodiments, the method further comprises, in (d), generating an additional perimeter in the layer, where the additional perimeter is at least partially encompassed by the first perimeter.

In another aspect, the present disclosure provides a system for simultaneously printing a plurality of three-dimensional (3D) object, comprising: a container configured to contain a powder bed comprising powder material; a binder application unit configured to apply a binding substance to the powder bed; at least one perimeter generator; a powder application unit configured to supply powder material over the powder bed; and one or more computer processors operatively coupled to the binder application unit, the powder application unit and the at least one perimeter generator, wherein the one or more computer processors are individually or collectively programmed to (i) direct the binder application unit to apply the binding substance to the powder bed, (ii) direct the at least one perimeter generator to generate a perimeter in the layer of the powder bed, wherein the perimeter corresponds to a largest dimension of the 3D object identified in a computer model of the 3D object, (iii) direct the powder application unit to supply the powder material over the layer of the powder bed.

In some embodiments, the at least one perimeter generator is configured to generate an additional perimeter in the powder bed, wherein the additional perimeter corresponds to a dimension of the 3D object that is less than the largest dimension.

In some embodiments, the at least one perimeter generator comprises a contact cutter.

In some embodiments, the at least one perimeter generator comprises a non-contact cutter. In some embodiments, the non-contact cutter is a laser source.

In some embodiments, the binder application unit is configured to apply the binding substance to a first area of the powder bed, and wherein the at least one perimeter generator is configured to generate the perimeter in a second area of the powder bed, wherein the first area is greater than the second area.

In some embodiments, the at least one perimeter generator is configured to generate an additional perimeter in the layer, wherein the additional perimeter is at least partially encompassed by the first perimeter. In some embodiments, the at least one perimeter generator is a multi-axis machine unit.

In some embodiments, the system further comprises a roller configured to remove excess powder material from the powder bed and/or smooth a top surface of the powder bed.

In an aspect, the present disclosure provides a method for forming a three-dimensional object, comprising: (a) providing a surface comprising a powder bed comprising powder material; (b) applying a first binding substance to a first area of a first layer of powder material of the powder bed; (c) heating a first subsection of the first area, wherein the first subsection is generated from a model design of the three-dimensional object; (d) depositing a second layer of powder material adjacent to the first layer of powder material in the container; (e) applying a second binding substance to a second area of the second layer of powder material; and (f) heating a second subsection of the second area, wherein the second subsection is generated from the model design of the three-dimensional object. In some embodiments, at least a portion of the second layer binds to the first layer. In some embodiments, the method further comprises repeating (d)-(f) at least 10 times. In some embodiments, the method further comprises repeating (d)-(f) at least 100 times. In some embodiments, the method further comprises repeating (d)-(f) at least 200 times. In some embodiments, the method further comprises a first curing of the three-dimensional object at a temperature of at least 70° C. for at least 10 minutes.

In some embodiments, the method further comprises a first curing of the three-dimensional object at a temperature of at least 250° C. for at least 10 minutes. In some embodiments, the powder material comprises a polymer, a metal, a metal alloy, a ceramic, or any combination thereof in some embodiments, the powder material comprises stainless steel powder, bronze powder, bronze alloy powder, gold powder, or any combination thereof. In some embodiments the powder material comprises particles of 0.2 micrometers to 100 micrometers in size. In some embodiments, the powder material comprises particles of 0.5 micrometers to 2 micrometers in size. In some embodiments, the first layer of powder material has a thickness of at least 0.1 millimeters. In some embodiments, the first layer of powder material has a thickness of at least 0.2 millimeters. In some embodiments, the first layer of powder material has a thickness of 0.1 millimeters to 100 millimeters.

In some embodiments, the method further comprises dispersing unbounded powder material from bounded powder material formed from the powder bed. In some embodiments, the dispersing is via removal of unbounded powder material from the container. In some embodiments, the method further comprises a second curing of the three-dimensional object at a temperature of at least 500° C. for at least 5 minutes. In some embodiments, the second curing is at a temperature of at least 1000° C. for at least 5 minutes. In some embodiments, the second curing is at a temperature of at least 1000° C. for at least 24 hours. In some embodiments, the second curing comprises infusion of a metal or metal alloy. In some embodiments, the second curing comprises infusion of a bronze powder, a bronze alloy, a gold powder, or any combination thereof.

In some embodiments, the first binding substance and the second binding substance are the same binding substance. In some embodiments, the binding substance is a liquid. In some embodiments, the binding substance has a viscosity of less than 500 centipoise (cP). In some embodiments, the heating of the first subsection of the first area is with the aid of a source of electromagnetic radiation or a resistive heating element. In some embodiments, the source of electromagnetic radiation is at least one laser. In some embodiments, the first subsection of the first area is less than 99% of the first area. In some embodiments, the first subsection of the first area is less than 90% of the first area. In some embodiments, the applying of the binding substance is via an inkjet head, an atomizing sprayer, or a nebulizer. In some embodiments, the inkjet head, atomizing spray nozzle, or nebulizer has a greatest orifice dimension of 10 to 1000 microns in size. In some embodiments, the inkjet head, sprayer, or nebulizer has a greatest orifice dimension of 10 to 500 microns in size. In some embodiments, the binding substance has a droplet size of 0.1 micrometers to 100 micrometers when applied to the first area of the first layer of powder material. In some embodiments, the binding substance has a droplet size of 1 micrometer to 10 micrometers when applied to the first area of the first layer of powder material.

In some embodiments, the three-dimensional object is formed in a time period of less than 1 week. In some embodiments, the three-dimensional object is formed in a time period of less than 3 days. In some embodiments, the three-dimensional object is formed in a time period of less than 36 hours. In some embodiments, the three-dimensional object has dimensions of less than 10 m by 10 m by 10 m. In some embodiments, the three-dimensional object has dimensions of less than 1 m by 1 m by 1 m. In some embodiments, the three-dimensional object has dimensions of less than 0.5 m by 0.5 m by 0.5 m. In some embodiments, the model design comprises at least 10 parallel cross-sections of the three-dimensional object. In some embodiments, the model design comprises at least 100 parallel cross-sections of the three-dimensional object. In some embodiments, wherein upon applying the second binding substance to the second area, the second binding substrate extends through the second layer to the first layer. In some embodiments, the heating in (c) or (f) comprises sintering individual particles of the powder material. In some embodiments, the d heating in (c) or (f) is in the absence of sintering individual particles of the powder material. In some embodiments, wherein in (b), the first binding substrate is applied to at most the first area. In some embodiments, wherein in (e), the second binding substrate is applied to at most the second area.

In another aspect, the present disclosure provides a method for forming a three-dimensional object, comprising: (a) providing a surface comprising a powder bed comprising powder material; (b) applying a first binding substance to a first area of a first layer of powder material of the powder bed, wherein upon application of the first binding substance, a first perimeter of the first area deviates from at least a corresponding portion of the model design of the three-dimensional object; (c) heating a first subsection of the first area of the first layer of powder material; (d) depositing a second layer of powder material adjacent to the first layer of powder material in the container; (e) applying a second binding substance to a second area of the second layer of powder material, wherein upon application of the second binding substance, a second perimeter of the second area deviates from at least a corresponding portion of the model design of the three-dimensional object; and (f) heating a second subsection of the second area of the second layer of powder material.

In some embodiments, the first area is larger than the model design of the first layer of the three-dimensional object. In some embodiments, the first area is at least 1% larger than the model design of the first layer of the three-dimensional object. In some embodiments, the first area is at least 20% larger than the model design of the first layer of the three-dimensional object. In some embodiments, a portion of the second layer binds to the first layer. In some embodiments, the method further comprises repeating (e)-(g) at least 10 times. In some embodiments, the method further comprises repeating (e)-(g) at least 100 times. In some embodiments, the method further comprises a first curing of the three-dimensional object at a temperature of at least 70° C. for at least 10 minutes. In some embodiments, the method further comprises a first curing of the three-dimensional object at a temperature of at least 250° C. for at least 20 minutes.

In some embodiments, the powder material comprises a polymer, a metal, a metal alloy, a ceramic, or a combination thereof. In some embodiments, the powder material comprises particles of 0.2 micrometers to 100 micrometers in size. In some embodiments, the powder material comprises particles of 0.5 to 2 micrometers in size. In some embodiments, the first layer of powder material has a thickness of less than 10 mm. In some embodiments, the first layer of powder material has a thickness of less than 1 mm. In some embodiments, the method further comprises dispersing unbounded powder material from bounded powder material. In some embodiments, the dispersing is via removal of unbounded powder material from the container. In some embodiments, the method further comprises a second curing of the three-dimensional object at a temperature of at least 500° C. for at least 5 minutes. In some embodiments, the method further comprises a second curing of the three-dimensional object at a temperature of at least 1000° C. for at least 12 hours. In some embodiments, the second curing comprises infusion of a metal or metal alloy.

In some embodiments, the first binding substance and the second binding substance are the same binding substance. In some embodiments, the binding substance is a liquid. In some embodiments, the binding substance has a viscosity of less than 100 cP. In some embodiments, the heating of the first subsection of the first area is with the aid of a source of electromagnetic radiation or a resistive heating element. In some embodiments, the source of electromagnetic radiation is at least one laser. In some embodiments, the first subsection of the first area is less than the first area. In some embodiments, the first subsection of the first area is less than 99% of the first area. In some embodiments, the first subsection of the first area is less than 90% of the first area.

In some embodiments, the applying of the binding substance is via an inkjet head, an atomizing sprayer, or a nebulizer. In some embodiments, the inkjet head, sprayer, or nebulizer has a greatest orifice dimension of 5 to 1000 micrometers in size. In some embodiments, the inkjet head, sprayer, or nebulizer has a greatest orifice dimension of 10 to 500 micrometers in size. In some embodiments, the three-dimensional object is formed in a time period of less than 1 week. In some embodiments, the three-dimensional object is formed in a time period of less than 3 days. In some embodiments, the three-dimensional object is formed in a time period of less than 36 hours. In some embodiments, the three-dimensional object has dimensions of less than 1 m by 1 m by 1 m. In some embodiments, the model design comprises at least 10 parallel cross-sections of the three-dimensional object. In some embodiments, the model design comprises at least 100 parallel cross-sections of the three-dimensional object. In some embodiments, the first perimeter of the first area deviates from a corresponding portion of the model design of the three-dimensional object.

In yet another aspect, the present disclosure provides a method for forming a three-dimensional object, comprising alternately and sequentially (a) applying a stream comprising a binding substance to an area of a layer of powder material in a powder bed, wherein the stream is applied in accordance with a model design of the three-dimensional object, and (b) directing an energy beam to at most a portion of the layer of powder material, wherein the energy beam is directed in accordance with the model design of the three-dimensional object, wherein the stream has a first cross-sectional dimension and the energy beam has a second cross-sectional dimension, wherein first cross-sectional dimensional is greater than the second cross-sectional dimensional. In some embodiments, the stream comprises aerosol particles. In some embodiments, the stream is a liquid stream.

In another aspect, the present disclosure provides a method for forming a three-dimensional object, comprising alternately and sequentially (a) applying a stream comprising a binding substance to an area of a layer of powder material in a powder bed, wherein the stream is applied in accordance with a model design of the three-dimensional object, and (b) generating at least one perimeter of the three-dimensional object in the area, wherein the at least one perimeter is generated in accordance with the model design. In some embodiments, the at least one perimeter is generated mechanically. In some embodiments, the at least one perimeter is generated using an air knife. In some embodiments, the at least one perimeter is generated using a knife. In some embodiments, the at least one perimeter is generated upon heating at least a portion of the area. In some embodiments, the at least one perimeter is generated upon heating a portion but not all of the area.

In some embodiments, the at least one perimeter is generated using a laser. In some embodiments, the at least one perimeter is generated using a contact cutter. In some embodiments, the at least one perimeter is generated using a non-contact cutter.

In another aspect, the present disclosure provides a method for forming a three-dimensional object, comprising: providing a surface comprising a powder bed comprising powder material; applying a first binding substance to a first area of a first layer of powder material of the powder bed; using a first cutter to generate one or more perimeters of the first layer of powder material, wherein the one or more perimeters of the first layer is in accordance to a model design of the three-dimensional object; depositing a second layer of powder material adjacent to the first layer of powder material in the container; applying a second binding substance to a second area of a second layer of powder material of the powder bed; using a second cutter to generate one or more perimeters of the second layer of powder material, wherein the one or more perimeters of the second layer is in accordance to the model design of the three-dimensional object.

In some embodiments, the cutting comprises two or more cutting passes. In some embodiments, the cutting comprises three or more cutting passes. In some embodiments, at least a portion of the first perimeter of the first layer is generated by one cutting pass. In some embodiments, at least a portion of the first perimeter of the first layer is generated by two cutting passes. In some embodiments, the generating of one or more perimeters of a layer is made via a multi-axis (e.g., 2, 3, 4, or 5-axis) machine tool. In some embodiments, the first cutter is a contact cutter. In some embodiments, the contact cutter is a knife. In some embodiments, the first cutter is a non-contact cutter. In some embodiments, the non-contact cutter is a laser. In some embodiments, the second cutter is the first cutter.

In another aspect, the present disclosure provides a method for forming a three-dimensional object, comprising: providing a surface comprising a powder bed comprising powder material; applying a first binding substance to a first area of a first layer of powder material of the powder bed; depositing a second layer of powder material adjacent to the first layer of powder material in the container; applying a second binding substance to a second area of a second layer of powder material of the powder bed; and using a cutter to generate one or more perimeters of the first layer and the second layer of powder material, wherein the one or more perimeters of the first layer and the second layer is in accordance to a model design of the three-dimensional object. In some embodiments, the generating one or more perimeters of the first layer and the second layer of powder material is via one (or single) pass. In some embodiments, the generation of one or more perimeters of the first layer and the second layer of powder material is via two or more passes. In some embodiments, the generating of one or more perimeters of a layer is made via a multi-axis (e.g., 5-axis) machine tool, a Computer Numeric Control (CNC) spindle, a cutting tool bit, or a blade.

In some embodiments, the generating of one or more perimeters of a layer is made via a multi-axis (e.g., 2, 3, 4, or 5-axis) machine tool. In some embodiments, the first binding substance is a liquid. In some embodiments, the first binding substance has a droplet size of 0.1 micrometers to 100 micrometers when applied to the first area of the first layer of powder material. In some embodiments, the method further comprises heating the first area of the first layer of powder material. In some embodiments, the heating occurs at least 0.1 second after the applying of the first substance to the first area of the first layer of powder material.

In yet another aspect, the current disclosure provides a method for forming a three-dimensional object, comprising: providing a surface comprising a powder bed comprising powder material; applying a first binding substance to a first area of a first layer of powder material of the powder bed; depositing a second layer of powder material adjacent to the first layer of powder material in the container; applying a second binding substance to a second area of a second layer of powder material of the powder bed; and using at least one cutter to generate one or more perimeters of the first layer and the second layer of powder material, wherein the perimeter of the first layer is in accordance with and deviates from a model design of the first layer of the three-dimensional object. In some embodiments, the perimeter of the first layer of powder material is half a layer shifted from the design of the first layer of the three-dimensional object. In some embodiments, the first binding substance has a penetration depth into the powder material, and a cutting depth of the first powder layer is not equivalent to a penetration depth of the binding substance into the first layer of powder material.

In an aspect, the present disclosure provides a system for forming a three-dimensional object, comprising: a powder dispenser that (i) dispenses a powder material to form a first layer of the powder material as part of a powder bed, and (ii) dispenses the powder material to form a second layer of the powder material adjacent to the first layer; and at least one cutter that generates one or more perimeters of the first layer of powder material, wherein the perimeter of the first layer is in accordance with and deviates from a model design of the first layer of the three-dimensional object. In some embodiments, the perimeter of the first layer of powder material is half a layer shifted from the design of the first layer of the three-dimensional object. In some embodiments, a cutting depth of a powder layer is equivalent to a penetration depth of a binding substance.

In yet another aspect, the present disclosure provides a method for forming a three-dimensional object, comprising: providing a model design of the three-dimensional object in computer memory; transforming the model design to include (i) one or more layers each with a layer thickness (L) and (ii) one or more perimeters each with a thickness (P), wherein each of the one or more layers corresponds to a defined layer of powder material, and wherein each of the one or more perimeters corresponds to an individual perimeter separately defined in a given layer of the one or more layers, thereby providing a transformed model design in computer memory; and using the transformed model design to generate instructions usable for generating the three-dimensional object, which instructions provide for generation of the one or more layers independently from generation of the one or more perimeters. In some embodiments, the method further comprises using the instructions to generate the three-dimensional object. In some embodiments, $L=n*P$, wherein 'n' is a number greater than 1. In some embodiments, $P=n*L$, wherein 'n' is a number greater than 1. In some embodiments, a cutting depth of a powder layer is equivalent to a penetration depth of a binding substance.

In one aspect, the present disclosure provides a computing system for controlling an apparatus of forming a three-dimensional object, comprising a computer processor, computer memory and computer code executable by the computer processor to perform operations comprising: transforming a model design of the three-dimensional object into (i) a plurality of layers each with a layer thickness (L) and (ii) a plurality of perimeters each with a thickness (P), wherein each of the plurality of layers corresponds to a defined layer of powder material, and wherein each of the plurality of perimeters corresponds to an individual perimeter in a given layer of the plurality of layers defined separately from the plurality of perimeters, thereby providing a transformed model design in computer memory; and creating machine instructions for controlling the apparatus to generate the three-dimensional object based on the transformed model design. In some embodiments, the operations comprise determining a total cutting depth for a layer equal to a penetration depth. In some embodiments, the total cutting depth is not equal to a layer thickness. In some embodiments, the penetration depth is equal to a height of a layer. In some embodiments, the operations comprise determining a configuration for cutting a layer.

In some embodiments, determining the configuration comprises evaluating a shape and a size of a first layer of the plurality of layers. In some embodiments, determining the configuration comprises evaluating a shape and a size of a second layer of the plurality of layers. In some embodiments, determining the configuration comprises evaluating a cutting path, the cutting path overlapping with a first cutting path in the first layer and a second cutting path in the second layer. In some embodiments, determining the configuration comprises evaluating a cut away area. In some embodiments, evaluating the cut away area is based at least in part on a boundary offset area, a current layer area, an original layer area, an area of the first layer, and an area of the second layer. In some embodiments, the operations comprise determining a geometric compensation of the plurality of layers.

In some embodiments, determining the geometric compensation comprises using a statistical scaling algorithm. In some embodiments, determining the geometric compensation comprises using a machine learning algorithm.

In one aspect, the present disclosure provides a non-transitory computer-readable medium comprising machine-executable code that, upon execution by one or more processors, implements operations for controlling an apparatus of forming a three-dimensional object, the operations comprising: transforming a model design of the three-dimensional object into (i) a plurality of layers each with a layer thickness (L) and (ii) a plurality of perimeters each with a thickness (P), wherein each of the plurality of layers corresponds to a defined layer of powder material, and wherein each of the plurality of perimeters corresponds to an individual perimeter in a given layer of the plurality of layers defined separately from the plurality of perimeters, thereby providing a transformed model design in computer memory; and creating machine instructions for controlling the apparatus to generate the three-dimensional object based on the transformed model design. In some embodiments, the operations comprise determining a total cutting depth for a layer equal to a penetration depth. In some embodiments, the total cutting depth is not equal to a layer thickness. In some embodiments, the penetration depth is equal to a height of a layer. In some embodiments, the operations comprise determining configuration of cutting a layer.

In some embodiments, determining the configuration comprises evaluating a shape and a size of a first layer of the plurality of layers. In some embodiments, determining the configuration comprises evaluating a shape and a size of a second layer of the plurality of layers. In some embodiments, determining the configuration comprises evaluating a cutting path, the cutting path overlapping with a first cutting path in the first layer and a second cutting path in the second layer. In some embodiments, determining configuration comprises evaluating a cut away area. In some embodiments, evaluating the cut away area is based on a boundary offset area, a current layer area, an original layer area, an area of the previous layer, and an area of the next layer. In some embodiments, the operations comprise determining a geometric compensation of the plurality of layers. In some embodiments, determining the geometric compensation comprises using a statistical scaling algorithm. In some embodiments, determining the geometric compensation comprises using a machine learning algorithm.

In an aspect, the present disclosure provides a method for forming a three-dimensional object, comprising: (a) providing a powder bed comprising powder material; (b) applying a first binding substance to a first area of a first layer of powder material of the powder bed; (c) heating a first subsection of the first area, wherein the first subsection is from a model design of the three-dimensional object; (d) depositing a second layer of powder material adjacent to the first layer; (e) applying a second binding substance to a second area of the second layer of powder material; and (f) heating a second subsection of the second area, wherein the second subsection is from the model design of the three-dimensional object. In some embodiments, at least a portion of the second layer binds to the first layer. In some embodiments, the method further comprises repeating (d)-(f) at least 10 times. In some embodiments, the method further comprises performing a first curing of the three-dimensional object at a temperature of at least 70° C. for at least 10 minutes. In some embodiments, the method further comprises performing a second curing of the three-dimensional object at a temperature of at least 500° C. for at least 5 minutes. In some embodiments, the second curing is performed at a temperature of at least 1000° C. for at least 5 minutes.

In some embodiments, the powder material comprises a polymer, a metal, a metal alloy, a ceramic, or any combination thereof. In some embodiments, the powder material comprises stainless steel powder, bronze powder, bronze alloy powder, gold powder, or any combination thereof. In some embodiments, the powder material comprises particles of 0.5 micrometers to 2 micrometers in size. In some embodiments, the first layer has a thickness of at least 0.1 millimeters. In some embodiments, the method further comprises dispersing unbounded powder material from bounded powder material formed from the powder bed. In some embodiments, the dispersing is via removal of unbounded powder material from a container containing the powder bed. In some embodiments, the first binding substance and the second binding substance are the same binding substance. In some embodiments, the binding substance is a liquid. In some embodiments, the heating of the first subsection of the first area is with the aid of a source of electromagnetic radiation or a resistive heating element. In some embodiments, the source of electromagnetic radiation is at least one laser. In some embodiments, the first subsection of the first area is less than 99% of the first area. In some embodiments, the applying of the first binding substance is via an inkjet head, an atomizing sprayer, or a nebulizer. In some embodiments, the first binding substance has a droplet size of 0.1 micrometers to 100 micrometers when applied to the first area of the first layer. In some embodiments, the first binding substance has a droplet size of 1 micrometer to 10 micrometers when applied to the first area of the first layer.

In some embodiments, the model design comprises at least 10 parallel cross-sections of the three-dimensional object. In some embodiments, wherein upon applying the second binding substance to the second area, the second binding substrate extends through the second layer to the first layer. In some embodiments, the heating in (c) or (f) comprises sintering individual particles of the powder material. In some embodiments, the heating in (c) or (f) is in the absence of sintering individual particles of the powder material. In some embodiments, wherein in (b), the first binding substrate is applied to at most the first area.

In an aspect, the present disclosure provides a method for forming a three-dimensional object, comprising: (a) providing a powder bed comprising powder material; (b) applying a first binding substance to a first area of a first layer of powder material of the powder bed, wherein upon application of the first binding substance, a first perimeter of the first area deviates from at least a corresponding portion of a model design of the three-dimensional object; (c) heating a first subsection of the first area of the first layer; (d) depositing a second layer of powder material adjacent to the first layer; (e) applying a second binding substance to a second area of the second layer of powder material, wherein upon application of the second binding substance, a second perimeter of the second area deviates from at least a corresponding portion of the model design of the three-dimensional object; and (f) heating a second subsection of the second area of the second layer of powder material. In some embodiments, the first area is at least 1% larger than the model design of the first layer of the three-dimensional object. In some embodiments, a portion of the second layer binds to the first layer. In some embodiments, the method further comprises repeating (d)-(f) at least 10 times. In some embodiments, the method further comprises performing a first curing of the three-dimensional object at a temperature of at least 70° C. for at least 10 minutes, and in some cases performing a second curing of the three-dimensional object at a temperature of at least 500° C. for at least 5 minutes. In some embodiments, the powder material comprises a polymer, a metal, a metal alloy, a ceramic, or a combination thereof. In some embodiments, the powder material comprises particles of 0.2 micrometers to 100 micrometers in size. In some embodiments, the first layer has a thickness of less than 10 mm. In some embodiments, the first binding substance and the second binding substance are the same binding substance.

In some embodiments, the heating of the first subsection of the first area is with the aid of a source of electromagnetic radiation or a resistive heating element. In some embodiments, the first subsection of the first area is less than the first area. In some embodiments, the first subsection of the first area is less than 99% of the first area. In some embodiments, the applying of the binding substance is via an inkjet head, an atomizing sprayer, or a nebulizer. In some embodiments, the inkjet head, sprayer, or nebulizer has a greatest orifice dimension of 5 to 1000 micrometers in size. In some embodiments, the model design comprises at least 10 parallel cross-sections of the three-dimensional object.

In an aspect, the present disclosure provides a method for forming a three-dimensional object, comprising alternately and sequentially (a) applying a stream comprising a binding substance to an area of a layer of powder material in a powder bed, wherein the stream is applied in accordance with a model design of the three-dimensional object, and (b) directing an energy beam to at most a portion of the layer of powder material, wherein the energy beam is directed in accordance with the model design of the three-dimensional object, wherein the stream has a first cross-sectional dimension and the energy beam has a second cross-sectional dimension, wherein the first cross-sectional dimensional is greater than the second cross-sectional dimensional. In some embodiments, the stream comprises aerosol particles. In some embodiments, the stream is a liquid stream. In some embodiments, the first cross-sectional dimensional is at least 1% greater than the second cross-sectional dimensional. In some embodiments, the first cross-sectional dimensional is at least 10% greater than the second cross-sectional dimensional.

In an aspect, the present disclosure provides a system for forming a three-dimensional object, comprising: a container that is configured to contain a powder bed; a binding substance applicator that is configured to apply a binding substance to an area of a layer of powder material in the powder bed; an energy source that is configured to provide an energy beam directed to at most a portion of the layer of powder material; and one or more computer processors operatively coupled to the binding substance applicator and the energy source, wherein the one or more computer processors are individually or collectively programmed to (a) direct the binding substance applicator to apply a stream comprising the binding substance to an area of a layer of powder material in the powder bed, wherein the stream is applied in accordance with a model design of the three-dimensional object, and (b) direct the energy source to provide the energy beam directed to at most a portion of the layer of powder material, wherein the energy beam is directed in accordance with the model design of the three-dimensional object, wherein the stream has a first cross-sectional dimension and the energy beam has a second cross-sectional dimension, wherein the first cross-sectional dimensional is greater than the second cross-sectional dimensional. In some embodiments, the energy source comprises at least one laser.

In an aspect, the present disclosure provides a method for forming a three-dimensional object, comprising alternately and sequentially (a) applying a stream comprising a binding substance to an area of a layer of powder material in a powder bed, wherein the stream is applied in accordance with a model design of the three-dimensional object, and (b) generating at least one perimeter of the three-dimensional object in the area, wherein the at least one perimeter is in accordance with the model design. In some embodiments, the at least one perimeter is generated mechanically. In some embodiments, the at least one perimeter is generated upon heating at least a portion of the area. In some embodiments, the at least one perimeter is generated using an energy source that provides an energy beam that subjects the at least the portion of the area to the heating. In some embodiments, the at least one perimeter is generated using a laser.

In an aspect, the present disclosure provides a system for forming a three-dimensional object, comprising: a container that is configured to contain a powder bed; a binding substance applicator that is configured to apply a binding substance to an area of a layer of powder material in the powder bed; a perimeter generator that is configured to generate at least one perimeter of the three-dimensional object in the area; and one or more computer processors operatively coupled to the binding substance applicator and perimeter generator, wherein the one or more computer processors are individually or collectively programmed to (a) direct the binding substance application to apply a stream comprising the binding substance to the area of the layer of powder material in the powder bed, wherein the stream is applied in accordance with a model design of the three-dimensional object, and (b) direct the perimeter generator to generate the at least one perimeter of the three-dimensional object in the area, wherein the at least one perimeter is in accordance with the model design.

In an aspect, the present disclosure provides a method for forming a three-dimensional object, comprising: (a) providing a powder bed comprising powder material; (b) applying a first binding substance to a first area of a first layer of powder material of the powder bed; (c) using a first cutter to generate one or more perimeters of the first layer, wherein the one or more perimeters of the first layer is in accordance to a model design of the three-dimensional object in computer memory; (d) depositing a second layer of powder material adjacent to the first layer; (e) applying a second binding substance to a second area of a second layer of powder material of the powder bed; (f) using a second cutter to generate one or more perimeters of the second layer of powder material, wherein the one or more perimeters of the second layer is in accordance to the model design of the three-dimensional object. In some embodiments, the cutting in (b) comprises two or more cutting passes. In some embodiments, the generating of one or more perimeters of a layer is via a multi-axis machine tool. In some embodiments, the first cutter is a contact cutter. In some embodiments, the first cutter is a non-contact cutter.

In an aspect, the present disclosure provides a method for forming a three-dimensional object, comprising: (a) providing a powder bed comprising powder material; (b) applying a first binding substance to a first area of a first layer of powder material of the powder bed; (c) depositing a second layer of powder material adjacent to the first layer; (d) applying a second binding substance to a second area of a second layer of powder material of the powder bed; and (e)

using a cutter to generate one or more perimeters of the first layer and the second layer of powder material, wherein the one or more perimeters of the first layer and the second layer is in accordance with a model design of the three-dimensional object in computer memory. In some embodiments, the one or more perimeters of the first layer and the second layer of powder material is generated in a single pass of the cutter. In some embodiments, the one or more perimeters of the first layer and the second layer is generated via a multi-axis machine tool, a Computer Numeric Control (CNC) spindle, a cutting tool bit, or a blade. In some embodiments, the one or more perimeters of the first layer and the second layer is generated via a multi-axis machine tool. In some embodiments, the method further comprises, in (b), heating the first area of the first layer.

In an aspect, the present disclosure provides a method for forming a three-dimensional object, comprising: (a) providing a powder bed comprising powder material; (b) applying a first binding substance to a first area of a first layer of powder material of the powder bed; (c) depositing a second layer of powder material adjacent to the first layer; (d) applying a second binding substance to a second area of a second layer of powder material of the powder bed; and (e) using at least one cutter to simultaneously generate one or more perimeters of the first layer and the second layer of powder material, wherein the one or more perimeters of the first layer deviates from a model design of the first layer and/or the one or more perimeters of the second layer deviates from a model design of the second layer of the three-dimensional object.

In some embodiments, the one or more perimeters of the first layer is at least half a layer shifted from the model design of the first layer of the three-dimensional object. In some embodiments, the one or more perimeters of the first layer is at most half a layer shifted from the model design of the first layer of the three-dimensional object.

In an aspect, the present disclosure provides a system for forming a three-dimensional object, comprising: a container that is configured to contain a powder bed; a powder dispenser that (i) dispenses a powder material to form a first layer of the powder material as part of the powder bed, and (ii) dispenses the powder material to form a second layer of the powder material adjacent to the first layer; and at least one cutter that simultaneously generates one or more perimeters of the first layer; one or more computer processors operatively coupled to the powder dispenser and the at least one cutter, wherein the one or more computer processors are individually or collectively programmed to (i) direct the powder dispense the powder material to form the first layer and the second layer, and (ii) direct the at least one cutter to simultaneously generate the one or more perimeters of the first layer and the second layer of powder material, wherein the one or more perimeters of the first layer deviates from a model design of the first layer and/or the one or more perimeters of the second layer deviates from a model design of the second layer of the three-dimensional object. In some embodiments, the perimeter of the first layer of powder material is half a layer shifted from the model design of the first layer of the three dimensional object. In some embodiments, a cutting depth of a powder layer is equivalent to a penetration depth of a binding substance.

In an aspect, the present disclosure provides a method for forming a three-dimensional object, comprising: (a) providing a model design of the three-dimensional object in computer memory; (b) transforming the model design to include (i) one or more layers each with a layer thickness (L) and (ii) one or more perimeters each with a thickness (P), wherein each of the one or more layers corresponds to a defined layer of powder material, and wherein each of the one or more perimeters corresponds to an individual perimeter separately defined in a given layer of the one or more layers, thereby providing a transformed model design in computer memory; and (c) using the transformed model design to generate instructions usable for generating the three-dimensional object, which instructions provide for generation of the one or more layers independently from generation of the one or more perimeters. In some embodiments, the method further comprises using the instructions to generate the three-dimensional object. In some embodiments, the method further comprises determining a configuration for generation of the one or more perimeters. In some embodiments, determining the configuration comprises evaluating a cutting path, the cutting path overlapping with a first cutting path in the first layer and a second cutting path in the second layer.

In an aspect, the present disclosure provides a computing system for controlling an apparatus for forming a three-dimensional object, comprising one or more computer processors, computer memory and computer code individually or collectively executable by the one or more computer processors to implement a method comprising: (a) transforming a model design of the three-dimensional object into (i) a plurality of layers each with a layer thickness (L) and (ii) a plurality of perimeters each with a thickness (P), wherein each of the plurality of layers corresponds to a defined layer of powder material, and wherein each of the plurality of perimeters corresponds to an individual perimeter in a given layer of the plurality of layers defined separately from the plurality of perimeters, thereby providing a transformed model design in computer memory; and (b) creating machine instructions for controlling the apparatus to generate the three-dimensional object based on the transformed model design. In some embodiments, the operations comprise determining a total cutting depth for a layer equal to a penetration depth. In some embodiments, the total cutting depth is not equal to a layer thickness. In some embodiments, the penetration depth is equal to a height of a layer.

In an aspect, the present disclosure provides a non-transitory computer-readable medium comprising machine-executable code that, upon execution by one or more processors, implements a method for forming a three-dimensional object, the method comprising: (a) transforming a model design of the three-dimensional object into (i) a plurality of layers each with a layer thickness (L) and (ii) a plurality of perimeters each with a thickness (P), wherein each of the plurality of layers corresponds to a defined layer of powder material, and wherein each of the plurality of perimeters corresponds to an individual perimeter in a given layer of the plurality of layers defined separately from the plurality of perimeters, thereby providing a transformed model design in computer memory; and (b) creating machine instructions for controlling the apparatus to generate the three-dimensional object based on the transformed model design. In some embodiments, the operations comprise determining a total cutting depth for a layer equal to a penetration depth. In some embodiments, the total cutting depth is not equal to a layer thickness. In some embodiments, the penetration depth is equal to a height of a layer. In some embodiments, the operations comprise determining configuration of cutting a layer. In some embodiments, determining the configuration comprises evaluating a shape and a size of a first layer of the plurality of layers. In some embodiments, determining a geometric compensation comprises using a statistical scaling algorithm or a machine learning algorithm.

In an aspect, the present disclosure provides a method for forming a three-dimensional object, comprising: (a) providing a powder bed comprising powder material; (b) applying a first binding substance to a first area of a first layer of powder material of the powder bed; (c) using a first perimeter generator to generate one or more perimeters of the first layer, wherein the one or more perimeters of the first layer is in accordance to a model design of the three-dimensional object in computer memory; (d) depositing a second layer of powder material adjacent to the first layer; (e) applying a second binding substance to a second area of a second layer of powder material of the powder bed; and (f) using a second perimeter generator to generate one or more perimeters of the second layer of powder material, wherein the one or more perimeters of the second layer is in accordance to the model design of the three-dimensional object, thereby generating at least a portion of the three-dimensional object. In some embodiments, the first binding substance and/or the second binding substance are applied in a manner such that there is (i) no pooling of the first binding substance and/or the second binding substance in the powder bed or (ii) no physical disturbance of individual particles of the powder material.

In some embodiments, the first binding substance and the second binding substance are the same binding substance. In some embodiments, the first perimeter generator and the second perimeter generator are the same perimeter generator. In some embodiments, the method further comprises, subsequent to (f), heating the at least the portion of the three-dimensional object. In some embodiments, the heating is bulk heating of the at least the portion of the three-dimensional object, which bulk heating comprises sintering individual particles of the powder material in the at least the portion of the three-dimensional object. In some embodiments, the first perimeter generator and/or the second perimeter generator is a multi-axis machine tool. In some embodiments, the first or second perimeter generator is a first or second cutter.

In some embodiments, the first or second cutter is a contact cutter. In some embodiments, the first or second cutter is a non-contact cutter that does not contact the powder bed upon generating the one or more perimeters of the first layer or second layer, respectively. In some embodiments, the non-contact cutter includes at least one laser. In some embodiments, the first binding substance and/or the second binding substance is applied via an inkjet head, an atomizing sprayer, an ultrasonic sprayer, or a nebulizer. In some embodiments, in (b), the inkjet head, atomizing sprayer, ultrasonic sprayer, or nebulizer is tilted at an angle greater than 0° with respective to an axis perpendicular to the first layer. In some embodiments, the powder material comprises stainless steel powder, bronze powder, bronze alloy powder, gold powder, or any combination thereof. In some embodiments, the first binding substance or the second binding substance has a droplet size of 0.1 micrometers to 100 micrometers when applied to the first area of the first layer or the second area of the second layer, respectively. In some embodiments, the first area or the second area is an entirety of an exposed area of the powder bed. In some embodiments, the method further comprises (i) subjecting at least a portion of the first area to heating subsequent to (b), or (ii) subjecting at least a portion of the second area to heating subsequent to (e).

In an aspect, the present disclosure provides a method for forming a three-dimensional object, comprising: (a) providing a powder bed comprising powder material; (b) applying a first binding substance to a first area of a first layer of powder material of the powder bed; (c) depositing a second layer of powder material adjacent to the first layer; (d) applying a second binding substance to a second area of a second layer of powder material of the powder bed; and (e) using at least one perimeter generator to generate one or more perimeters of the first layer and the second layer of powder material, wherein the one or more perimeters of the first layer and the second layer is in accordance with a model design of the three-dimensional object in computer memory, thereby generating at least a portion of the three-dimensional object. In some embodiments, the one or more perimeters of the first layer and the second layer of powder material is generated in a single pass of the cutter. In some embodiments, the one or more perimeters of the first layer and the second layer is generated via a multi-axis machine tool, a Computer Numeric Control (CNC) spindle, a cutting tool bit, or a blade.

In some embodiments, the method further comprises heating the first area of the first layer or the second area of the second layer. In some embodiments, the at least one perimeter generator is a plurality of perimeter generators. In some embodiments, wherein in (e), the one or more perimeters of the first layer and the second layer are generated simultaneously. In some embodiments, wherein in (e), the one or more perimeters of the first layer and/or the second layer deviates from the model design. In some embodiments, the first binding substance and/or the second binding substance are applied in a manner such that there is (i) no pooling of the first binding substance and/or the second binding substance in the powder bed or (ii) no physical disturbance of individual particles of the powder material.

In some embodiments, the method further comprises, subsequent to (e), heating the at least the portion of the three-dimensional object. In some embodiments, the heating is bulk heating of the at least the portion of the three-dimensional object, which bulk heating comprises sintering individual particles of the powder material in the at least the portion of the three-dimensional object. In some embodiments, the first binding substance and/or the second binding substance is applied via an inkjet head, an atomizing sprayer, an ultrasonic sprayer, or a nebulizer. In some embodiments, the powder material comprises particles of 0.5 micrometers to 50 micrometers in size. In some embodiments, the first area or the second area is an entirety of an exposed area of the powder bed.

In an aspect, the present disclosure provides a method for forming a plurality of three-dimensional object, comprising: (a) providing a powder bed comprising powder material; (b) applying a first binding substance to a first area of a first layer of powder material of the powder bed; (c) using a first plurality of perimeter generators to generate a plurality of perimeters of the first layer, wherein each of the plurality of perimeters of the first layer is in accordance with a model design of each of the plurality of three-dimensional objects in computer memory; (d) depositing a second layer of powder material adjacent to the first layer; (e) applying a second binding substance to a second area of a second layer of powder material of the powder bed; and (f) using a second plurality of perimeter generators to generate a plurality of perimeters of the second layer of powder material, wherein the plurality of perimeters of the second layer is in accordance with the model design of each of the plurality of three-dimensional objects, thereby generating at least a portion of each of the plurality of three-dimensional objects. In some embodiments, the first plurality of perimeter generators and the second plurality of perimeter generators are the same. In some embodiments, the first plurality of perimeter generators and the second plurality of perimeter generators are different. In some embodiments, the first plurality of perimeter generators or the second plurality of perimeter generators includes contact cutters. In some embodiments, the first plurality of perimeter generators or the second plurality of perimeter generators includes non-contact cutters. In some embodiments, the method further comprises repeating (d)-(f) one or more times to generate the plurality of three-dimensional objects. In some embodiments, the plurality of three-dimensional objects is generated in a time period that is less than or equal to 24 hours. In some embodiments, the time period is less than or equal to 4 hours. In some embodiments, the plurality of three-dimensional objects have different shapes or sizes. In some embodiments, the plurality of three-dimensional objects have the same shapes or sizes.

In an aspect, the present disclosure provides a system for forming three-dimensional objects, comprising: an enclosure comprising a plurality of three-dimensional printing systems, wherein each of the plurality of three-dimensional printing systems comprises: a container for holding a powder bed; at least one perimeter generator for generating one or more perimeters in the powder bed, which one or more perimeters correspond to a three-dimensional object; and a binder application unit, which binder application unit applies a binder to the powder bed during printing; and an environmental control unit in fluid communication with the enclosure, wherein the environmental control unit regulates an environmental in the enclosure.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1:
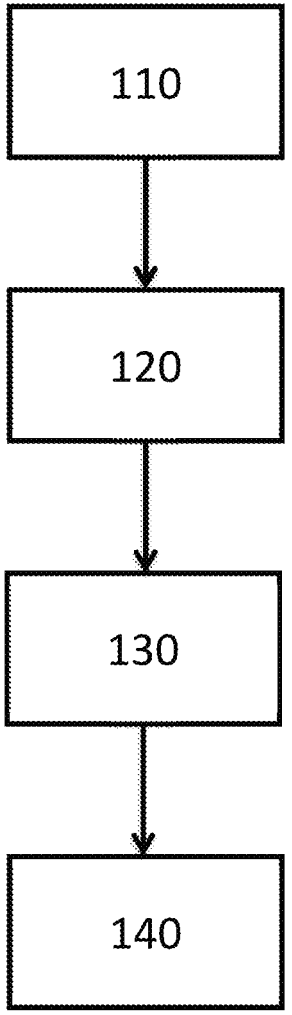
FIG. 1 illustrates a schematic of a flow chart of a three-dimensional printing process.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "subsection," as used herein, may refer to an area that is less than 100%, 95%, 90%, 80%, 70%, 60%, 50%, 40%, 30%, 20%, or 10% of the total area.

The term "layer," as used herein, refers to a layer of atoms or molecules on a surface, such as a substrate. In some cases, a layer includes an epitaxial layer or a plurality of epitaxial layers (or sub-layers). A layer generally has a thickness from about one monoatomic monolayer (ML) to tens of monolayers, hundreds of monolayers, thousands of monolayers, millions of monolayers, billions of monolayers, trillions of monolayers, or more. In an example, a layer is a multilayer structure having a thickness greater than one monoatomic monolayer. In addition, a layer may include multiple material layers.

The term "perimeter," as used herein, generally refers to a continuous or non-continuous line forming a boundary of a given area. The area may be a closed area. The perimeter may be at least a portion of a boundary of the given area. For example, the given area may be an area in a layer of powder material. The perimeter may be an entirety of the boundary or a portion of the boundary. The perimeter may be part of another perimeter, such as a larger perimeter. The perimeter may be part of a nascent or final three-dimensional product.

The term "powder," as used herein, generally refers to a solid having particles, such as fine particles. The powder may also be referred to as "particulate material." A powder may include individual particles with cross-sections (e.g., diameters) of at least about 5 nanometers (nm), 10 nm, 20 nm, 30 nm, 40 nm, 50 nm, 100 nm, 200 nm, 300 nm, 400 nm, 500 nm, 1 μm, 5 μm, 10 μm, 15 μm, 20 μm, 35 μm, 30 μm, 40 μm, 45 μm, 50 μm, 55 μm, 60 μm, 65 μm, 70 μm, 75 μm, 80 μm, or 100 μm. The individual particles may be of various shapes, such as, for example, spherical, oval, cubic, irregularly shaped, or partial shapes or any combination of shapes thereof.

The term "support," as used herein, generally refers to any work piece on which a material used to form a 3D object, is placed on. The 3D object may be formed directly on the base, directly from the base, or adjacent to the base. The 3D object may be formed above the base. The support may be a substrate. The support may be disposed in an enclosure (e.g., a chamber). The enclosure can have one or more walls formed of various types of materials, such as elemental metal, metal alloy (e.g., stainless steel), ceramics, or an allotrope of elemental carbon. The enclosure can have shapes of various cross-sections, such as circular, triangular, square, rectangular, or partial shapes or a combination thereof. The enclosure may be thermally insulated. The enclosure may comprise thermal insulation. The enclosure may provide thermal or environmental insulation. The base can comprise an elemental metal, metal alloy, ceramic, allotrope of carbon, or polymer. The base can comprise stone, zeolite, clay or glass. The elemental metal can include iron, molybdenum, tungsten, copper, aluminum, gold, silver or titanium. A metal alloy may include steel (e.g., stainless steel). A ceramic material may include alumina. The base can include silicon, germanium, silica, sapphire, zinc oxide, carbon (e.g., graphite, Graphene, diamond, amorphous carbon, carbon fiber, carbon nanotube or fullerene), SiC, AN, GaN, spinel, coated silicon, silicon on oxide, silicon carbide on oxide, gallium nitride, indium nitride, titanium dioxide, aluminum nitride. In some cases, the base comprises a susceptor (i.e., a material that can absorb electromagnetic energy and convert it to heat). The base, substrate and/or enclosure can be stationary or translatable.

The enclosure may be open to air or an ambient environment, or maintained in a controlled environment. In some examples, the enclosure is under an inert atmosphere, such as an inert gas (e.g., Ar, He, $N_2$, Kr, Xe, $H_2$, CO, $CO_2$, or Ne). The enclosure may be filled with a non-reactive gas.

As an alternative, the enclosure may be maintained under vacuum. The pressure in the chamber can be at least $10^{-7}$ Torr, $10^{-6}$ Torr, $10^{-5}$ Torr, $10^{-4}$ Torr, $10^{-3}$ Torr, $10^{-2}$ Torr, $10^{-1}$ Torr, 1 Torr, 10 Torr, 100 Torr, 1 bar, 2 bar, 3 bar, 4 bar, 5 bar, 10 bar, 20 bar, 30 bar, 40 bar, 50 bar, 100 bar, 200 bar, 300 bar, 400 bar, 500 bar, 1000 bar, or more. The pressure in the enclosure may be at least 100 Torr, 200 Torr, 300 Torr, 400 Torr, 500 Torr, 600 Torr, 700 Torr, 720 Torr, 740 Torr, 750 Torr, 760 Torr, 900 Torr, 1000 Torr, 1100 Torr, 1200 Torr. The pressure in the enclosure may be at most $10^{-7}$ Torr, $10^{-6}$ Torr, $10^{-5}$ Torr, $10^{-4}$ Torr, $10^{-3}$ Torr, $10^{-2}$ Torr, $10^{-1}$ Torr, 1 Torr, 10 Torr, 100 Torr, 200 Torr, 300 Torr, 400 Torr, 500 Torr, 600 Torr, 700 Torr, 720 Torr, 740 Torr, 750 Torr, 760 Torr, 900 Torr, 1000 Torr, 1100 Torr, or 1200 Torr. In some cases the pressure in the enclosure may be standard atmospheric pressure.

The term "about" when referring to a number or a numerical range generally means that the number or numerical range referred to is an approximation within experimental variability (or within statistical experimental error), and thus the number or numerical range may vary from, for example, between 1% and 15% of the stated number or numerical range.

The term "adjacent" or "adjacent to," as used herein, generally refers to 'next to', 'adjoining', 'in contact with,' or 'in proximity to.' Adjacent to may refer to one feature, such as a layer, being 'above' or 'below' another feature, such as another layer. A first layer adjacent to a second layer may be in direct contact with the second layer, or there may be one or more intervening layers between the first layer and the second layer.

Three-dimensional printing (3D printing) may refer to a process of forming a three-dimensional object. To form a three-dimensional object, multiple layers of a powder material may be layered sequentially adjacent to one another. The layers of powder material may be heated, cured, or chemically treated, individually or at the same time, so that particles of the powder material fuse or melt together.

A model design may be used to guide the formation of specific areas or subsections of powder material that is treated with binding material, heat, chemicals, or any combination thereof. The model design may be a computer-generated design, such as using 3D printing software. The layers of powder material may be layered sequentially until the object formed takes the shape of the model design of the three-dimensional object.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Materials

A three-dimensional object may be formed on a surface. A powder bed may be applied adjacent to a surface for formation of a three-dimensional object. The surface may be a flat surface, an uneven surface, a container, a build box, a box, a table, or any combination thereof.

In some cases, a container or box may have a heating mechanism integrated or adjacent to the container or box. The container or box may be heated at an elevated temperature throughout a method described herein, to ensure individual particles of the powder material do not clump together. In some cases, the powder materials do not clump together before, during, or after application of a binder to the powder material. The container or box may be heated to a temperature of at least about 25° C., 30° C., 40° C., 50° C., 60° C., 70° C., 80° C., 90° C., 100° C., 110° C., 120° C., 130° C., 140° C., 150° C., 160° C., 170° C., 180° C., 190° C., 200° C., 300° C., 400° C., 500° C., 600° C., 700° C., 800° C., 900° C., 1000° C., or more. In some cases, the container or box may be heated throughout the method of formation of the three-dimensional object at a temperature of 25° C. to 500° C., 50° C. to 200° C., 70° C. to 150° C., or 80° C. to 120° C.

A powder material may be a powder of a polymer, a metal, a metal alloy, a ceramic, a cermet, or any combination thereof. A powder material may comprise a solid, a liquid, a gel, or any combination thereof. A powder material may comprise stainless steel, bronze, steel, gold, nickel, nickel steel, aluminum, titanium, carbon fiber, carbon nanotubes, graphene, graphene embedded in plastic, nitinol, water-absorbing plastic, plastic, sand, conductive carbomorph, paper, concrete, food, yarn, or any combination thereof. A powder material may be coated by a coating, such as coating by plastic, an organic material, or any combination thereof. In some cases, the powder material may comprise metal particles. In some cases, the powder material may comprise gold particles. In some cases, the powder material may comprise stainless steel particles. The stainless steel particles may comprise metal injection molding (MIM) grades of stainless steel. The stainless steel particles may be 316L, 17-4 PH, 430L, 440C, 310S, 420J, or 904L grade. A powder material may comprise H13 steel, S7 steel, inconel alloys, MIM alloys, titanium, sand, or ceramic. The stainless steel particles may be MIM grade 17-4 PH. The powder material may comprise carbon, manganese, phosphorus, sulfur, silicon, chromium, nickel, copper, niobium, or iron. The powder material may comprise chromium, nickel, copper, niobium, or iron. A powder material may comprise a flow agent to ensure the powder maintains a free-flow behavior during processing. A flow agent may be fumed silica. The flow agent may be hydrophobic. The flow agent may be hydrophilic. Agents may be added to the powder material to change the absorption property, such as the absorption of water. In some cases, an agent may be added to decrease the absorption of water. In some cases, an agent may be added to increase the absorption of water.

In some cases, a layer of powder material that is applied to a surface may comprise two or more different materials, wherein these two or more materials react with each other during deposition onto the surface, during application of binding material, during curing, during sintering, or any combination thereof. The two or more materials may be combined before or during deposition of the powder material onto the powder bed. In some cases, a layer of powder material may comprise stainless steel particles and bronze particles.

In some cases, a single layer may be heated. Alternatively, multiple layers may be heated simultaneously. Multiple layers of a powder material may form a three-dimensional object. The three-dimensional object may be a final product, or a green part (intermediate object). In some cases, the green part may be heated simultaneously and in some cases further processed to yield the final product (e.g., three-dimensional object that is to be generated). For instance, an entire green part may be heated in a furnace. Such heating may cause particles of the green part to melt or sinter, which may cause such particles to fuse together to yield the final product.

The three-dimensional object may have a linear shrinkage after heating or sintering. In some cases, an object may have a linear shrinkage of at most 50%, 40%, 30%, 20%, 15%, 10%, 5%, 1%, or less. In some cases, an object may have a linear shrinkage of about 5% to 30%, 10% to 20%, or 15% to 20%. The three-dimensional object may have a yield strength, or yield stress, of at least 50 megapascal (MPa), 100 MPa, 100 MPa, 200 MPa, 300 MPa, 400 MPa, 500 MPa, or more. In some cases, a three-dimensional object may vary from the computer model of the three-dimensional object. A finished object may vary in size in one-dimension (e.g., length, width, height) from the computer model by at most about 10%, 5%, 4%, 3%, 2%, 1%, 0.9%, 0.8%, 0.7%, 0.6%, 0.5%, 0.4%, 0.3%, 0.2%, 0.1%, or less.

A powder material, as used herein, generally refers to a solid having fine particles. The powder can comprise individual particles, and the particles may be spherical, oval, cubic, irregularly shaped, or partial shapes or any combination of shapes thereof. A powder material may be characterized by various techniques, including, but not limited to, hall flow, powder flow, angle of repose, tapped density, morphology, porosity, laser diffraction, sieve analysis, moisture content, chemical composition, or any combination thereof. In some cases, the powder material is substantially spherically shaped.

A powder material may comprise particles of a substantially uniform size. A powder material may comprise particles of at least about 0.1 micrometers, 0.2 micrometers, 0.3 micrometers, 0.4 micrometers, 0.5 micrometers, 0.6 micrometers, 0.7 micrometers, 0.8 micrometers, 0.9 micrometers, 1 micrometer, 2 micrometers, 5 micrometers, 10 micrometers, 20 micrometers, 30 micrometers, 40 micrometers, 50 micrometers, 60 micrometers, 70 micrometers, 80 micrometers, 90 micrometers, 100 micrometers, 200 micrometers, 300 micrometers, 400 micrometers, 500 micrometers, 600 micrometers, 700 micrometers, 800 micrometers, 900 micrometers, or 1 millimeter. In some cases, a powder material may comprise particles of 10 micrometers to 100 micrometers, 20 micrometers to 90 micrometers, 30 micrometers to 80 micrometers, or 40 micrometers to 60 micrometers. In some cases, a powder material may comprise particles of about 50 micrometers.

A powder material may be categorized by different mesh sizes. A powder material may comprise particles of mesh size of at least about 4, 6, 8, 12, 16, 20, 30, 40, 50, 60, 70, 80, 100, 140, 200, 230, 270, 325, 400, 625, 1250, or 2500. In some cases, a powder material may comprise particles of mesh size of about 100 to 625, 230 to 400, or 270 to 400. In some cases, a powder material has a mesh size of 270. In some cases, a powder material has a mesh size of 325. In some cases, a powder material has a mesh size of 400.

In some cases, a powder material may include particles of different mesh sizes. In some cases, a powder material may be a multimodal (e.g., bimodal) powder material, wherein particles of different mesh sizes are purposely mixed together.

A powder material may be categorized by a D-value. In some cases, a powder material may have a D50 of less than about 20, 15, 10, 7, 5, or 3.

The method of forming a three-dimensional object may require deposition of multiple layers to powder material. The method of forming a three-dimensional object may require at least 2 layers of powder material, 3 layers, 4 layers, 5 layers, 6 layers, 7 layers, 8 layers, 9 layers, 10 layers, 50 layers, 100 layers, 200 layers, 500 layers, 700 layers, 1000 layers, or more to form the object. The object may require 1 to 1000 layers of powder material, 10 to 700 layers, 100 to 500 layers, or 200 to 400 layers to complete the formation of the object. The object may require 10 to 1000 layers of powder material, 100 to 700 layers, 200 to 600 layers, or 300 to 500 layers to complete the formation of the object.

In some cases, the first and second layers of powder material may not be cut or a perimeter may not be generated in the first or second layer of powder material of a multi-layer object. This may be useful to make the part more dimensionally accurate. This may reduce the amount of leveling of the build stage. The first or second layer of powder material may be a portion of the part. A layer of powder material may comprise one or more types of powder material. In some cases, two or more elemental metals, two or more metal alloys, two or more ceramics, or two or more allotropes of elemental carbon may be used to form a layer of powder material.

A layer of powder material may be distributed uniformly on a surface. A layer of powder material may have a thickness on at least a portion of a surface or surface bed. A layer of powder material may have a thickness of at least about 0.001 millimeters, 0.01 millimeters, 0.1 millimeters, 0.2 millimeters, 0.3 millimeters, 0.4 millimeters, 0.5 millimeters, 0.6 millimeters, 0.7 millimeters, 0.8 millimeters, 0.9 millimeters, 1 millimeter, 2 millimeters, 5 millimeters, 10 millimeters, 20 millimeters, 30 millimeters, 40 millimeters, 50 millimeters, 60 millimeters, 70 millimeters, 80 millimeters, 90 millimeters, or 100 millimeters. A layer of powder material may have a thickness of 0.1 millimeters to 10 millimeters, 0.3 millimeters to 5 millimeters, 0.4 millimeters to 2 millimeters, 0.5 millimeters to 1 millimeter. In some cases, a layer of powder material may have a thickness of about 100 micrometers, 200 micrometers, 300 micrometers, 400 micrometers, 500 micrometers, 600 micrometers, 700 micrometers, 800 micrometers, 900 micrometers, or 1000 micrometers. In some cases, a layer of powder material may have a thickness of about 300 micrometers. In some cases, a three-dimensional object may comprise more than one layer, wherein the thickness of each of the powder layers may be the same, about the same, or different.

Binding Substance

A binding substance (e.g., a binder) may be used to bind individual powder particles together. A binding substance may be applied to a layer of powder material to bind individual powder particles together. The binding substance may be a liquid, a gel, a viscous solution, or any combination thereof. In some cases, a binding substance is a liquid.

The binding substance may be a sugar, a glue, a resin, a polymer, or a combination thereof. The binding substance may be sucrose, epoxy resin, Gorilla Glue, polyurethane, Liquid Nails, Super Glue, wood stain, nail polish, or any combination thereof. A binding substance may comprise an organic solvent, an aqueous solvent, or any combination thereof. A binding substance or binder may be water-soluble.

A binder may be recycled if it was sprayed to a part of the powder bed that did not be a part of the desired three-dimensional object. A binder may be recycled after being sprayed onto the powder bed. The binder may be recycled via washing, drying, crumbling, or sieving.

The binding substance may be purchased and used without alteration. The binding substance may be dilution to achieve certain properties suitable for use in the formation of a three-dimensional object with a method of the current disclosure. In some cases, the solution may be diluted into a dilution by a factor of at least about 1.1, 1.2, 1.5, 1.7, 2, 5, 10, 20, 50, 100, 200, or 500.

The binding substance may have a binding strength, bond strength, strength, adhesive strength, or tensile shear of greater than about 0.1 pounds per square inch (psi), 1 psi, 5 psi, 10 psi, 50 psi, 100 psi, 200 psi, 300 psi, 400 psi, 500 psi, 600 psi, 700 psi, 800 psi, 900 psi, 1000 psi, 1500 psi, 2000 psi, 2500 psi, 3000 psi, 4000 psi, 5000 psi, or more. In some cases, the binding substance may have a bond strength of 100 psi to 3000 psi, 300 psi to 2500 psi, or 500 psi to 2000 psi.

The binding substance may have a viscosity of less than or equal to about 1000 centipoise (cP), 900 cP, 800 cP, 700 cP, 600 cP, 500 cP, 400 cP, 300 cP, 200 cP, 100 cP, 50 cP, 10 cP, 9 cP, 8 cP, 7 cP, 6 cP, 5 cP, 4 cP, 3 cP, 2 cP, 1 cP, or less. The binding substance may have a viscosity of 1000 cP to 100 cP, 700 cP, to 200 cP, or 600 cP to 300 cP.

The binding substance may be stored in a container, a bottle, a cup, or a vessel.

When a binding substance (e.g., a binder) is applied to the surface of a layer of powder material, some of the binding substance may extend through the top layer of powder material through to the next layer of powder material. The binding substance may have a certain z-axis penetration depth or binder penetration depth. The z-axis penetration depth or binder penetration depth may be a result of deposition technique, bed heating, viscosity of the binding substance, or any combination thereof. The z-axis penetration depth may be greater than about 1 micrometer, 5 micrometers, 10 micrometers, 50 micrometers, 100 micrometers, 200 micrometers, 300 micrometers, 400 micrometers, 500 micrometers, 600 micrometers, 700 micrometers, 800 micrometers, 900 micrometers, 1 millimeter, 2 millimeters, 5 millimeters, 10 millimeters, 20 millimeters, 30 millimeters, 40 millimeters, 50 millimeters, 60 millimeters, 70 millimeters, 80 millimeters, 90 millimeters, 100 millimeters, 200 millimeters, 300 millimeters, 400 millimeters, 500 millimeters, 600 millimeters, 700 millimeters, 800 millimeters, 900 millimeters, 1 meter, or more. In some cases, the z-axis penetration depth may be 10 micrometers to 400 micrometers, or 100 micrometers to 200 micrometers. In some cases, the penetration depth of a binding material may be from 100 micrometers to 800 micrometers, 200 micrometers to 500 micrometers, or 300 micrometers to 500 micrometers. In some cases, the penetration depth of a binding material may be about 450 micrometers.

When the binding substance is applied to a layer of powder material, the binding substance may have a droplet size of less than 1000 micrometers, 900 micrometers, 800 micrometers, 700 micrometers, 600 micrometers, 500 micrometers, 400 micrometers, 300 micrometers, 200 micrometers, 100 micrometers, 75 micrometers, 50 micrometers, 40 micrometers, 30 micrometers, 20 micrometers, 10 micrometers, 5 micrometers, 3 micrometers, 2 micrometers, or 1 micrometer. When the binding substance is applied to a layer of powder material, the binding substance may have a droplet size of 1 micrometer to 700 micrometers, 2 micrometers to 600 micrometers, 10 micrometer to 500 micrometers, or 100 micrometer to 200 micrometers.

The binding substance may have a small droplet size of less than about 10 micrometers, 5 micrometers, 3 micrometers, 2 micrometers, 1 micrometer, 0.5 micrometers, 0.25 micrometers, or less. The binding substance may have an average droplet size of about 1 micrometer. The binding substance may have an average droplet size of about 1-2 micrometers.

When a binding substance (e.g., a binder) is applied to the surface of a layer of powder material, some of the binding substance may disturb or displace particles of powder material. The disturbance of powder material, agglomeration of powder material, or cutting effect of binding substance droplets on the surface of a layer of powder material may not be desired. It may be desired to minimize agglomeration of powder material during application of binding material. Using small droplets of binder material may mitigate the undesired effects of disturbance of a powder material on the surface of a layer of powder material. A layer of binder may be distributed uniformly on a surface. The uniformity of the powder layer may be measured in depth of penetration across the powder bed, such as less than about 0.1 millimeters (mm), 0.01 mm, 0.001 mm, 0.0001 mm, or less.

After a layer of binder is sprayed, the powder bed may be substantially uniformed. The amount of binder sprayed to any given area of the powder bed may vary by no more than about 10%, 5%, 4%, 3%, 2%, 1%, 0.1%, or less.

A system may comprise a user interface to ensure proper use of the system. A user interface may include barriers to making certain movements that may damage the machine, various login credentials to give the user various machine controls, macros to perform functions, or a lock or unlock procedure.

Spray heads may be used to create the desired binding material droplet size. Spray heads may be ultrasonic spray heads. When using an industrial ultrasonic technology, the spray can be through a combination of outlet cross section design and the use of a vacuum. The excess plume may be captured by vacuum so as not to contaminate the rest of the machine. The use of an ultrasonic mist making system may be a cost efficient alternative to using a commercial industrial ultrasonic spray head. Ultrasonic mist making systems can also be used for the creation of the droplets.

The three-dimensional object may be formed under atmospheric conditions. The apparatus may comprise a dehumidifier to control the amount of humidity present when the three-dimensional object is formed. The amount of humidity in the air may be at least about 0 grams per cubic meter (g/m³), 1 g/m³, 2 g/m³, 3 g/m³, 4 g/m³, 5 g/m³, 6 g/m³, 7 g/m³, 8 g/m³, 9 g/m³, 10 g/m³, 15 g/m³, 20 g/m³, 25 g/m³, or 30 g/m³. The dehumidifier may be part of the apparatus. Alternatively, the dehumidifier is not a part of the three-dimensional object printer. The dehumidifier may be automatic and turn on or off according to set specifications or conditions. The dehumidifier may be at the apparatus level or may be at a room level in which the object is printed. Each printer system may comprise an air conditioner and/or a dehumidifier. Each printer system may comprise a central air system or other environmental control system that is connected to (e.g., in fluid communication with) each unit. Alternatively, multiple printer systems may be connected to a single air system. Control of the printer environment may be controlled individually or globally to all units in the system.

A modular room or pod may comprise 1, 2, 3, 4, 5, 6, 7, 8, 9, 10, or more printers. In some cases, a pod may comprise two printers. In some cases, a pod may comprise 4 printers. Each pod may comprise an environmental control panel for the user, so that the humidity, temperature, oxygen level, or additional environment parameters may be controlled. Each pod may have a dedicated grounding system, which may comprise a ground. The humidity of the air surrounding a three-dimensional part during formation may be controlled with a desiccant, a desiccant drier, a desiccant box, a dehumidifier, an air conditioner, or a combination thereof.

A three-dimensional object may have a height, a width, and a length, which may be the same or different. A three-dimensional object may have a height, a width, or a length that is, individually and independently, greater than about 0.1 millimeters, 0.5 millimeters, 1 millimeter, 2 millimeters, 5 millimeters, 10 millimeters, 20 millimeters, 30 millimeters, 40 millimeters, 50 millimeters, 60 millimeters, 70 millimeters, 80 millimeters, 90 millimeters, 100 millimeters, 200 millimeters, 300 millimeters, 400 millimeters, 500 millimeters, 600 millimeters, 700 millimeters, 800 millimeters, 900 millimeters, 1 meter, or more. A three-dimensional object may have a height greater than about 20 millimeters, 50 millimeters, 100 millimeters, 200 millimeters, 300 millimeters, 400 millimeters, 500 millimeters, 600 millimeters, 700 millimeters, 800 millimeters, 900 millimeters, 1 meter, 2 meters, 3 meters, 5 meters, 10 meters, or more. A three-dimensional object may have a width greater than about 20 millimeters, 50 millimeters, 100 millimeters, 200 millimeters, 300 millimeters, 400 millimeters, 500 millimeters, 600 millimeters, 700 millimeters, 800 millimeters, 900 millimeters, 1 meter, 2 meters, 3 meters, 5 meters, or 10 meters. A three-dimensional object may have a length greater than about 20 millimeters, 50 millimeters, 100 millimeters, 200 millimeters, 300 millimeters, 400 millimeters, 500 millimeters, 600 millimeters, 700 millimeters, 800 millimeters, 900 millimeters, 1 meter, 2 meters, 3 meters, 5 meters, or 10 meters. In some cases, a three-dimensional object may have dimensions of about 1 m by 1 m by 1 m. In some cases, a three-dimensional object may have dimensions of about 500 millimeters by 500 millimeters by 500 millimeters. In some cases, a three-dimensional object may have dimensions of about 200 millimeters by 200 millimeters by 200 millimeters.

Methods

In another aspect, the present disclosure provides methods for forming a three-dimensional object. FIG. 1 illustrates a flow process of a three-dimensional printing process. In some instances, a powder bed is provided on a surface in operation 110. Next, a layer of powder material is deposited adjacent to the surface to provide deposited layer in operation 120. A binding substance is then applied to the layer of powder material in operation 130. The substrate may be cured in operation 140.

Figures 2A, 2B, 2C:
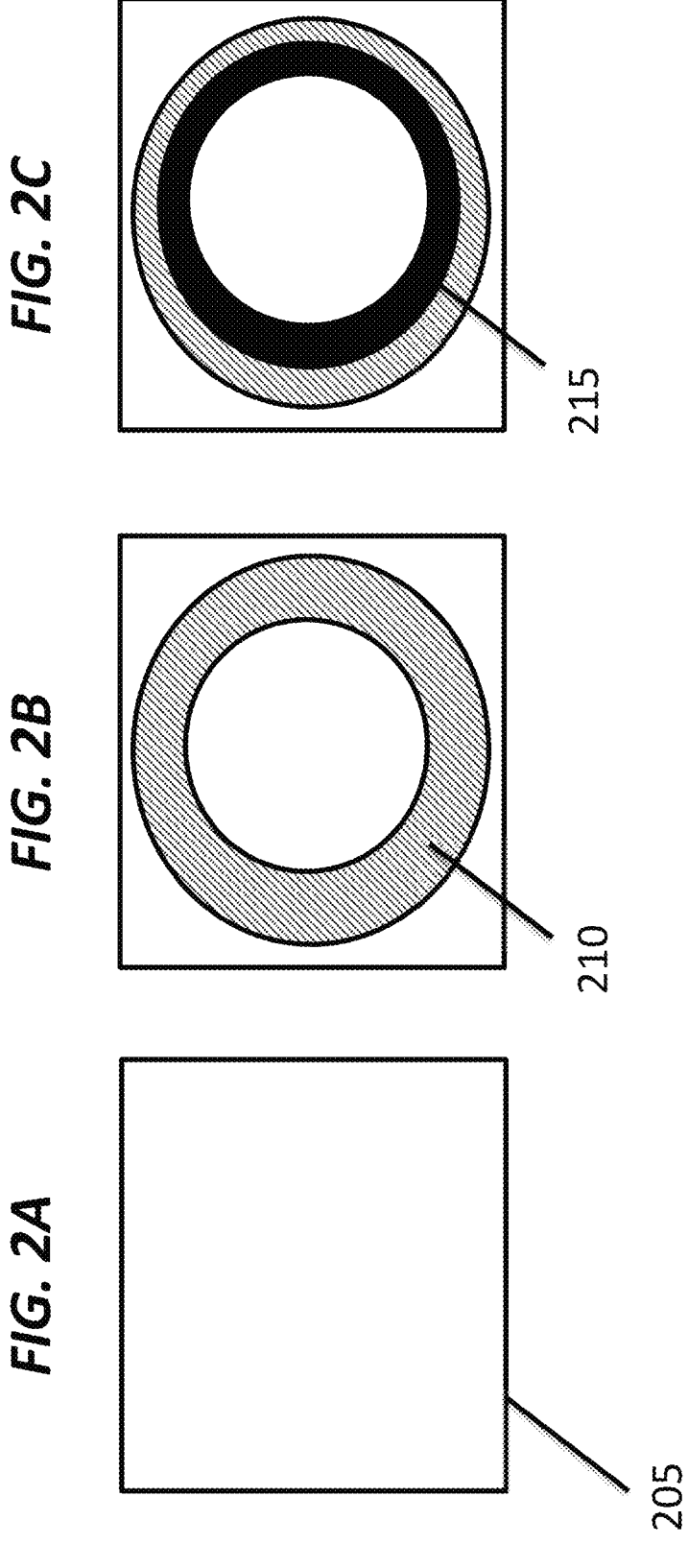
FIGS. 2A-2C schematically illustrates a method of forming a three-dimensional object.
Figures 3A, 3B, 3C, 3D:
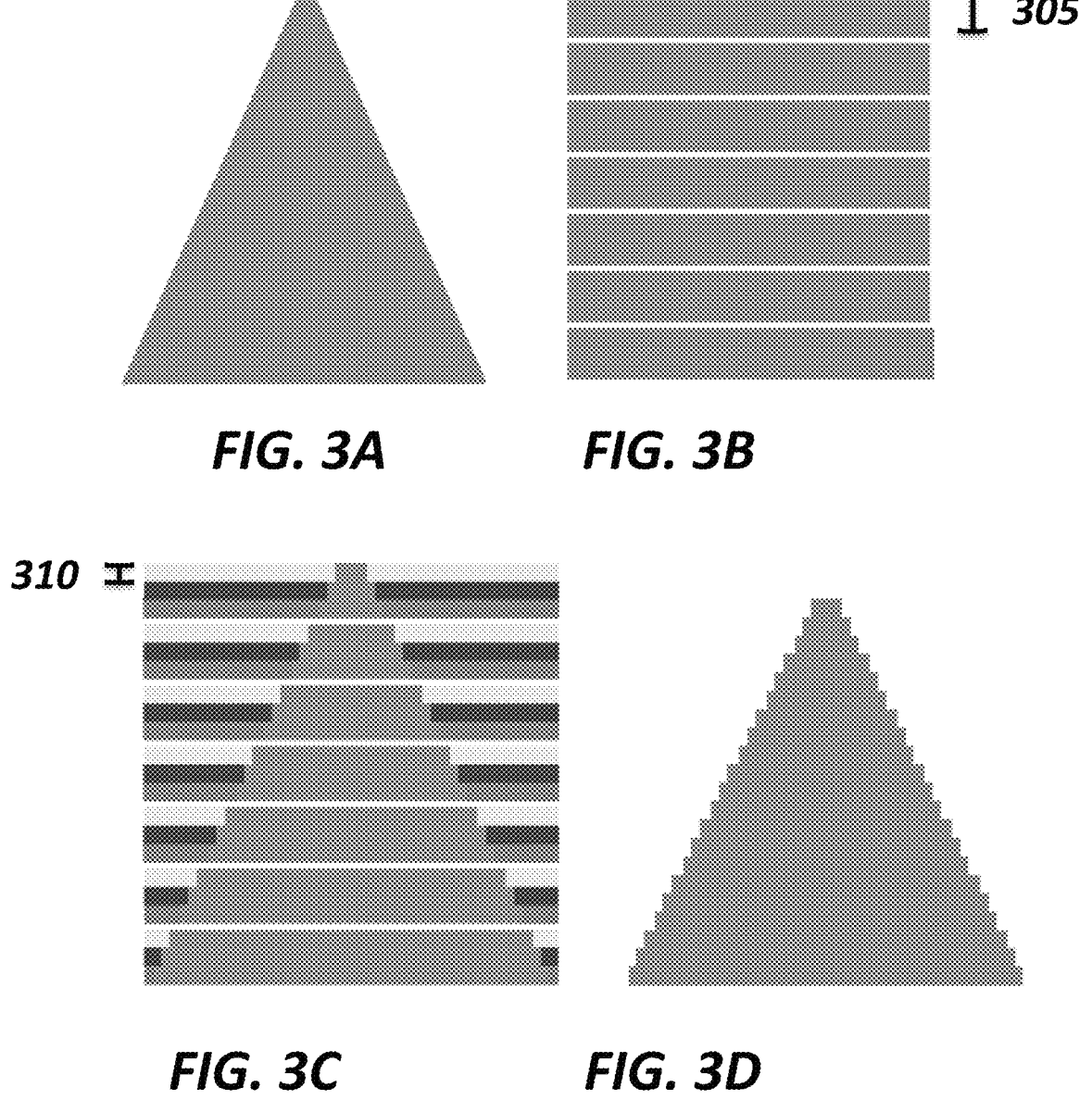
FIGS. 3A-3D schematically illustrate a method of forming a three-dimensional object using a layering technique of having a large layer thickness and a fine cutting thickness.
Figures 4A, 4B, 4C, 4D:
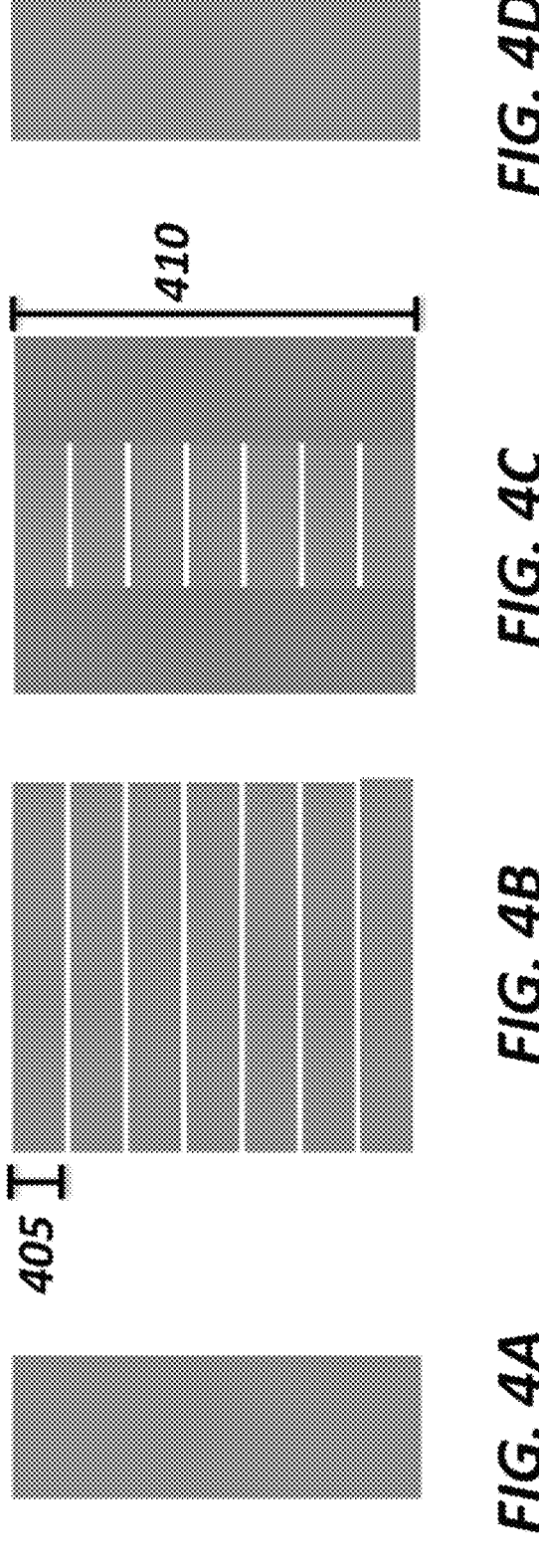
FIGS. 4A-4D schematically illustrate a method of forming a three-dimensional object using a layering technique of having a large layer thickness and a large cutting thickness.
Figures 5A, 5B, 5C, 5D:
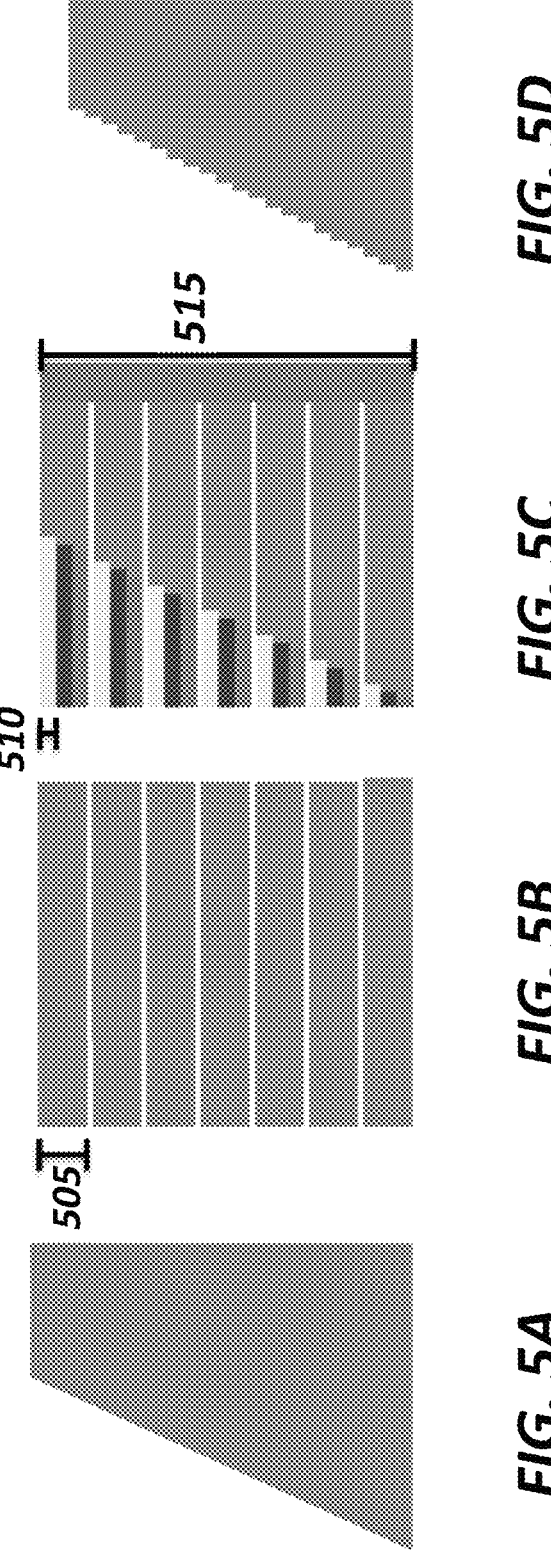
FIGS. 5A-5D schematically illustrate a method of forming a three-dimensional object using a layering technique of having a large layer thickness and a combination of fine and large cutting thicknesses.
Figures 6A, 6B, 6C, 6D:
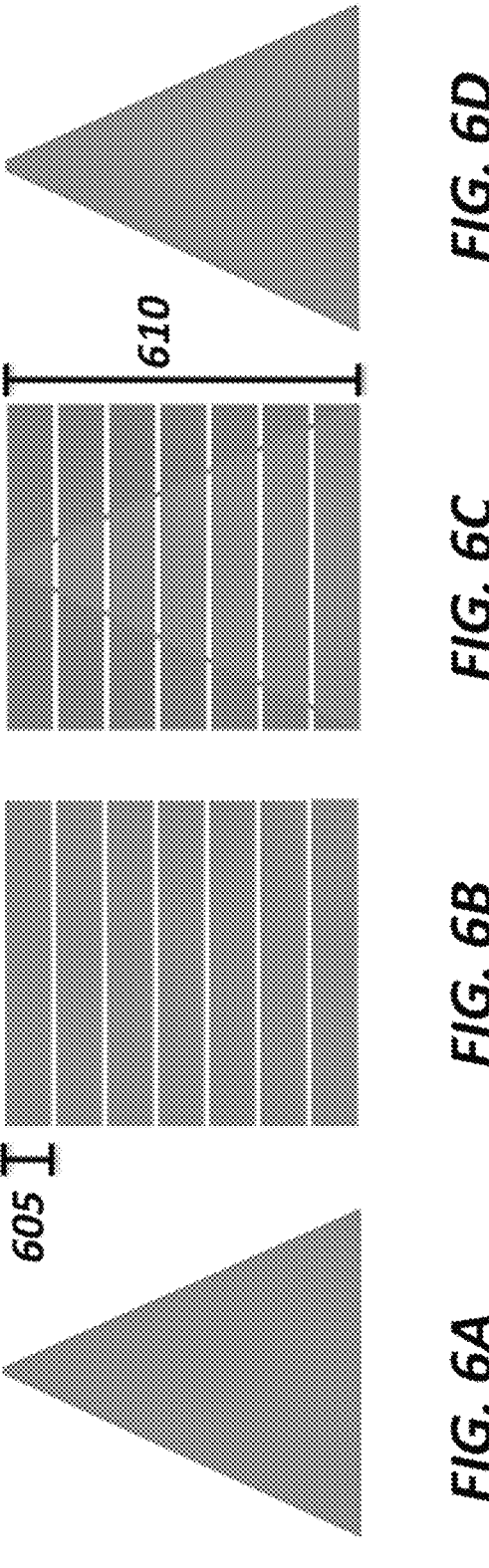
FIGS. 6A-6D schematically illustrate a method of forming a three-dimensional object using a layering technique of having a large layer thickness and a large cutting thickness using an aligned cutting pass.

FIGS. 2A-2C provide top-view schematics to illustrate a method of forming a three-dimensional object of the current disclosure. A layer of powder material 205 is provided in FIG. 2A. FIG. 2B illustrates an area 210 of the layer of powder material that has been applied with a binding substance. FIG. 2C illustrates a subsection 215 of area 210 that has been heated and cured.

A layer of powder material may be deposited onto the powder bed via a powder dispenser (or powder application unit). The powder dispenser may comprise multiple components, such as a print head or nozzle head. The powder dispenser may include a container for holding powder material. The powder dispenser may include or be coupled to other units, such as a roller for removing excess powder material from the powder bed and/or for smoothing a top surface of the powder bed.

The distance between a component of the powder dispenser and the layer of powder material on the surface may be at least 1 centimeter (cm), 5 cm, 10 cm, 20 cm, 30 cm, 40 cm, 50 cm, 60 cm, 70 cm, 80 cm, 90 cm, 1 meter (m), or more. The distance between a component of the powder dispenser and a layer of powder material may change over the course of formation of the three-dimensional object. In some cases, the distance between a component of the powder dispenser and a layer of powder material may decrease over the course of formation of the three-dimensional object.

The powder material may be stored in a reservoir or vessel of powder material. The reservoir may hold at least about 10 grams (gr), 100 gr, 200 gr, 500 gr, 750 gr, 1 kilogram (kg), 2 kg, 5 kg, 10 kg, or more of powder material.

The powder dispenser may dispense powder at an average rate of at least about 1 cubic millimeters per second ($mm^3/s$), 5 $mm^3/s$, 10 $mm^3/s$, 100 $mm^3/s$, 500 $mm^3/s$, 1000 $mm^3/s$, 2000 $mm^3/s$, 3000 $mm^3/s$, 4000 $mm^3/s$, 5000 $mm^3/s$, 6000 $mm^3/s$, 7000 $mm^3/s$, 8000 $mm^3/s$, 9000 $mm^3/s$, or 10,000 $mm^3/s$.

A layer of powder material may be smoothed after deposition onto the powder bed. A layer of powder may be deposited onto the powder bed and leveled before application of a binder. The layer may be smoothed via a roller, a blade, a knife, a gas knife or an air knife, a leveler, or any combination thereof. In some cases, a layer of powder material is smoothed by a leveler after deposition onto the powder bed. A leveler may comprise a number of materials, such as plastic, metal, metal alloys, glass, a ceramic, or any combination thereof. A system may comprise one or more levelers in a leveling system. A leveling system may comprise two levels, screws, and accuracy numbers.

A system may comprise a spreading system or a spreader that may aid in the distribution of a layer or layers powder material onto a powder bed. A system may comprise a roller bar, such as a hard anodized aluminum roller bar, that may aid in the distribution of powder material. A spreader roller may have a rotational speed that is matched or synchronized to a translational speed. The spreader roller may also comprise a vibration feature. A spreader may have high or low speeds. The speed of a spreader may depend on the function of the spreader during the process, such as higher speed for powder transit and lower speed for powder spread. The spread bar may be fabricated with specific dimensional tolerances on run-out.

A system described herein may comprise a secondary plate for building a three-dimensional object. The secondary plate may be removable. A build plate may be cooled during production. The build plate may be water or air cooled, such as from underneath the build plate or from the tank walls.

Lubricating spray may be used on a build plate, the secondary plate or on a powder bed. Lubricating spray may be Teflon spray or another non-stick spray. A lubricating spray may be used before addition of powder material onto the powder bed, such as before the first layer of powder material is deposited.

A build plate or powder bed may comprise steel, Teflon, aluminum (e.g. anodized aluminum), or other metals. A build plate or spreader may be cleaned via various methods, such as vacuum, wiping, use of an aqueous or organic solvent, with a wiper blade, use of centrifugal force, mechanical brushing, electrostatic removal, air jet removal, cloth wiping, or brush wiping. Cutting parts, such as spindles, may be cleaned before, during, or after production of a part. A trough may be filled with water or solvent and may be located close to the systems, so spindles or cutters may be cleaned during production. In some cases, spindles may be cleaned during spray or application of binder.

The system may comprise a vibrator that vibrates the powder bed. The vibrator may be used after filling the powder tank, or may be used to vibrate the powder bed after a layer or multiple layers are deposited onto the powder bed. The powder bed may be moved up and down multiple times relative to the ground. This compact the powder bed and create uniformity in packing density prior to feeding for spread.

The powder bed may be vibrated after deposition of a layer of powder material by a vibrator apparatus. The vibrator apparatus may vibrate at a frequency of at least 20 Hertz (Hz), 30 Hz, 40 Hz, 50 Hz, 60 Hz, 70 Hz, 80 Hz, 90 Hz, 100 Hz, 110 Hz, 120 Hz, 130 Hz, 140 Hz, 150 Hz, 160 Hz, 170 Hz, 180 Hz, 190 Hz, 200 Hz, 210 Hz, 220 Hz, 230 Hz, 240 Hz, 250 Hz, 260 Hz, 270 Hz, 280 Hz, 290 Hz, 300 Hz, 350 Hz, 400 Hz, 450 Hz, 500 Hz, 550 Hz, 600 Hz, 700 Hz, 800 Hz, 900 Hz, or 1000 Hz.

A binding substance may be applied to a layer of powder material via an inkjet head, an atomizing sprayer, ultrasonic atomizer, an air nebulizer, an atomizer jet nebulizer, an ultrasonic nebulizer, a compressor based nebulizer, a vibrating mesh nebulizer, large droppers, micro-droppers, piezo droppers, or any combination thereof. In some cases, a binding substance is applied via an ultrasonic nebulizer, a compressor based nebulizer, or an ultrasonic sprayer. The binding substance may be applied in a stream, in droplets, or any combination thereof.

A binding substance may be applied to a layer of powder material at a certain flow rate from a container, print head, nozzle, or pump. In some cases, a binding substance may be applied at a flow rate of less than or about 100 milliliter per second (mL/s), 90 mL/s, 80 mL/s, 70 mL/s, 60 mL/s, 50 mL/s, 40 mL/s, 30 mL/s, 20 mL/s, 10 mL/s, 9 mL/s, 8 mL/s, 7 mL/s, 6 mL/s, 5 mL/s, 4 mL/s, 3 mL/s, 2 mL/s, or 1 mL/s.

A binding substance may be applied to an area of a layer of powder material. The binding substance may be applied to an area of greater than about 1%, 5%, 10%, 20%, 30%, 40%, 50%, 60%, 70%, 80%, 90% or 99% of the surface of the powder bed. In some cases, a binding substance is applied to 5% to 90%, 10% to 80%, 30% to 70%, 40% to 60%, or 40% to 60% of the surface of the powder bed.

A stream comprising a binding substance may be applied to an area of a layer of powder material in a powder bed, wherein the stream has a first cross-sectional dimension. An energy beam may be directed to a portion of a layer of powder material, wherein the energy beam has a second cross-sectional dimension. In some embodiments, a first cross-sectional dimensional of the stream is greater than a second cross-sectional dimensional of the energy beam. A first cross-sectional dimensional can be at least 1%, 5%, 10%, 20%, 30%, 40%, 50%, 60%, 70%, 80%, 90% or 99% greater than the second cross-sectional dimensional.

The distance between a binding substance print head or nozzle head and the layer of powder material on the surface may stay constant throughout the application of a single layer of binding substance. The distance between a binding substance print head or nozzle head and the layer of powder material on the surface may differ from one application of a layer to another application of a layer of binding substance. In some cases, the distance between the print head or nozzle head and the layer of powder material decreases as the number of layers of the three-dimensional object increases. The distance between a binding substance print head or nozzle head and the layer of powder material on the surface may be at least 0.1 millimeters (mm), 0.5 mm, 1 mm, 2 mm, 5 mm, 10 mm, 50 mm, 100 mm, 200 mm, 300 mm, 400 mm, 500 mm, 600 mm, 700 mm, 800 mm, 900 mm, 1000 mm, or more.

When a layer of powder material is cured, only a subsection of the area to which a binding substance had been applied may be cured. A subsection of the area to which a binding substance had been applied to may be at most about 99%, 95%, 90%, 80%, 70%, 60%, 50%, 40%, 30%, 20%, or 10% of the area. A subsection of an area may be less than about 100, 99%, 95%, 90%, 80%, 70%, 60%, 50%, 40%, 30%, 20%, or 10% of the area. A subsection of an area may be more than about 10%, 20%, 30%, 40%, 50%, 60%, 70%, 80%, 90% or 99% of the area, but may not be 100% of the area. The subsection of an area that is cured may be less than the area itself. In some cases, the subsection of the area is cured, wherein the subsection is less than 100% of the area. In some cases, the subsection is less than 90%, 80%, 70%, 60%, or 50% of the area.

A first layer of powder material may be dried or cured prior to deposition of a second layer of powder material. The first layer of powder material may be dried or cured via a method of removing moisture, such as using a quartz tube heater, a convection method, freeze drying, absorption, osmosis, capillary action, induction heating, microwave, or infrared. A cooling system, such as a fan, may be used to dissipate heat from a quartz tube heater.

A source of heat, electromagnetic radiation, or resistive heating element may be used to cure a subsection of an area of powder material after a binding substance has been applied. A laser, an oven, a furnace, energy beam, electron beam, a lamp, a heating rod, a radiator, or any combination thereof, may be used to cure a powder material. In some cases, the source of heat used to cure an area of powder material is a laser or a heating rod. In situations in which the source of heat is optical, the source of heat may provide energy to the powder bed directly or through the use of one or more optics (e.g., mirror(s), lens(es), etc.).

A source of energy may be a laser or a plurality of lasers. The plurality of lasers may be part of a laser array. The laser may provide the energy source to the powder bed directly or through the use of one or more optics (e.g., mirror(s), lens(es), etc.). In some cases, a laser can provide light energy at a wavelength of at least 100 nanometers (nm), 500 nm 1000 nm, 1010 nm, 1020 nm, 1030 nm, 1040 nm, 1050 nm, 1060 nm, 1070 nm, 1080 nm, 1090 nm, 1100 nm, 1200 nm, 1500 nm, 1600 nm 1700 nm, 1800 nm, 1900 nm, or 2000 nm.

The source of energy may be applied to the layer of powder material at a temperature of atmospheric temperature or elevated temperature. After binding substance is applied to a layer of powder material, the layer of the three-dimensional object may be cured by an energy source at a temperature of at least about 25° C., 30° C., 40° C., 50° C., 60° C., 70° C., 80° C., 90° C., 100° C., 110° C., 120° C., 130° C., 140° C., 150° C., 160° C., 170° C., 180° C., 190° C., 200° C., 300° C., 400° C., 500° C., 600° C., 700° C., 800° C., 900° C., 1000° C., 1100° C., 1200° C., 1300° C., 1400° C., 1500° C., 1600° C., 1700° C., 1800° C., 1900° C., or 2000° C. A layer be cured at a temperature of greater than 25° C., 30° C., 40° C., 50° C., 60° C., 70° C., 80° C., 90° C., 100° C., 110° C., 120° C., 130° C., 140° C., 150° C., 160° C., 170° C., 180° C., 190° C., 200° C., 300° C., 400° C., 500° C., 600° C., 700° C., 800° C., 900° C., 1000° C., 1100° C., 1200° C., 1300° C., 1400° C., 1500° C., 1600° C., 1700° C., 1800° C., 1900° C., or 2000° C. A layer may be cured at a temperature from 25° C. to 1000° C., from 50° C. to 500° C., from 70° C. to 200° C., from 100° C. to 150° C. A three-dimensional object may be cured at a temperature from 25° C. to 1000° C., from 10° C. to 700° C., from 100° C. to 600° C., from 300° C. to 500° C.

A rise in temperature may be sufficient to transform two or more particles of powder material into a molten state. The powder may remain molten for at least 1 femtosecond, 50 femtoseconds, 100 femtoseconds, or more.

A system may comprise linear actuators that may aid in preventing powder material from contaminating into the motion system. The linear actuators may be fully enclosed. The system may comprise ball-bearing motion systems. The system may comprise non-ball-bearing motion systems that may allow for powder contamination without jamming the rail system. The bearing system may ensure planarity of cutters with the main plate. The system may ensure perpendicularity, or a 90 degree angle, with a stage.

A system may comprise a lift system. The system may comprise a stage lift system. In some cases, a three-dimensional object may be built on a platform. The vertical level, or height of the platform relative to the ground, may be adjustable. For example, the platform may include an elevator or lift that moves as the part is being built layer by layer. In some cases, a system may comprise a secondary stage. The secondary stage may decrease production time of multiple parts.

After a layer of powder material is applied, a tool may be used to define a perimeter in the layer that may be in accordance to the model object. A tool may also move over the area around the defined powder area and form certain marks, such as hatch marks. The hatch marks may not be a part of the model object. The hatch marks may aid in the removal of the green part from the powder bed after the green part is complete. In some cases, hatch marks, or hatching, may be used for the first layer of the object instead of a layer of powder material that is not cut. Hatching the first layer of powder may add in the removal of the green part from the powder bed.

A part may be removed from the powder bed from the bottom. In some cases, a sunlight algorithm may be used. The sunlight algorithm may comprise cutting the largest diameter of the part in most layers, or all layers, of the part. For example, a part desired to be formed may be a sphere, the part may comprise 100 layers, and the widest dimension of the sphere (i.e. the diameter) is 1 meter. In this example, the first layer of the part may be a circle with diameter of 0.1 mm. In this example, after the binder material is sprayed onto the first layer of powder material, a circle with a diameter of 0.1 mm may be cut, corresponding to the desired dimensions of the finished part. In this example, in addition to that first cut, a second circle may also be cut in the first layer with a diameter of 1 m, corresponding to the widest dimension of the sphere (i.e. the diameter). This method or algorithm may be called the sunlight algorithm. The sunlight algorithm may comprise cutting the largest diameter of the part in at least about 10%, 20%, 30%, 40%, 50%, 60%, 70%, 80%, 90%, or 100% of the layers. The sunlight algorithm may comprise cutting the largest diameter of the part in at least the bottom half of the part lower than the layer with the largest dimension of the part. In some cases, the largest dimension of the part may be in the bottom 25%, middle, or top 75% of the part, relative to the powder bed. When the sunlight method is used, the part may be removed from the bottom of the bed.

In some cases, the reverse sunlight method or algorithm may be used. When the reverse sunlight method is used, the part may be removed from the top of the bed.

The green part may be lifted above the powder bed to separate the green part from the rest of the unbound powder material. Alternatively, the green part may be lowered from the stage lift when being separated from the unbound powder material.

A three-dimensional object may be removed or separated from the powder bed once a desired or predetermined number of layers of powder material has been formed. The object may simply be removed by hand. The object may also be isolated by removal of the loose, unbound powder material in the powder bed. Hatch cuts may also be used when forming the three-dimensional object to ease removal of the object after completion of the desired number of layers. Some of the powder bed may be caked, where excess binder has been sprayed but is not part of the desired finished product. Hatch cuts, or grooves, or other markings may ease separation of unwanted powder material. An algorithm may be used to determine an ideal method for removal of the three-dimensional object or objects from the powder bed.

Various types of cuts may be made into a layer or layers of powder material. Contour, hatch boundaries, hatch regions, or hatch marks may be used during formation of a part. The cuts may be made from closer to the part of farther away from the part and nearer the edge of the powder bed. Alternatively, the cuts may be made starting from the edge of the powder bed and moving towards the center of the powder bed and closer to the part.

Parting lines may be taken into consideration when designing the layout of the three-dimensional object. Cap regions may be used for parting lines.

A system may comprise a linear actuator, wherein the actuator may be stepper motor controlled or DC motor controlled.

The system may comprise feedback control of motion systems. The system may comprise an arduino or a microcontroller for feedback. The system may comprise a capacitive feedback for various measurements during production, such as binder level. The system may comprise a sensor, such as an infrared (IR) sensor, to detect and obtain various measurements during production. An IR sensor may be used to monitor temperature. In some cases, the system may be set so that application of powder material or binder only initializes during a set temperature range. If the temperature of the system is lower than the desired temperature, the temperature may be raised, such as by heating via ultrasonic methods. If the temperature of the system is higher than the desired temperature, the temperature may be lowered, such as by cooling via a fan car passive cooling or water cooling or any combination thereof. The system may comprise a humidity sensor. The system may comprise a camera to monitor various measurements during production. The camera may be connected to an image processing system, wherein the system detects defects during the methods. The system may also comprise information software that allows a user to review measurements before, during, or after the building process, such as after a layer of powder material is deposited or after a layer has been sprayed with binder material.

Covers, such as a bellows, may be used to cover or protect certain parts of the system. A bellows may be used on the actuator lead screw, or on the guide rails and slides to prevent powder contamination and jamming.

Access to all four walls of a system may allow for ease of access to all levels of the machine or system, such as the upper level or lower level, and may ease in the maintenance, modification, and upgrade processes to the system. E-chains may be used in a system, and may aid in the protection and organization of wires, and may prevent wear on the wires and other parts. Cables of the system, such as USB cables and ethernet cables, may be protected or shielded.

A layer of the three-dimensional object may be formed or partially formed inside a confined space, or in a container. The confined space may comprise hydrogen, nitrogen, argon, oxygen, carbon dioxide, or any combination thereof. In some cases, the level of oxygen in the confined space may less than 100,000 parts per million (ppm), 10,000 ppm, 1000 ppm, 500 ppm, 400 ppm, 200 ppm, 100 ppm. 50 ppm, 10 ppm, 5 ppm, or 1 ppm. The confined space may comprise water vapor. The amount of water in the confined space may be less than 100,000 parts per million, 10,000 ppm, 1000 ppm, 500 ppm, 400 ppm, 200 ppm, 100 ppm, 50 ppm, 10 ppm, 5 ppm, or 1 ppm. The three-dimensional object may be formed or partially formed while exposed to the atmosphere. The atmosphere may comprise hydrogen, nitrogen, argon, oxygen, carbon dioxide, or any combination thereof.

A three-dimensional object may be cured to allow infusion of a metal or a metal alloy. The infusion of a three-dimensional object may be with stainless steel, bronze, steel, gold, nickel, nickel steel, aluminum, titanium, or other transition metals or metal alloys.

A three-dimensional object may be cured at least once during the formation of the object. A three-dimensional object may be cured at least 2 times, 3 times, 4 times, 5 times, 6 times, 7 times, 8 times, 9 times, 10 times, 50 times, 100 times, 200 times, 500 times, 700 times, 1000 times, or more during the formation of the object. A three-dimensional object may be cured 1 to 1000 times, 10 to 700 times, 100 to 500 times, or 200 to 400 times during the formation of the object. A three-dimensional object may be cured 10 to 1000 times, 100 to 700 times, 200 to 600 times, or 300 to 500 times during the formation of the object.

A layer of powder material of the three-dimensional object may be cured for a period of time that is greater than about 0.1 seconds, 1 second, 10 seconds, 20 seconds, 30 seconds, 1 minute, 2 minutes, 3 minutes, 4 minutes, 5 minutes, 6 minutes, 7 minutes, 8 minutes, 9 minutes, 10 minutes 30 minutes, 1 hour, 2 hours, 5 hours, 10 hours, 20 hours, 30 hours, 40 hours, 50 hours, 100 hours, or more. A layer of powder material of the three-dimensional object may be cured for a period of time from 1 second to 10 hours, 20 seconds to 5 hours, 30 seconds to 3 hours, 1 minute to 1 hour, 2 minutes to 30 minutes, or 3 minutes to 10 minutes.

A three-dimensional object may be cured for a period of time that is greater than about 1 second, 10 seconds, 30 seconds, 1 minute, 2 minutes, 3 minutes, 4 minutes, 5 minutes, 6 minutes, 7 minutes, 8 minutes, 9 minutes, 10 minutes 30 minutes, 1 hour, 2 hours, 5 hours, 10 hours, 20 hours, 24 hours, 30 hours, 40 hours, 50 hours, 100 hours, 200 hours, 300 hours, 400 hours, 500 hours, or more. A three-dimensional object may be cured for a period of time from 1 minute to 100 hours, 30 minutes to 50 hours, 1 hour to 30 hours, or 2 hours to 24 hours.

A layer of powder material may be cured for a period of time greater than 10 seconds at a temperature greater than 25° C., greater than 30 seconds at a temperature greater than 30° C., greater than 1 minute at a temperature greater than 50° C., greater than 2 minutes at a temperature greater than 100° C., greater than 30 minutes at a temperature greater than 200° C., greater than 1 hour at a temperature greater than 300° C., greater than 2 hours at a temperature greater than 400° C., or greater than 3 hours at a temperature greater than 500° C.

After the desired number of layers of powder material has been deposited onto the powder bed, the object may be considered a green part. The green part may be removed or separated from the excess powder material prior to a heating or curing process in an oven or furnace. This may be performed in a cleaning unit, as described elsewhere herein. The green part may also be heated or cured in a heating unit, such as, for example, an oven or furnace. Such heating may sinter or melt individual particles of the green part to yield a three-dimensional object.

The green part may be separated from the excess powder material in a de-humidified environment, or an environment where the humidity level is controlled to a desired humidity level. The green part may be separated from excess powder or the powder bed with a tool, such as a wire, floss, or other tools. The green part may be separated from excess powder or the powder bed via other mechanical mechanisms, such as vibration or tapping. The green part may be separated from excess powder or the powder bed manually, such as by lifting the cake and having the parts fall through the excess powder. Alternatively, the parts may be lifted above the cake and excess powder bed. A vacuum may be used to remove excess, unbounded powder material from the bed. A vacuum may also assist in lifting or removing the part from the powder bed.

Tapping or vibration of the powder bed may be used to remove the part from the powder bed, and may be automated. Soft foam or risers may be used to remove the part from the powder bed.

A green part may undergo an operation of processing prior to curing. A green part may be polished, sanded, abraded, buffed, tumbled, machined, finished, or coated with a finish prior to curing. The green part may be processed using an abrasive media, such as polishing paper, sand paper, filer, cutter, grinder, rotary tool, or other tools. A green part may be polished via mechanical tumbling, rotary, vibrational, electropolishing, or magnetic tumbling. The surface finish and general look of the green part may be improved during this additional operation of processing prior to curing.

A three-dimensional object may be polished, buffed, tumbled, machined, finished, or coated with a finish after curing. The object may be coated with paint, a metal polish, a gold polish, a silver polish, or any combination thereof. The object may be polished, buffed, finished, or coated at least 1 time, 2 times, 3 times, 5 times, or more. A part may be coated with diamond-like carbon coating, black oxide, black nitride, or other coatings.

A three-dimensional object may be formed in a period of at least about 1 minute, 2 minutes, 3 minutes, 4 minutes, 5 minutes, 6 minutes, 7 minutes, 8 minutes, 9 minutes, 10 minutes 30 minutes, 1 hour, 2 hours, 3 hours, 4 hours, 5 hours, 10 hours, 20 hours, 30 hours, 40 hours, 50 hours, 75 hours, 4 days, 5 days, 1 week, 2 weeks, 3 weeks, or 4 weeks. A three-dimensional object may be formed in a period of 1 minute to 50 hours, 30 minutes to 30 hours, 1 hour to 20 hours, 2 hours to 10 hours, or 3 hours to 10 hours.

A three-dimensional object may be formed in a period of time of at most about 1 year, 6 months, 5 months, 4 months, 3 months, 2 months, 1 month, 2 weeks, 1 week, 6 days, 5 days, 4 days, 3 days, 2 days, 24 hours, 20 hours, 10 hours, 9 hours, 8 hours, 7 hours, 6 hours, 5 hours, 4 hours, 3 hours, 2 hours, 1 hour, 30 minutes, 20 minutes, 10 minutes, or less. A three-dimensional object may be formed in a period of time of at most about 8 hours. A three-dimensional object may be formed in a period of time of at most about 7 hours. A three-dimensional object may be formed in a period of time of at most about 6 hours. A three-dimensional object may be formed in a period of time of at most about 5 hours. A three-dimensional object may be formed in a period of time of at most about 4 hours. A three-dimensional object may be formed in a period of time of at most about 3 hours. In such time periods, multiple 3D objects may be formed sequentially or simultaneously. For example, multiple 3D objects may be formed simultaneously in the same powder bed in a period of at most 24 hours, 20 hours, 10 hours, 9 hours, 8 hours, 7 hours, 6 hours, 5 hours, 4 hours, 3 hours, 2 hours, 1 hour, 30 minutes, 20 minutes, 10 minutes, or less.

The time necessary to form a layer of powder material of a three-dimensional object may be at least about 1 second, 5 seconds, 10 seconds, 20 seconds, 30 seconds, 1 minute, 2 minutes, 3 minutes 4 minutes, 5 minutes, 10 minutes, 20 minutes, 30 minutes, 1 hour, or more. The time necessary to form a layer of powder material may be less than about 10 hours, 9 hours, 8 hours, 7 hours, 6 hours, 5 hours, 4 hours, 3 hours, 2 hours, 1 hour, 30 minutes, 20 minutes, 10 minutes, 9 minutes, 8 minutes, 7 minutes, 6 minutes, 5 minutes, 4 minutes, 3 minutes, 2 minutes, 1 minute, or less.

In some cases, the printing process, including application of layers of powder material and subsequent curing of each layer, may occupy a period of time that is greater than about 30 seconds, 1 minute, 2 minutes, 3 minutes, 4 minutes, 5 minutes, 6 minutes, 7 minutes, 8 minutes, 9 minutes, 10 minutes 30 minutes, 1 hour, 2 hours, 5 hours, 10 hours, 20 hours, 30 hours, 40 hours, 50 hours, 100 hours, or more. The printing process may take an amount of time from 30 seconds to 10 hours, 1 minute to 10 hours, 2 minutes to 5 hours, or 3 minutes to 3 hours.

A computer system or controller may be used in a method of the current disclosure to design a model of a three-dimensional object, to deposit a layer of powder material, to level a layer of powder material, to cure a layer of powder material, or any combination thereof. A computer system may be pre-programmed with information before the formation of the object. A model design may be generated prior to the beginning of formation of the three-dimensional object, or the model design may be generated in real time (i.e., during the process of formation of the three-dimensional object). The model design may be generated on a computer.

A model design may be used to determine the area or subsection of area or powder material that is to be applied with binding substance.

In some cases, the three-dimensional object formed may have a deviation from the dimensions of the model design.

The deviation of the three-dimensional object formed and the model design may be at most 1 cm, 9 mm, 8 mm, 7 mm, 6 mm, 5 mm, 4 mm, 3 mm, 2 mm, 1 mm, 90 micrometers, 80 micrometers, 70 micrometers, 60 micrometers, 50 micrometers, 40 micrometers, 30 micrometers, 20 microm- eters, 10 micrometers, 5 micrometers, or less.

Deviation may be present between the three-dimensional object formed and the model design. An individual part of the three-dimensional object may deviate from a corre- sponding part of the model design by at least about 0.1%, 1%, 2%, 3%, 4%, 5%, 10%, 20%, 30%, 40%, 50%, 60%, 70%, 80%, 90% or 99%.

In some cases, the binding material is applied in accor- dance with a model design of the 3D object. The nozzle from which the binding substance is applied may deposit the binding substance in a spray or stream. The spread or stream may have a spread that may be characterized by a spot size. The spot size may be greater than a corresponding dimen- sion of the model design. In some cases, the spray or stream has a full width at half maximum that is greater than a corresponding dimension of the model design. In some examples, the spray or stream applies the binding substance to a greater area of the powder bed as compared to the corresponding dimension of the model design.

In some cases, a first area of a layer of powdered material is applied with a binding substance. The first area may deviate from the corresponding portion of the model design of the three-dimensional object, where the first area is at least 0.1%, 1%, 2%, 3%, 4%, 5%, 10%, 20%, 30%, 40%, 50%, 60%, 70%, 80%, 90%, 99%, or larger than the corre- sponding portion of the model design. In some cases, the deviation is 1% to 90%, 5% to 80%, 10% to 70%, 20% to 60%, or 30% to 50%.

The model design may comprise 1 to 1000 cross-sections (or slices), 10 to 700 cross-sections, 100 to 500 cross- sections, or 200 to 400 cross-sections of the object. The model design may comprise 10 to 1000 cross-sections, 100 to 700 cross-sections, 200 to 600 cross-sections, or 300 to 500 cross-sections of the three-dimensional object. The model design may include at least 1, 2, 3, 4, 5, 6, 7, 8, 9, 10, 100, 1000, 10,000, 50,000, or 100,000 cross-sections. Such cross-sections (or slices) may be generated by 3D printing software.

The heating of a subsection of an area may comprise sintering of individual particles of the powder material. The heating of a subsection of an area may not comprise sinter- ing of individual particles of the powder material.

After a subsection of an area of a layer of powder material is cured, the unbounded powder material may be dispersed from the bounded powder material. The unbounded powder material may be dispersed by removal of the unbounded powder, by a vacuum, by suction, by dusting, by shaking of the surface that comprises the powder bed, by shaking of the container than comprises the powder bed, or any combina- tion thereof.

In some cases, the subsection of an area of a layer of powder material that corresponds to the model design of the corresponding cross-section is not cured. In some cases, the perimeter of the subsection is generated mechanically, gen- erated with an air knife, generated with a knife, heated, burned, decompose, or otherwise removed. In one aspect, the present disclosure provides a method for forming a three-dimensional object, comprising: providing a surface comprising a powder bed comprising powder material; applying a first binding substance to a first area of a first layer of powder material of the powder bed; generating one or more perimeters of the first layer of powder material via one or more cutting passes, wherein the one or more perimeters of the first layer is in accordance to a model design of the three-dimensional object; depositing a second layer of powder material adjacent to the first layer of powder material in the container; applying a second binding sub- stance to a second area of a second layer of powder material of the powder bed; and generating one or more perimeters of the second layer of powder material via one or more cutting passes, wherein the one or more perimeters of the second layer is in accordance to a model design of the three- dimensional object. In some cases, the method of forming the three-dimensional object may comprise one cutting pass. The method may comprise two, three, four, five, or more cutting passes.

In some cases, the entire perimeter of a first layer of powder material is formed by one cutting pass. In some cases, the entire perimeter of a first layer of powder material is generated by one or more cutting passes. In some cases, the entire perimeter of a second layer of powder material is formed by one cutting pass. In some cases, the entire perimeter of a second layer of powder material is generated by two or more cutting passes.

In some cases, the entire perimeter of a first layer and a second layer is generated by one cutting pass. In some cases, the entire perimeter of a first layer and a second layer is generated by two or more cutting passes. In some cases, at least a part of a perimeter of a first layer is generated by one cutting pass. In some cases, at least a part of a perimeter of more than one layer is generated by a single cutting pass. In some cases, at least a part of a perimeter of more than one layer is generated by one or more cutting passes.

FIGS. 3A-3D illustrate a method of forming a three- dimensional object using a layering technique of having a large layer thickness and a fine cutting thickness. To form the object of FIG. 3A, multiple layers of powder material with a large layer thickness 305 of FIG. 3B may be applied. Multiple, fine cutting passes with a cutting thickness 310 of FIG. 3C may be made to generate a high resolution final part FIG. 3D.

FIGS. 4A-4D illustrate a method of forming a three- dimensional object using a layering technique of having a large layer thickness and a large cutting thickness. To form the object of FIG. 4A, multiple layers of powder material with a large layer thickness 405 of FIG. 4B may be applied. One cutting passes with a cutting thickness 410 of FIG. 4C may be made to generate a the final part FIG. 4D.

FIGS. 5A-5D schematically illustrate a method of form- ing a three-dimensional object using a layering technique of having a large layer thickness and a combination of fine and large cutting thicknesses. To form the object of FIG. 5A, multiple layers of powder material with a large layer thick- ness 505 of FIG. 5B may be applied. Multiple, fine cutting passes with a cutting thickness 510 and one large cutting pass with a cutting thickness 515 of FIG. 5C may be made to generate a the final part FIG. 5D.

Formation of a three-dimensional object may involve fine cutting passes and may also involve large, or coarse, cutting passes. A large cut, or a coarse cut, may define a perimeter of a layer or object that is not in accordance with a model design of the three-dimensional object in computer memory. The larger cut, or the coarser cut, may define a perimeter that is larger or wider in size and shape than the model design of the three-dimensional object. This may contribute to a faster or more efficient production time.

A software algorithm may be used to determine the optimal cutting and generation of a perimeter to optimize the time, resources, and materials needed for the production of a particular three-dimensional object. The algorithm may identify a coarse cut to enable the largest dimension of a part to be removed from the powder bed. If a part is asymmetric in shape, the sum average of the longest dimensions may be used to determine the ideal coarse cut to remove the object from the powder bed.

A perimeter of a layer of powder material may be generated mechanically. In some cases, a perimeter may be generated with a multi-axis (e.g., 2, 3, 4, or 5-axis) machine tool, a Computer Numeric Control (CNC) spindle, a cutting tool bit, a DC motor, a blade, or any combination thereof. A brushed direct current (DC) motor or brushless DC motor may be used. A perimeter may be generated with a cutter. The cutter may be a contact cutter. The contact cutter may be a knife. A perimeter may be generated with a non-contact cutter. The non-contact cutter may be a laser. A cutter may be a spindle.

A cutter may be a CNC cutter. For example, the cutter may be an end mill or grinding tool. An end mill may be a square end mill, keyway end mill, ball end mill, roughing end mill, corner radius end mill, roughing and finishing end mill, corner rounding end mill, drill mill, or tapered end mill. An end mill may have a single flute, two flutes, three flutes, four flutes, or multiple flutes. The material of the cutter may be, for example, high speed steel, carbon steel, cobalt, powdered metal, solid carbide, polycrystalline diamond or a combination thereof. The cutter may have a coating or finish, for example, titanium nitride, titanium carbonitride, titanium aluminum nitride, aluminum nitride, zirconium nitride, or a combination thereof.

In some cases, a CNC spindle may have a spindle runout. The spindle may have a rotation inaccuracy where the spindle is no longer completely aligned with the main axis. The spindle may have an axial or radial runout. A spindle runout measurement may be used, such as a dial indicator or a non-contact sensor. A spindle runout measurement may be used to detect and prevent defects when runout is present.

The machine tool may be multi-axis robot. The machine tool may be movable relative to a support on which the three-dimensional object is generated. As an alternative, the support may be movable and the machine tool may be stationary. As another alternative, both the machine tool and the support may be movable relative to each other, such as along multiple axes.

Supports may be used in the printer to aid in the formation of a part. In some cases, horizontal supports, or a support that is parallel to the powder bed, may be used. Alternatively, vertical supports, or a support that is perpendicular to the powder bed, may be used.

A CNC spindle may rotate at a certain speed that may be dependent on the desired cutting properties. In some embodiments, a cutting tool or a CNC spindle may have a rotation per minute (rpm) of at least about 500 rpm, 1,000 rpm, 10,000 rpm, 50,000 rpm, 75,000 rpm or 100,000 rpm. The frequency of rotation around a fixed axis may be from about 500 rpm to 100,000 rpm, about 1,000 to 75,000 rpm, or about 10,000 rpm to 50,000 rpm.

The spindle or cutter may be used on the spindle axis, such as the "W" axis. The spindle or cutters may be kept within a certain distance to planarity. The spindle may be kept less than about 0.1 inch, 0.01 inch, or 0.001 inch of planarity relative to the powder bed. The spindle may have a runout of less than about 0.1 inch, 0.01 inch, 0.005 inch, or 0.001 inches. A system may comprise multiple spindles, and each spindle may have the same or similar runouts. In some cases, each spindle of a system comprising multiple spindles may have different runouts. A spindle may be connected to a brake lock system. The runout may be offset, such as a geometric offset, from the surface. The brake lock system may keep the spindle or other parts from dropping onto the powder bed in an event of an emergency stop. The brake lock system may be part of the hardware implementation of the system.

A CNC spindle or cutter may be used to cut or define a perimeter of a single layer of powder or multiple layers of powder material. A CNC spindle or cutter may be used to cut or define a perimeter of a single layer of powder material or multiple layers of powder material that has been cured or hardened. A CNC spindle or cutter may be used to cut a solid block of material, such as a block of metal. A spindle or cutter may not require additional force necessary to cut or define a perimeter of powder material or a solid block of material.

The cutting tools of an apparatus may be changed manually or may be changed with an automatic tool changer. In some cases, an object may utilize multiple cutting tools to speed up the printing process. The tool holder may be of different sizes. In some cases, a tool holder may be at least 0.01 inches, 0.1 inches, 0.2 inches, 0.25 inches, 0.5 inches, 0.75 inches, 1 inch, 2 inches, 3 inches, 4 inches, 5 inches, 6 inches, 7 inches, 8 inches, 9 inches, 10 inches, or more in length. In some cases, a tool holder may be at least 1 inch, 2 inches, 3 inches, 4 inches, 5 inches, 6 inches, 7 inches, 8 inches, 9 inches, 10 inches, or more in diameter.

Figure 33:
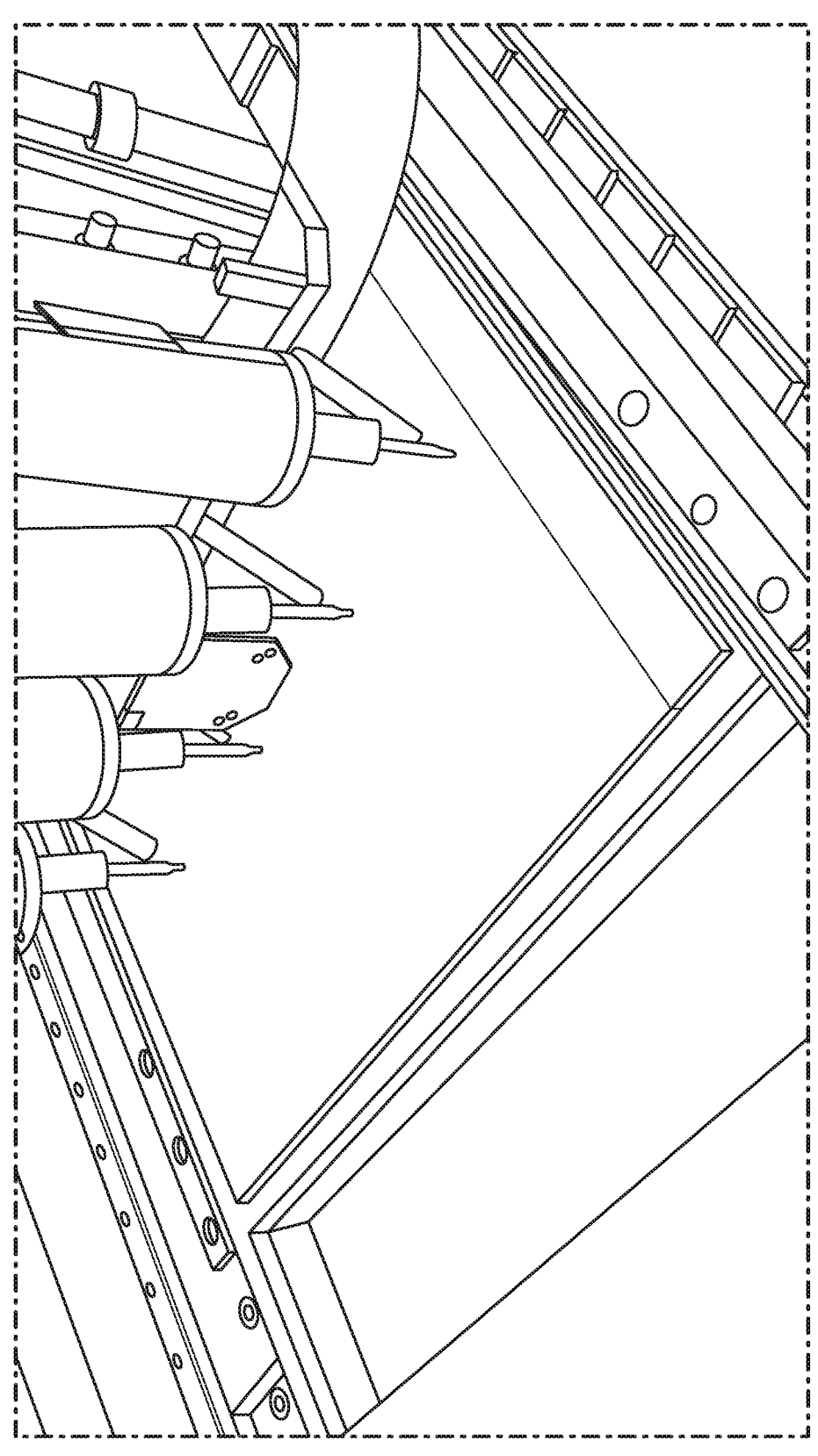
FIG. 33 illustrates a configuration of multiple spindles used for a single powder bed.

Cutting tools may use custom tools, shorter tools, various diameter tools, coated tools, uncoated tools, or tools with various geometries. Cutting tools may have locating pins for ease of changing the tools during production. Different spindles may be used on different portions of a three-dimensional object during formation of the object. The spindles may use non-rotating cutting mechanisms. The spindles may use rotating cutting mechanisms. A spindle may be brushless. In some cases, only 1 spindle is used for one powder bed. In some cases, multiple spindles are used for one powder bed. In some cases, an object may utilize at least 1, 2, 3, 4, 5, 6, 7, 8, or more cutting tools (e.g., spindles) to speed up the printing process. FIG. 33 illustrates an example in which multiple spindles are used for a single powder bed. A setup for one powder bed may comprise 1, 2, 3, 4, 5, 6, 7, 8 or more cutting tools (e.g., spindles) wherein at least 1, 2, 3, 4, 5, 6, 7, 8, or more cutting tools are used simultaneously to form at least 1, 2, 3, 4, 5, 6, 7, 8, or more three-dimensional objects. In some cases, the multiple parts that are formed in a single powder bed may be adjacent to each other and share a horizontal plane. In some cases, the multiple parts that are formed in a single powder bed may be stacked on top of each other, sharing a vertical plane perpendicular to the powder bed.

An automatic tool changer may be programed automatically change out the cutting tools based on the parameters set and/or the specifications of the desired printed object. Each spindle may have an individual on/off control. There may be one, two, three, four, or more on/off controls for the one or more spindles in a system. Spindles may be grouped individually or with other spindles to be connected to one or more on/off controls. The grouping may influence the direction control of the spindles. The height of a spindle may be adjusted before, during, or after production of an object. Each spindle of a multi-spindle system may be adjusted individually, and may be via an automated process with motors and a feedback control with switches or proximity sensors. The adjustment of the spindle height may be automated with motors or feedback control with switches or proximity sensors. The height of a spindle may be on a "Z"

axis. A system may have a Z switch for adjusting the height of the spindle or multiple spindles on the Z axis. A spindle may have a screw, such as a captured screw, that may aid in the speed or ease of changing spindles.

In some cases, multiple spindles may be used to one powder bed, and multiple objects may be formed simultaneously. Two or more spindles may be used simultaneously on one powder bed to generate two or more identical three-dimensional objects. In some cases, at least four or more spindles are used simultaneously on one powder bed to generate four or more identical three-dimensional objects. Two or more spindles may be used simultaneously on one powder bed to generate two or more three-dimensional objects that are not identical in a particular aspect (e.g., in size or shape). In some cases, four or more spindles may be used simultaneously on one powder bed to generate four or more three-dimensional objects that are not identical in a particular aspect (e.g., in size or shape).

Thus, an automatic tool changer may programed automatically change out the cutting tools based on the parameters set and/or the specifications of the desired printed object.

The system may comprise excess binder reservoirs. Excess binder may be captured in small reservoirs on the spray tank during printing. The excess binder may be pumped after the spray for a single layer or after multiple layers.

The system may comprise a vacuum system. The system may comprise multiple vacuum systems, such as 2, 3, 4, 5, 6, 7, 8, or more vacuum systems. The vacuum system may aid in capturing excess binder spray or excess powder material. The vacuum system may comprise a HEPA filter and a water or moisture trap in line with spray vacuum. The system may comprise a particle separator in line with both spindle and spray vacuum. This may help protect vacuum life and create a particle free environment. A system may comprise one particle separator per line. One particle separator can be used with a three-way check valve system. The system may comprise grounded tubing, which may help ground the entire machine to the pod ground or the factory ground. Grounded tubing may be corrugated tubing, straight tubing, or pipes.

The system may comprise a vacuum tip. The vacuum tip may be printed using a three-dimensional printer. The vacuum tip may have an axial hole to allow for the cutter to pass through. The vacuum tip may be adjacent to the cutter or wrapper around the cutter. The vacuum may have an adjustable suction ability that may be altered with a power reduction on vacuum or in line, to limit the amount of suction.

FIGS. 6A-6D schematically illustrate a method of forming a three-dimensional object using a layering technique of having a large layer thickness and a large cutting thickness using an aligned cutting pass. To form the object of FIG. 6A, multiple layers of powder material with a large layer thickness 605 of FIG. 6B may be applied. One large cutting passes with a cutting thickness 610 of FIG. 6C may be made generated with one aligned cutting pass to form the final part FIG. 6D.

A cut strategy may be developed for the formation of a three-dimensional object described herein.

A cut strategy may be based on an entire slice of the three-dimensional object.

Figure 12:
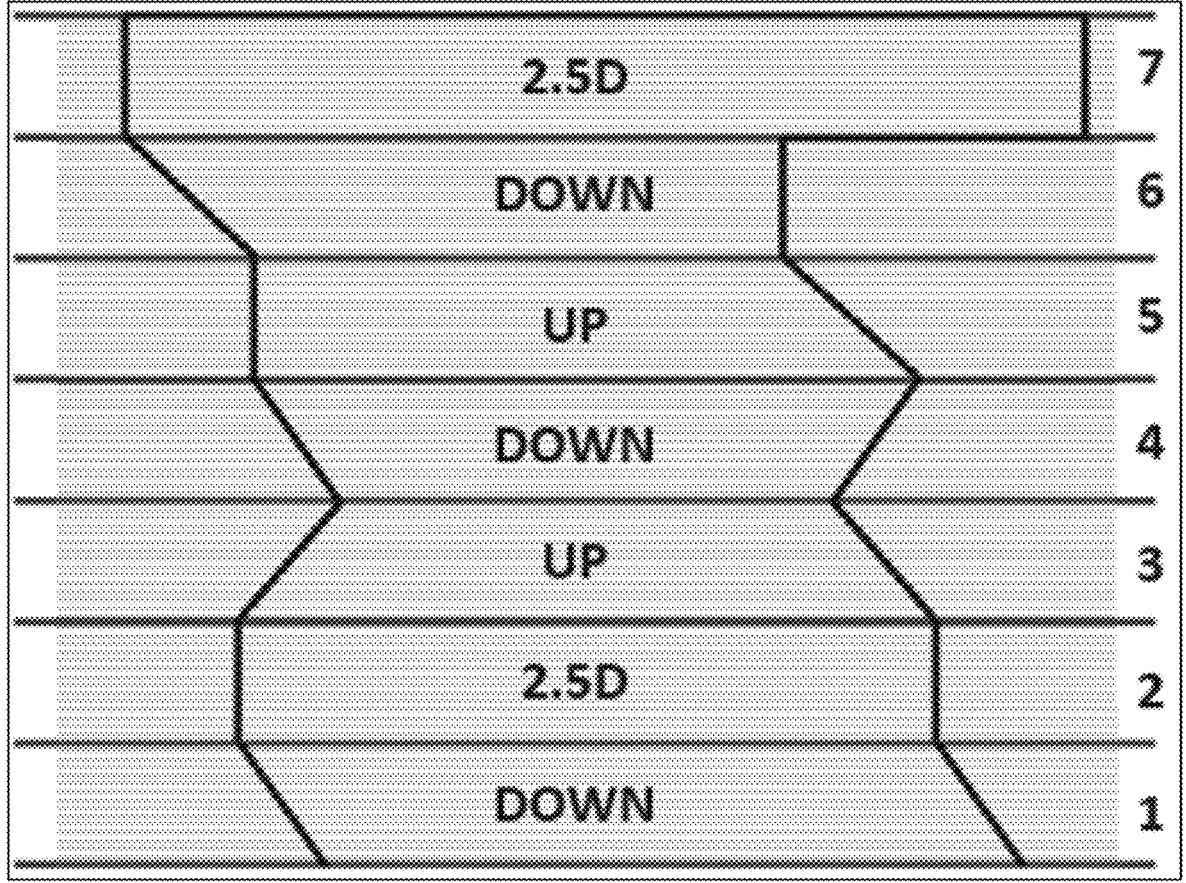
FIG. 12 illustrates a cutting strategy that may be used to form a desired 3D object.

The desired 3D object is outlined in FIG. 12. Multiple slices form a layer, wherein the layers of the object are labeled numerically. If the slope in any portion (or triangles in an STL) in a slice is down-facing, an entire slice may be characterized as DOWN". Similarly, if the slope in any portion of a slice is up-facing and there is no down-facing portion, an entire slice may be characterized as "UP". If the slope in an entire slice is vertical, the slice may be characterized as "2.5D". If vertically adjacent slices, features, and/or surfaces are all "UP" and/or "2.5D", the cut order can be optimized. In the example of FIG. 12, slice thickness is much less than layer thickness. In FIG. 12, each layer is represented with a designation of "UP", "DOWN", "2.5D" for all slices. A single cutting pass is made after Layer 1, and a single cutting pass is made after Layer 2. Several cutting passes are made for Layer 3 to obtain a more refined slope. A single cutting pass is made for the remaining layers.

When cutting a three-dimensional object, it may be beneficial to minimize stair stepping to produce a desired physical dimension of the object. The layer thickness may be chosen to equal to the slice thickness, and a step of cutting the layer may occur after every layer is spread and sprayed. Alternatively, if the layering effect is not an issue, the layer sizes and/or cutting thickness may be made larger to optimize for speed.

Figure 14:
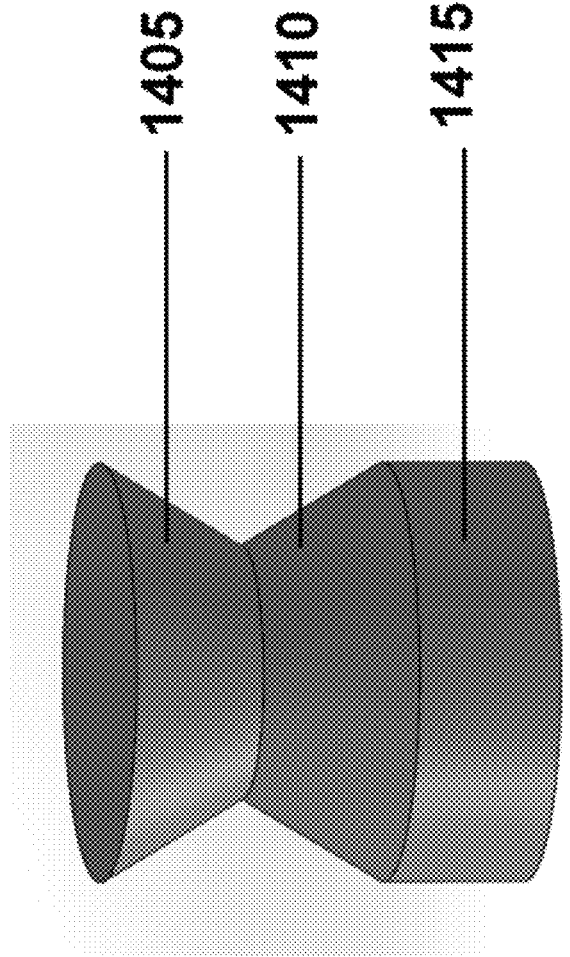
FIG. 14 illustrates a formation strategy that may be used to form a three-dimensional object using a layering technique.

FIG. 14 illustrates the multiple possibilities to form a three-dimensional object using a layering technique. As area 1415 has a vertical region, the region is cut using one cutting pass. Area 1410 has a slope that is up-facing. This 1410 region, represented by 10 slices, is cut after each layer. Area 1405 has a slope that is down-facing. This 1405 region, comprising 1 slice, is cut with one cutting pass. The layer thickness may be altered and chosen based on the shape of the desired 3D object and the desired speed at which the object is formed.

A cut strategy may be based on a feature of the three-dimensional object.

Figure 15:
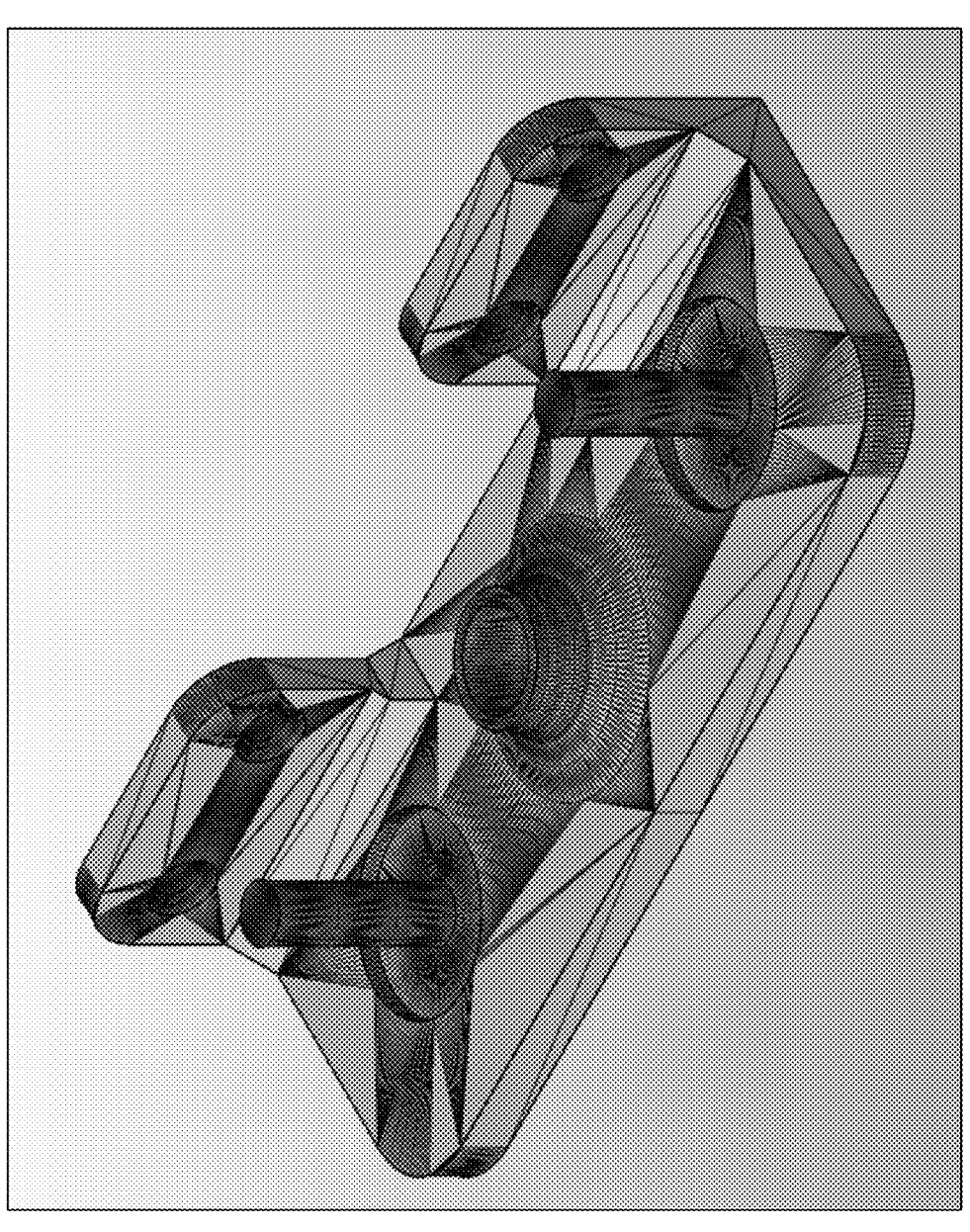
FIG. 15 illustrates a triangulated digital model as a stereolithography (STL) file.
Figure 16:
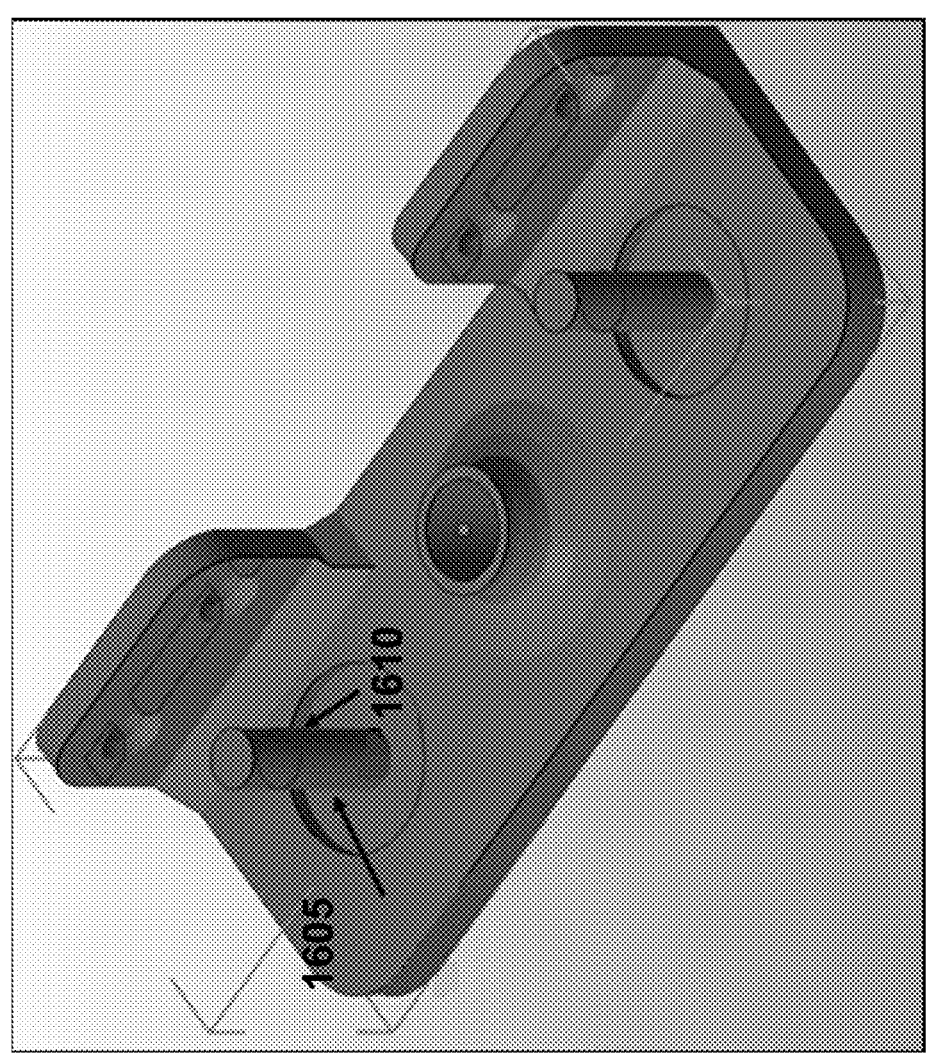
FIG. 16 illustrates the triangle intersections for a given slice of the model of FIG. 15.
Figure 17:
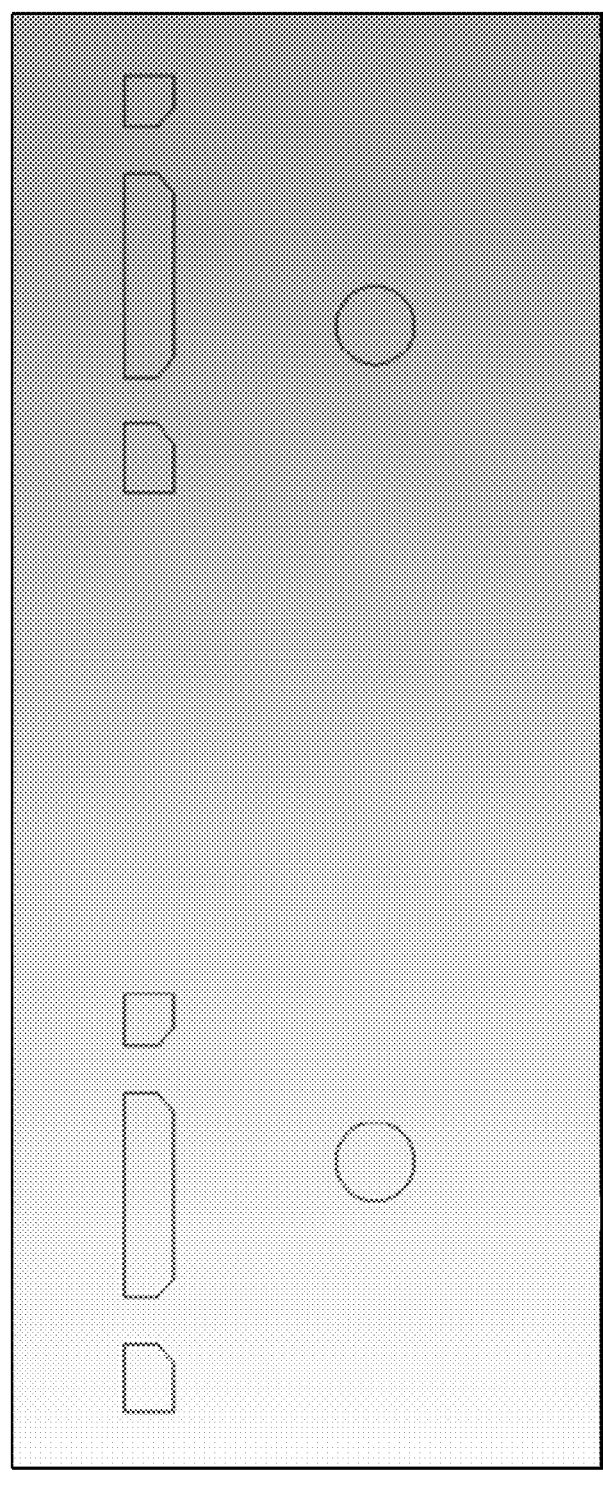
FIG. 17 illustrates the associated loops for the slice of FIG. 16 for further clarification.

A feature may be a geometric subsection of the three-dimensional object. A feature can be represented by a loop or loops within a given layer. For an STL file, loops may describe the intersection of a specific plane with all of the triangles (or polygons) that straddle that plane. FIG. 15 illustrates a triangulated digital model as a stereolithography (STL) file. FIG. 16 illustrates the triangle intersections for a given slice of the model of FIG. 15. For a vertical cylindrical feature, such as the vertical column, the plane intersection is a circle. FIG. 17 illustrates the associated loops for that layer for further clarification.

Figure 18:
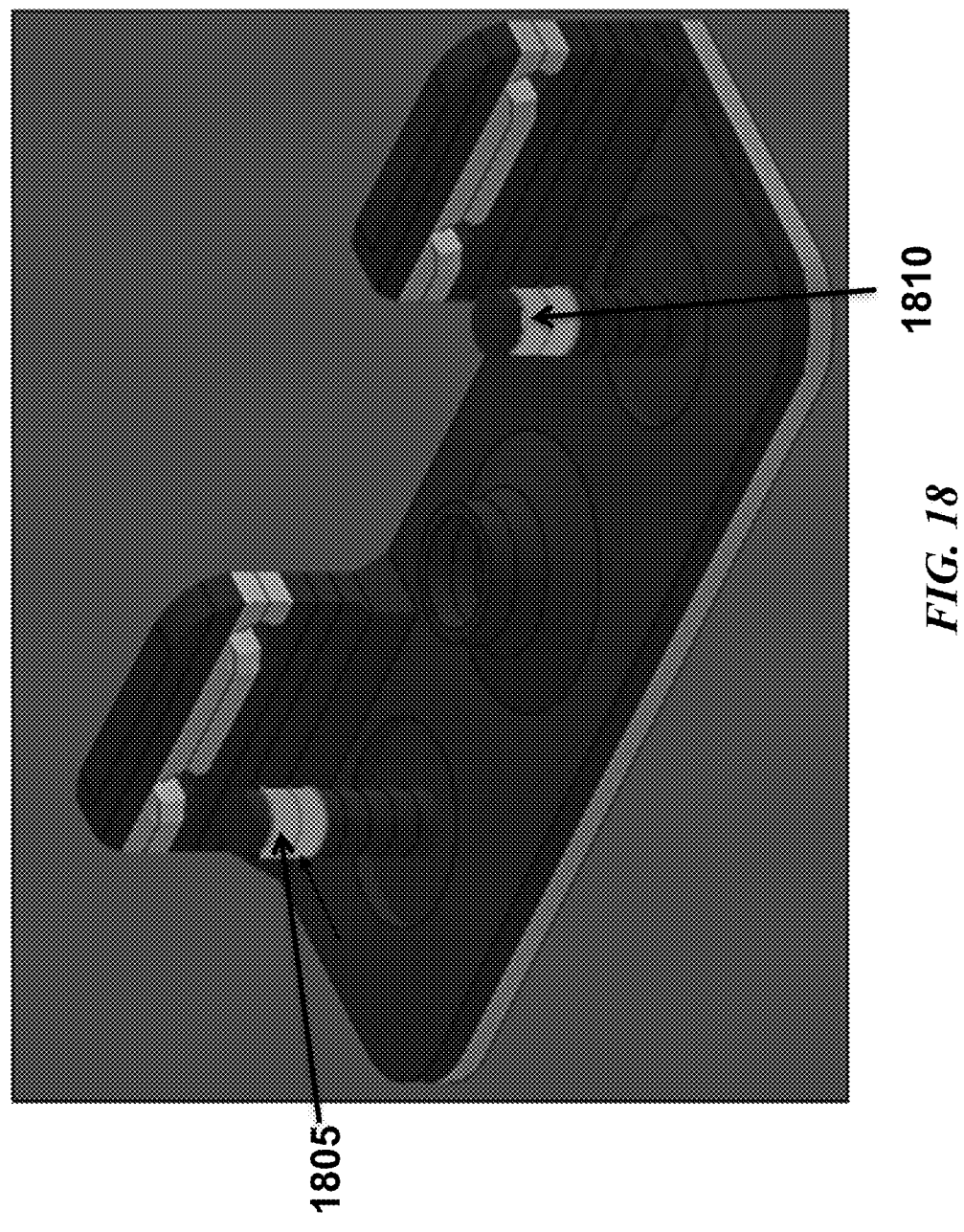
FIG. 18 illustrates a cutting strategy for the object of FIG. 15.
Figure 19:
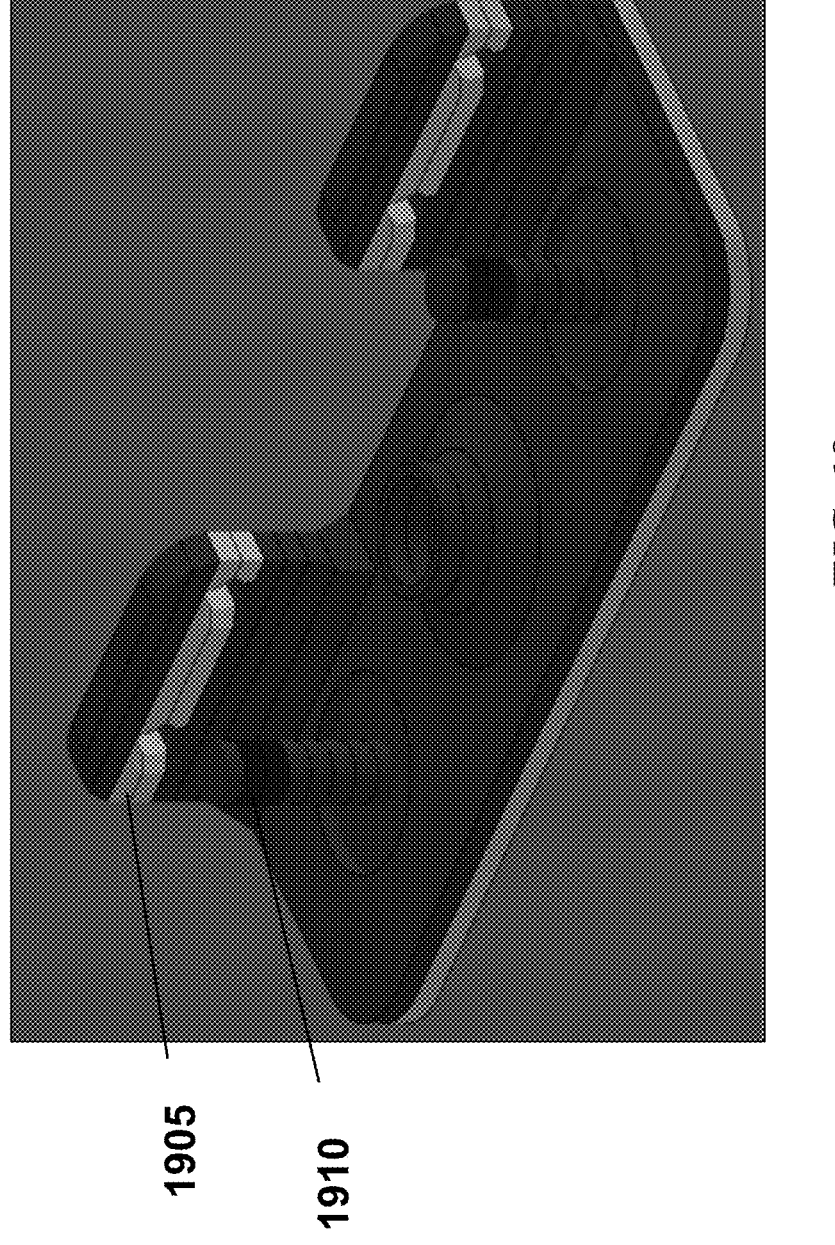
FIG. 19 illustrates an alternative cutting strategy for the object of FIG. 15.

FIG. 18 illustrates the object of FIG. 15, where each layer is designated and labeled as "UP", "DOWN", or "2.5D". Layers 1805 and 1810 are designated as "DOWN", whereas the remaining layers are designated as "UP". Alternatively, the object of FIG. 15 may be designated differently to further optimize the manufacture of the object. As shown in FIG. 19, given slices or layers may be identified differently. For example, 1905 may be labeled as "DOWN", but 1910 may now be designated as "2.5D". This way, it may be possible to cut the rest of the layer (or slices) more incrementally, while deferring the cutting of the column features of 1910 until several layers have been sprayed and spread. In this and other examples, loops may be described as belonging to the same feature if they share triangles. Similarly, if adjacent loops in different slices intersect the same triangle, then they may share the same feature.

Figure 20:
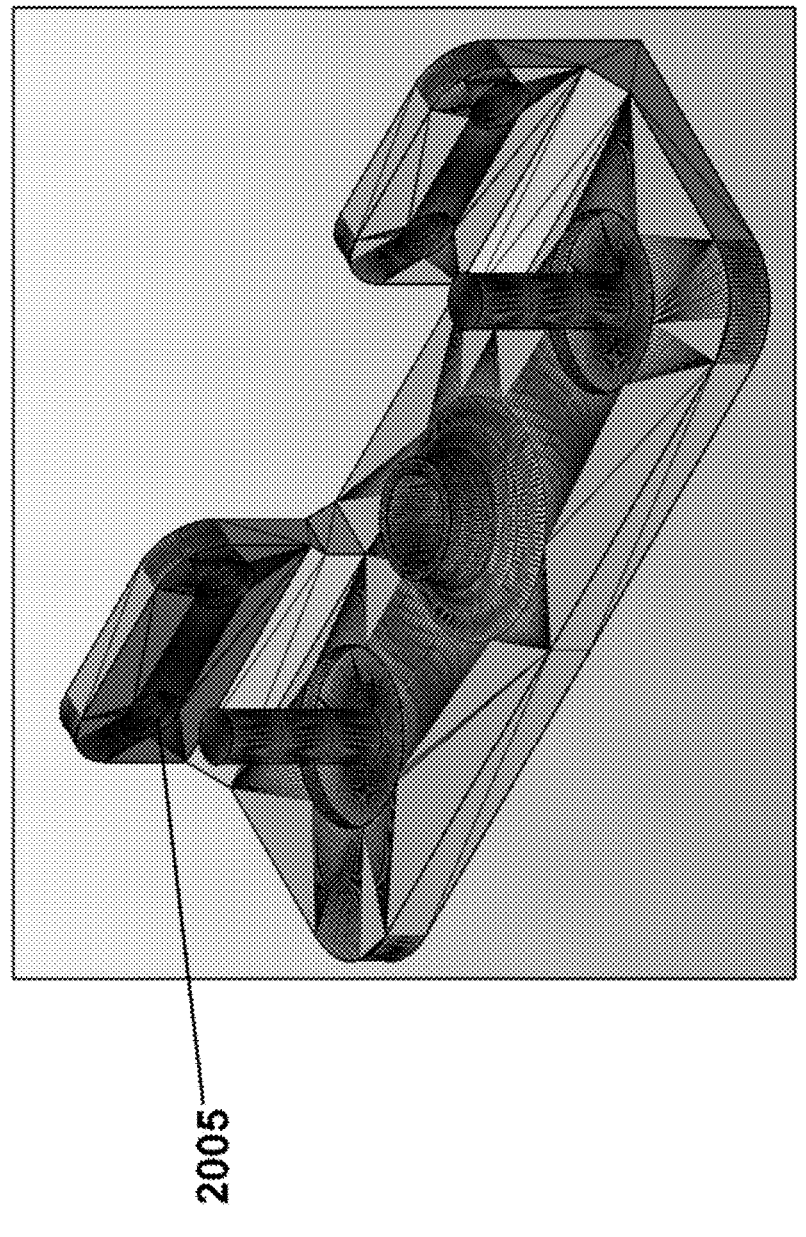
FIG. 20 illustrates a specific surface of the object of FIG. 15.

A cut strategy may be based on a surface of the three-dimensional object. A surface may be a geometric subsection of a feature of a three-dimensional object. For a given slice, a surface can be represented by a single line segment or set of line segments within a given loop. A surface 2005 is illustrated in FIG. 20. Classification of surface may be utilized for cut thickness and order determination. Sections of a given feature may be categorized differently (e.g., some surfaces are "2.5D" and some are "DOWN").

Figure 21:
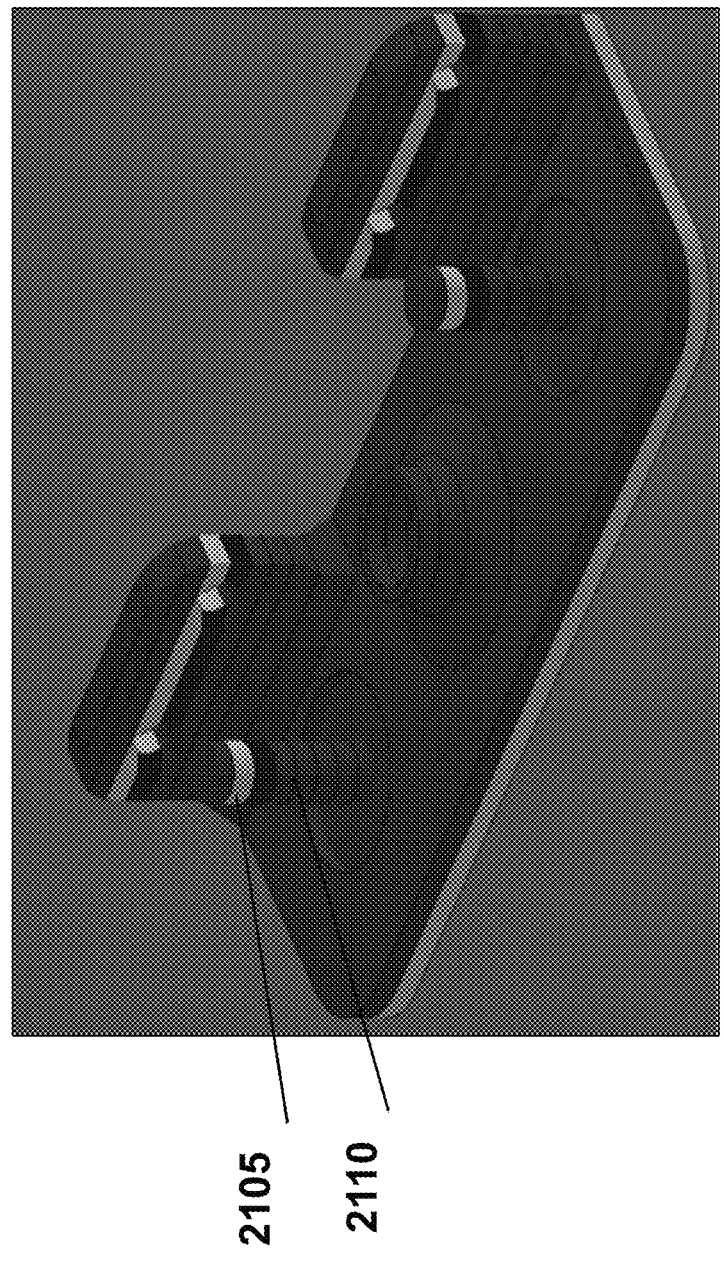
FIG. 21 illustrates a way of classifying a surface of the desired object to optimize cut order.

FIG. 21 illustrates a way of classifying a surface of the desired object to optimize cut order. Slice 2105 is categorized as "DOWN" while 2110 is categorized as "2.5D".

Figures 22A, 22B, 22C:
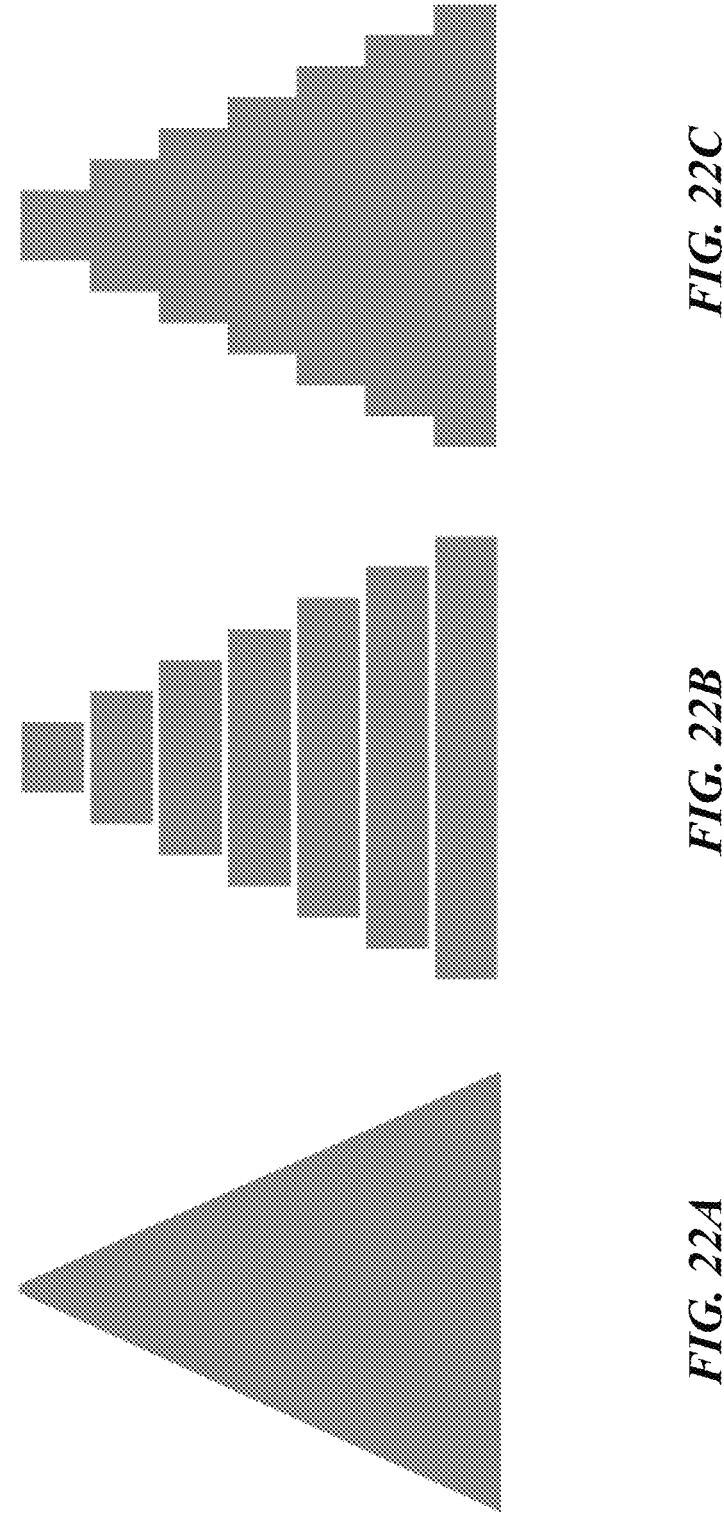
FIGS. 22A-22C illustrate one approach to slices or layers of a three-dimensional product.

FIGS. 22A-22C illustrate one approach to slices or layers of a three-dimensional product. For a given CAD model, the model (FIG. 22A) may be sliced with a defined thickness, illustrated in FIG. 22B, and then each slice may be translated into a layer. Each layer may then be built one at a time in the respective machine for product the resulting object of FIG. 22C.

Figures 23A, 23B, 23C:
FIGS. 23A-23C illustrate an alternative approach to slices or layers of a three-dimensional product.

FIGS. 23A-23C illustrate an alternative approach to slices or layers of a three-dimensional product. For a given CAD model, the model (FIG. 23A) may be sliced with a defined thickness, illustrated in FIG. 23B, and then each slice may be translated into a layer. Each layer may then be built one at a time in the respective machine for product. All the layers may be cut in a single pass with a cutting tool 2305 to produce the resulting object of FIG. 23C, with added resolution when compared to the object of FIG. 22C. The layers are cut out of plane, eliminating the need for horizontal layers. This approach of cutting multiple layers at once with a 3-axis or 5-axis machine may eliminate the need for stair stepping, and may eliminate the visibility of layers in the resulting object.

A cutting tool or a cutting bit may have a diameter of at least about 1 um, 10 um, 100 um, 250 um, 500 um, 750 um, or 1000 um. In some cases, a cutting bit may have a diameter of about 500 um. The cutting tool or cutting bit may leave a width in the powder material, or a particular parting line spacing.

A cutting tool or a cutting bit may have a hatch cut speed of at least about 1 millimeter per minute (mm/min), 10 mm/min, 100 mm/min, 200 mm/min, 300 mm/min, 400 mm/min, 500 mm/min, 600 mm/min, 700 mm/min, 800 mm/min, 900 mm/min, 1000 mm/min, 1250 mm/min, 1500 mm/min, 1750 mm/min, or 2000 mm/min.

The speed at which a boundary of a layer of powder material is cut may be at least about 1 mm/min, 10 mm/min, 100 mm/min, 200 mm/min, 300 mm/min, 400 mm/min, 500 mm/min, 600 mm/min, 700 mm/min, 800 mm/min, 900 mm/min, 1000 mm/min, 1250 mm/min, 1500 mm/min, 1750 mm/min, or 2000 mm/min.

In one aspect, the present disclosure provides a method for forming a three-dimensional object, comprising: providing a surface comprising a powder bed comprising powder material; applying a first binding substance to a first area of a first layer of powder material of the powder bed; depositing a second layer of powder material adjacent to the first layer of powder material in the container; applying a second binding substance to a second area of a second layer of powder material of the powder bed; and generating one or more perimeters of the first layer and the second layer of powder material via one or more cutting passes, wherein the one or more perimeters of the first layer and the second layer is in accordance to a model design of the three-dimensional object.

A method for forming a three-dimensional object, comprising: providing a surface comprising a powder bed comprising powder material; applying a first binding substance to a first area of a first layer of powder material of the powder bed; depositing a second layer of powder material adjacent to the first layer of powder material in the container; applying a second binding substance to a second area of a second layer of powder material of the powder bed; and generating one or more perimeters of the first layer and the second layer of powder material via one or more cutting passes, wherein the perimeter of the first layer is determined by but is not equivalent to a model design of the first layer of the three-dimensional object. In some cases, the perimeter of the first layer of powder material is half a layer shifted from the design of the first layer of the three-dimensional object.

A binding substance that is applied to a layer of powder material may have a certain penetration depth into the powder material. In some cases, the penetration depth of the binding substance is about equal to the thickness of the layer (or layer thickness) of powder material. In some cases, the penetration depth of the binding substance is less than the thickness of the layer of powder material. In some cases, the penetration depth of the binding substance is more than the thickness of the layer of powder material. This may ensure that the layers of powder material adhere to one another.

A cutting pass may be used to generate a perimeter around a first layer of powder material. In some cases, the depth of the cutting pass (or cutting thickness) may be about equal to the penetration depth of the binding substance into the powder material. In some cases, the depth of the cutting pass may be less than the penetration depth of the binding substance into the powder material. In some cases, the depth of the cutting pass may be more than the penetration depth of the binding substance into the powder material.

In some cases, a perimeter generated around a layer of powder material may be vertical to the powder bed. In some cases, the perimeter generated around a layer of powder material is not vertical to the powder bed. A perimeter may be generated with a multi-axis (e.g., 5-axis) machine tool. The multi-axis machine tool can cut the powder bed at an angle of about 0°, 10°, 20°, 30°, 40°, 50°, 60°, 70°, 80°, or 90° in relation to the surface of the powder bed.

In one aspect, the present disclosure provides a system for forming a three-dimensional object, comprising: a powder dispenser that dispenses a powder material to form a first layer of the powder material adjacent to a powder bed, and that dispenses a powder material to form a second layer of the powder material adjacent to the first layer; a powder bed; and a cutting tool that generates one or more perimeters of the first layer of powder material, wherein the perimeter of the first layer is determined by but is not equivalent to a model design of the first layer of the three-dimensional object.

The unbounded powder may be deposited to an external reservoir. The unbounded powder may be used in future uses, such as formation of other three-dimensional objects.

A guidance system or a guiding belt may be used to guide the CNC spindle, the masked spray system, or other components of the set-up. In some embodiments, the guidance system may be a belt, a loop, a wire, a track, or a computer system.

Figure 7A:
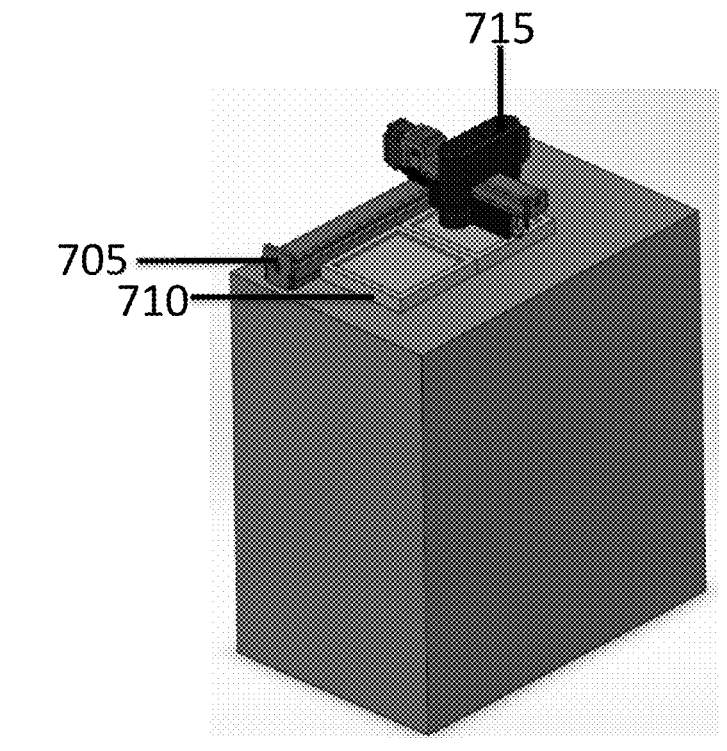
FIGS. 7A and 7B schematically illustrates a sample set-up for forming a three-dimensional object.
Figure 7B:
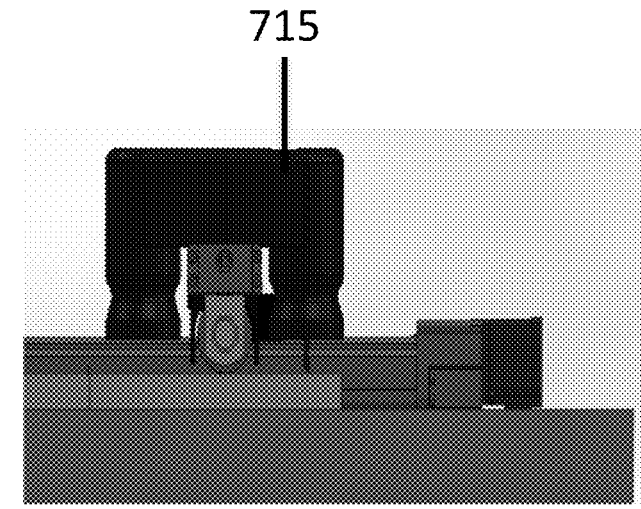

FIG. 7A and FIG. 7B schematically illustrate a sample set-up for forming a three-dimensional object. FIG. 7A depicts a powder bed 710 present on a support. A guidance system 705 may be used to guide a Computer Numeric Control (CNC) 715 spindle to make the cut in a layer of powder material. FIG. 7B is a side-profile of the set-up, wherein CNC spindle 715 is present to cut into a layer of powder material.

The system may further comprise a cleaning unit. The cleaning unit may be configured to remove powder material from the plurality of three-dimensional objects subsequent to printing. The plurality of three-dimensional objects subsequent to printing may be transferred to the cleaning unit.

The plurality of three-dimension objects may be transported to the cleaning unit, for example, by a robot, moving conveyor belt, or manually, such as by a human operator. The cleaning unit may be configured to remove powder material from the plurality of three dimension objects mechanically, physically, and/or chemically. The cleaning unit may be configured to operate independently of the human operator. The cleaning unit may comprise one or more computer processors programmed or otherwise configured to operate one or more cleaning tools of the cleaning unit. The cleaning unit may be configured to operate using a set of protocols and procedures.

The cleaning unit may include an enclosure for accepting a three-dimensional object. Such enclosure may be sealable.

The cleaning unit may be enclosed or open to an ambient environment. In some example, the cleaning unit is sealed from the ambient environment. As an alternative, the cleaning unit may not be sealed from the ambient environment.

The cleaning unit may be enclosed in an inert atmosphere. The cleaning unit may comprise a gas source or a liquid source, such as for providing a cleaning fluid (e.g., a source of a pressurized gas, such as pressurized air). The cleaning unit may comprise a pressure unit for directing fluid to or from the cleaning unit, such as to provide a vacuum in an enclosure of the cleaning unit. The pressure unit may include a compressor or a pump.

The cleaning unit may comprise a powder disposal or powder recycling unit. The cleaning unit may comprise a power washer. The cleaning unit may comprise a gas or liquid spray nozzle. The cleaning unit may comprise at least one holder. A holder may be used to suspend a plurality of printed three-dimension objects. A holder, for example, may be a container, receptacle, case, sheath, hook, claw, or clamp. The cleaning unit may comprise a variety of tools for cleaning, for example, a brush, a scraper, a mop, wiper blade, or a fan. The cleaning unit may be powered by electricity, such as from a power grid or a portable power generator. The cleaning unit may be battery-powered.

The cleaning unit may comprise a light source for providing, for example, lighting within the cleaning unit. The cleaning unit may comprise a heating source. The cleaning unit may comprise a mechanism for spinning, mechanical brushing, electrostatic removal, air jet removal, cloth wiping, or brush wiping. The cleaning unit may comprise a trough that may be filled with water or solvent. The cleaning unit may remove powder material through a centrifugation. The cleaning unit may feature a control panel. The control unit may comprise macro buttons.

The cleaning unit may include a stage on which one or more three-dimensional objects may be placed for cleaning. The stage may be in an enclosure of the cleaning unit. The stage may be configured to vibrate to aid in removing powder material from the one or more three-dimensional objects. Such vibration may be provided, for example, using a mechanical vibrating unit in mechanical communication with the stage.

Figure 8:
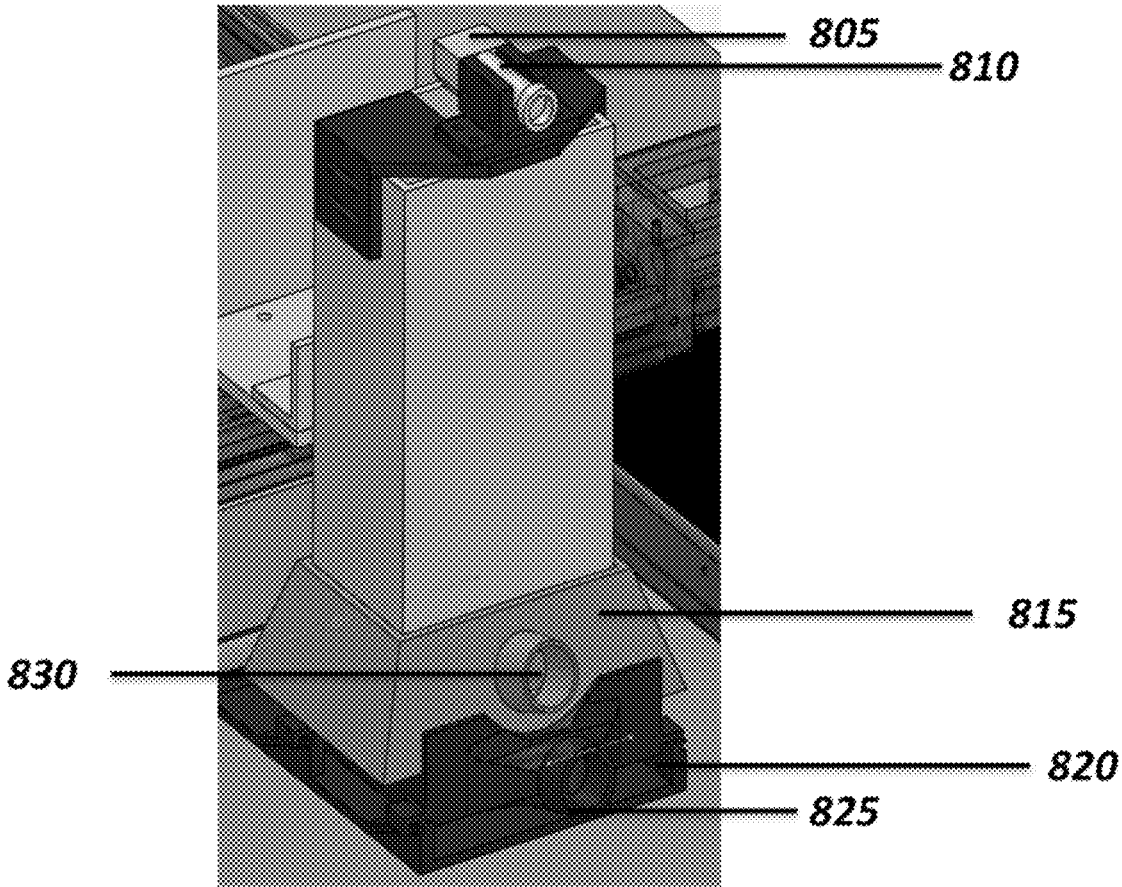
FIGS. 8, 9A, and 9B schematically illustrate various views of a spray system that may be used to form a three-dimensional object.

FIG. 8 is a side-profile view of a sample spray system that may be used in the formation of a three-dimensional object of the current disclosure. A hydraulic spray head 805 and connector 810 connect to a pressure pot that allows a fine mist of binder to be sprayed on a powder bed. Other parts of the spray system may include a spray mask 815 to only allow certain regions of spray to pass through and come into contact with the powder material, spray system cleaning station 820, vacuum line for mask cleaning 825, and vacuum line for plume capture 830.

Figures 9A, 9B:
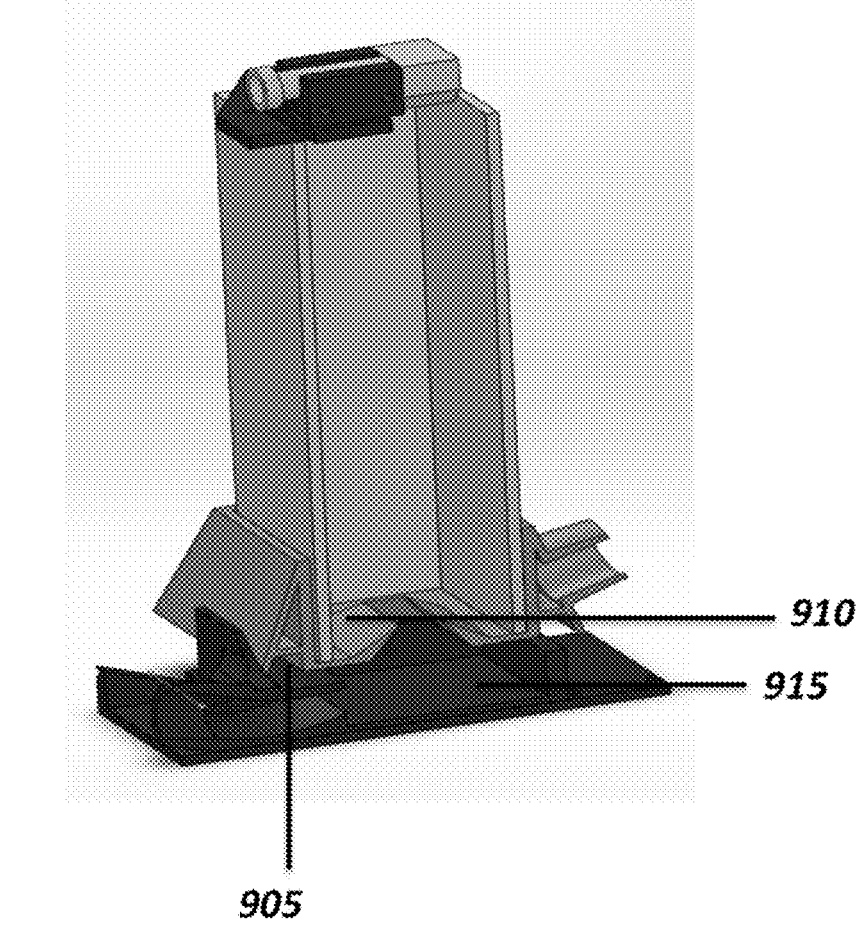

FIG. 9A is a bottom view of the sample spray system of FIG. 8. FIG. 9B is a cross-section of the sample spray system of FIG. 8. A plume vacuum orifice 905 is built into the system, a spray reservoir 910 holds any binder material until it is ready to be sprayed onto a powder material, and a vacuum cleaning docking station 915 may be used for simultaneous cleaning of excess large droplets in the system, including the spray mask and spray head.

Figure 10:
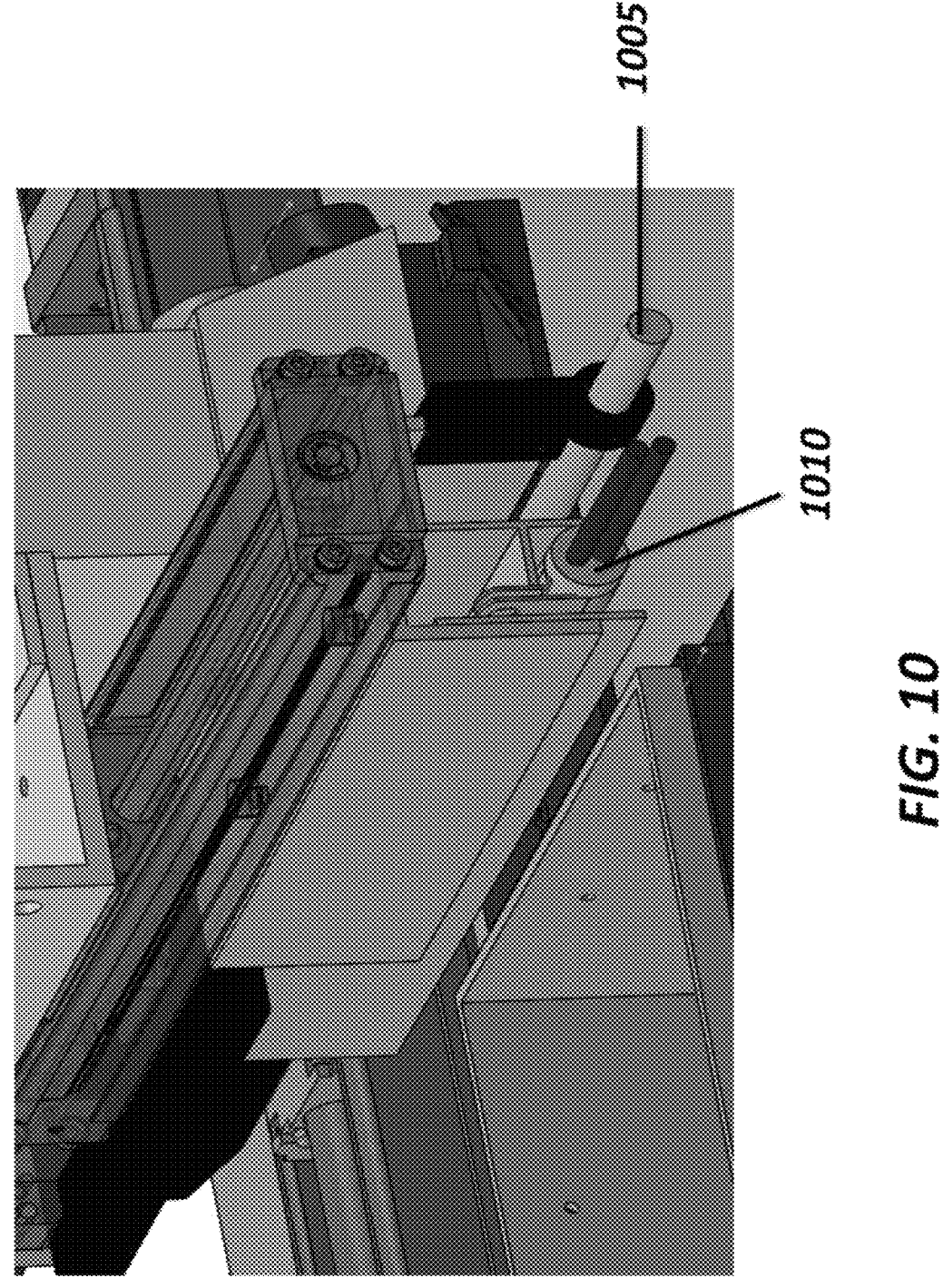
FIG. 10 illustrates a heating system that may be used to cure a layer of a three-dimensional object.

FIG. 10 illustrates a heating system that may be used to cure a layer of a three-dimensional object, wherein spreader 1005 spread the powder material onto the powder bed and the cartridge heater 1010 cures the binder that was recently applied. Different types of heaters at different powers may be used. A heater may have a power level of at least about 1 watt (W), 10 W, 100 W, 500 W, 1000 W, 2000 W, 3000 W, 4000 W, 5000 W, 6000 W, 7000 W, 8000 W, 9000 W, or more.

Figure 26:
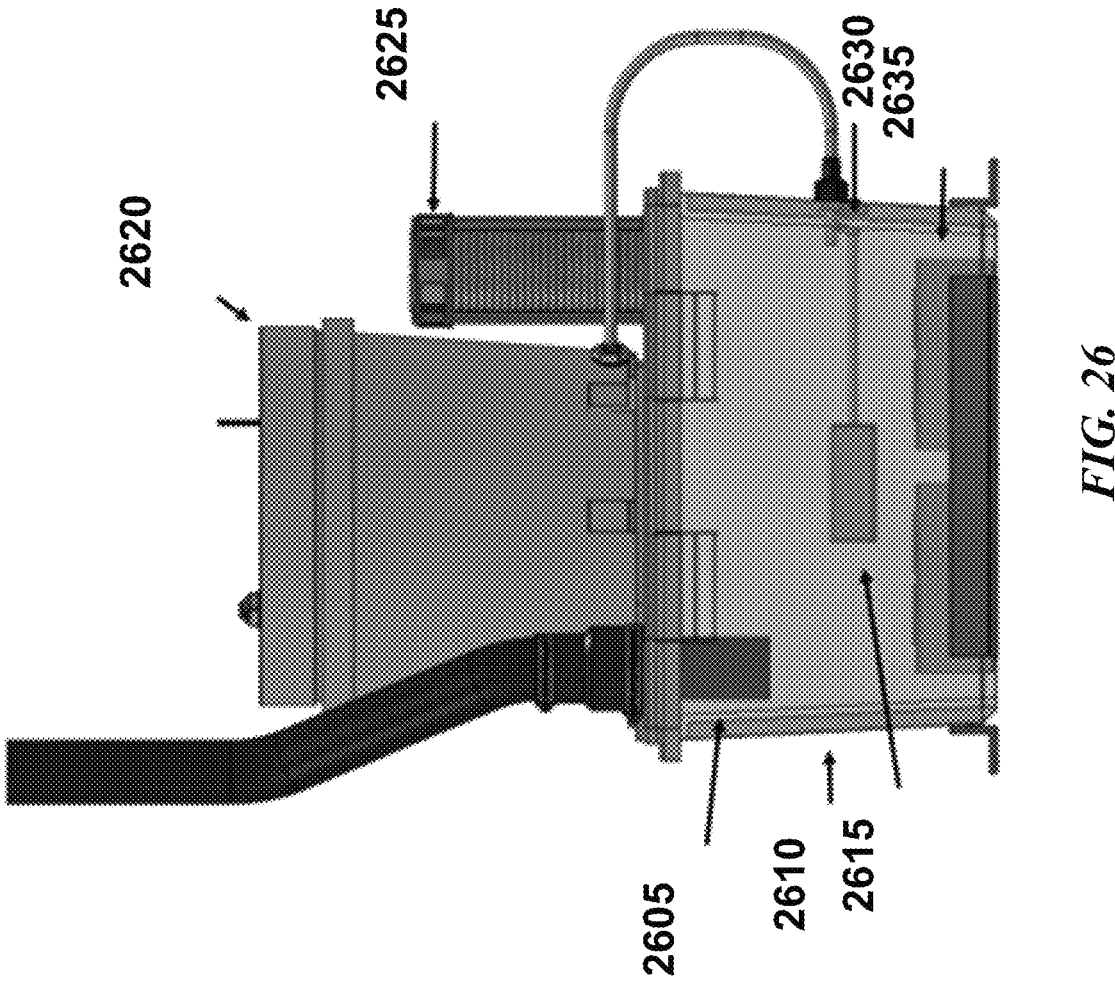
FIG. 26 illustrates a schematic ultrasonic mist generator system.

FIG. 26 illustrates a schematic ultrasonic mist generator system 2635. At least one ultrasonic transducer is submerged a specific distance under the surface of the binder fluid ("binder") contained in the binder tank 2610. The binder fill reservoir 2620 sits above the system. The height or level of the fluid can be controlled with a float valve 2615 and 2630 and the level is maintained with a fill reservoir above the binder tank. When the transducers are powered, the small droplets are generated. A fan 2625 is controlled by PWM to regulate the flow of the droplets into the spray outlet 2605. The outlet hose of system 2635 may be corrugated tubing or smooth bore. The binder level in the binder tank may be monitored with a capacitive or conductivity sensor, and the binder tank may be refilled using a binder refill system with feedback control. Alternatively, the binder refill system may be a passive refill system. The binder fill reservoir tank may be located adjacent to the main tank to maintain a certain desired level of binder.

The binder may be heated or cooled to a desired or predetermined temperature for storing or prior to application of binder to a powder bed. A temperature of the binder during storage and upon application to the powder bed may be the same. In some cases, the temperature of the binder during application to the powder bed may be different than the temperature of the binder during storage (e.g., prior to application, the binder may be heated from a storage temperature to an application temperature).

Binder in a binder tank may have a certain concentration that is maintained within a set range. Binder may be stored in a refill reservoir or a main binder tank. A main binder tank may have a different concentration of binder than the refill reservoir of the spray tank. The level of binder in the binder tank, refill reservoir, and main binder tank may be controlled and maintained within a set range.

A binder temperature feedback system may be used to control the temperature of the binder. In some cases, the temperature of binder may be at least about 25° C., 30° C., 40° C., 50° C., 60° C., 70° C., 80° C., 90° C., 100° C., 110° C., 120° C., 130° C., 140° C., 150° C., 160° C., 170° C., 180° C., 190° C., 200° C., 300° C., 400° C., 500° C., or more.

A binding substance applicator may be a spray outlet, or spray head module. A spray outlet or spray head module may be a number of different shapes. A spray outlet may have a round, oval oblong, square, rectangular, triangular, or other shapes. The shape of a spray outlet may be varied based on the desired dimensions and structure of the resulting three-dimensional object. The spray outlet may span the width of the powder tank. Alternatively, the spray outlet may be smaller than the width or length of the powder tank. The spray outlet or spray head module may have dimensions of at least about 1 millimeter (mm), 2 mm, 5 mm, 10 mm, 20 mm, 30 mm, 40 mm, 50 mm, 60 mm, 70 mm, 80 mm, 90 mm, 100 mm, 150 mm, 200 mm, 300 mm, 400 mm, 500 mm, 600 mm, 700 mm, 800 mm, 900 mm, 1000 mm, or more. An apparatus may have a number of spray outlets or spray head modules. An apparatus may have at least 1, 2, 3, 4, 5, 6, 7, 8, 9, 10, or more spray outlets.

An electrical motor, linear actuator, stepper motor, and/or a solenoid may be used in a system of the present disclosure to alter the rate of application (e.g., speed of spray) of a binder. The electrical motor, linear actuator, stepper motor, and/or solenoid may contribute to the rate of evacuation of binder from above the powder bed. The electrical motor, linear actuator, stepper motor, and/or solenoid may also aid in control of humidity above the powder bed after application of binder.

The spray outlet, or spray head module, may be tilted at an angle relative to the layer of powder material. The spray outlet may be directly above the layer of powder material (e.g., at an angle of 0° relative to the layer of powder material), or the spray outlet may be at an angle of at least about 1°, 2°, 3°, 4°, 5°, 6°, 7°, 8°, 9°, 10°, 15°, 20°, 25°, 30°, 35°, 40°, 45°, 50°, 60°, 70°, 80°, or more, relative to the layer of powder material. The spray outlet or spray tank may be parallel to the powder bed. It may be parallel with the cutter plane. It may be parallel with the spreader bar plane.

Figure 27:
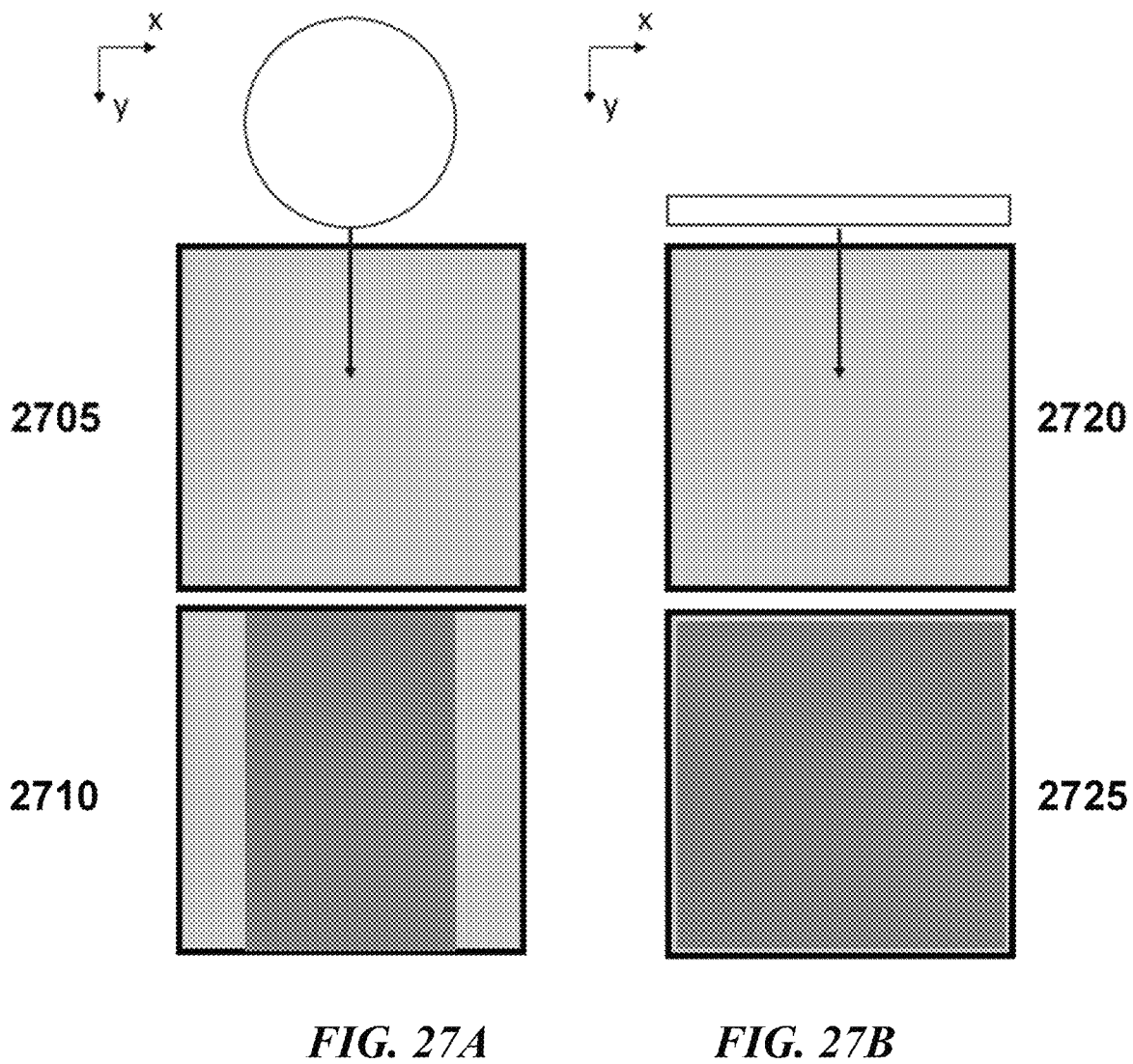
FIGS. 27A-27B illustrate two potential spray patterns that may be used when directing binding material towards a layer of powder material on a powder bed.

FIGS. 27A-27B illustrate two potential spray patterns that may be used when directing binding material towards a layer of powder material on a powder bed. FIG. 27A illustrates one potential spray pattern system. A circular spray outlet, such as outlet 2605 from FIG. 26, may be circular in shape. The direction of spray is in the y direction. The circular spray outlet directs binding material towards a layer of powder material in 2705. Binding material permeates through the powder material in a column in 2710, where more binding material is present in the middle of the column when compared to the sides of the column. This effect may be desired.

FIG. 27B illustrates another potential spray pattern system. A rectangular spray outlet may be used, wherein binding material is directed towards a layer of powder material in 2720. The direction of spray is in the y direction. Binding material is directly evenly to the powder material in a column in 2725, wherein binding material permeates through the powder material in an even column. This effect may be desired.

A vacuum may be present in an apparatus of the current disclosure. A vacuum may capture all excess spray plum that escapes the mask. The vacuum may prevent excess plume from escaping and settling over other parts of the apparatus. Unwanted settling of excess binding material may lead to undesired effects. The vacuum may help direct the flow, speed, and uniformity of the spray of binding material. The vacuum may create a vortex above the powder material layer.

The vacuum may control the direction and velocity of the binding material spray as it exits the spray mask. The vacuum strength may be varied. The vacuum strength may be at most about 759 torr, 750 torr, 700 torr, 650 torr, 600 torr, 550 torr, 500 torr, 450 torr, 400 torr, 350 torr, 300 torr, 250 torr, 200 torr, 100 torr, 50 torr, 1 torr, or lower.

The shape of the vacuum mask or vacuum orifice may be a number of different shapes. A vacuum mask may have a round, oval oblong, square, rectangular, triangular, or other shapes. The vacuum may be fixed at a certain distance from the powder bed, or may vary during the course of synthesizing the three-dimensional object. The vacuum may be at least about 1 mm, 2 mm, 5 mm, 10 mm, 20 mm, 30 mm, 40 mm, 50 mm, 60 mm, 70 mm, 80 mm, 90 mm, 100 mm, 150 mm, 200 mm, 300 mm, 400 mm, 500 mm, 600 mm, 700 mm, 800 mm, 900 mm, 1000 mm, or more from the powder bed. In some cases, turbulent flow may occur and may depend on the distance of the vacuum from the powder bed. A vortex of binder spray may be present and may depend on the distance of the vacuum from the powder bed. The vortex of binder spray may be advantageous for binder application, and may increase application speed. Vacuum power may also be varied with a throttling valve. Vacuum power may also be varied by opening up a vacuum line and not enclosing the entire suction area.

Figure 28:
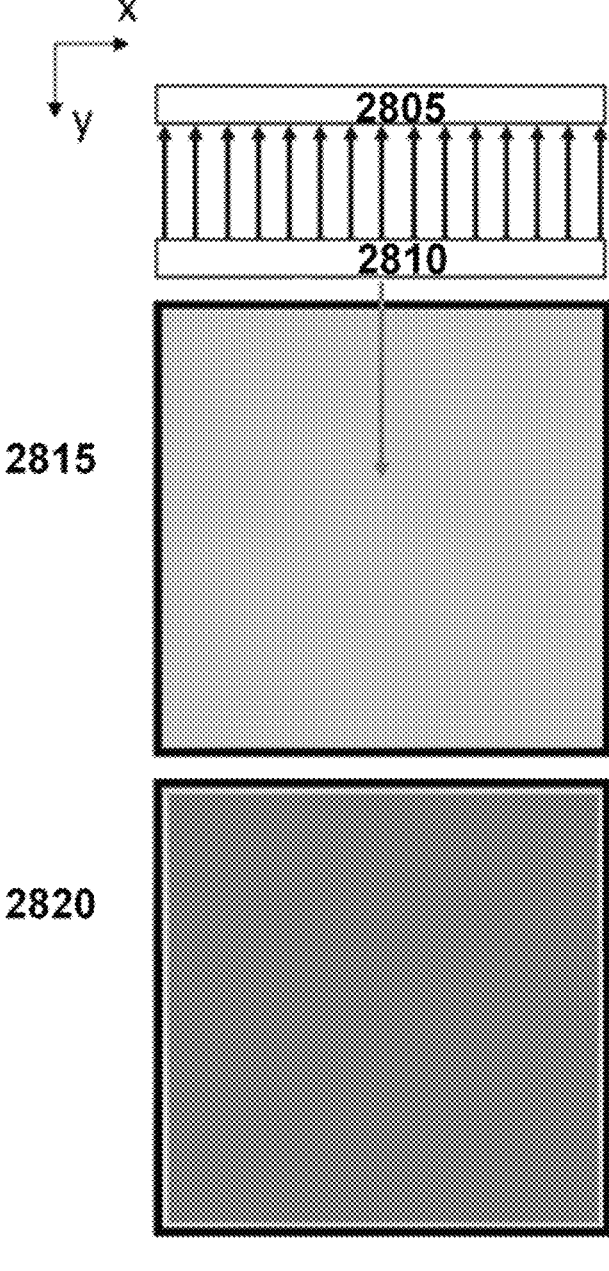
FIG. 28 illustrates an apparatus with a vacuum directly behind (the spray mask)

FIG. 28 illustrates an apparatus with a vacuum directly behind (the spray mask). In this figure, the spray plume will exit the spray mask 2810 and contact the powder in 2815 and travel in the y positive direction. If the vacuum mask 2805 is on, the binding material plume may travel along the powder surface in the direction of the vacuum (y negative direction) until it is pulled into the vacuum.

Figure 29:
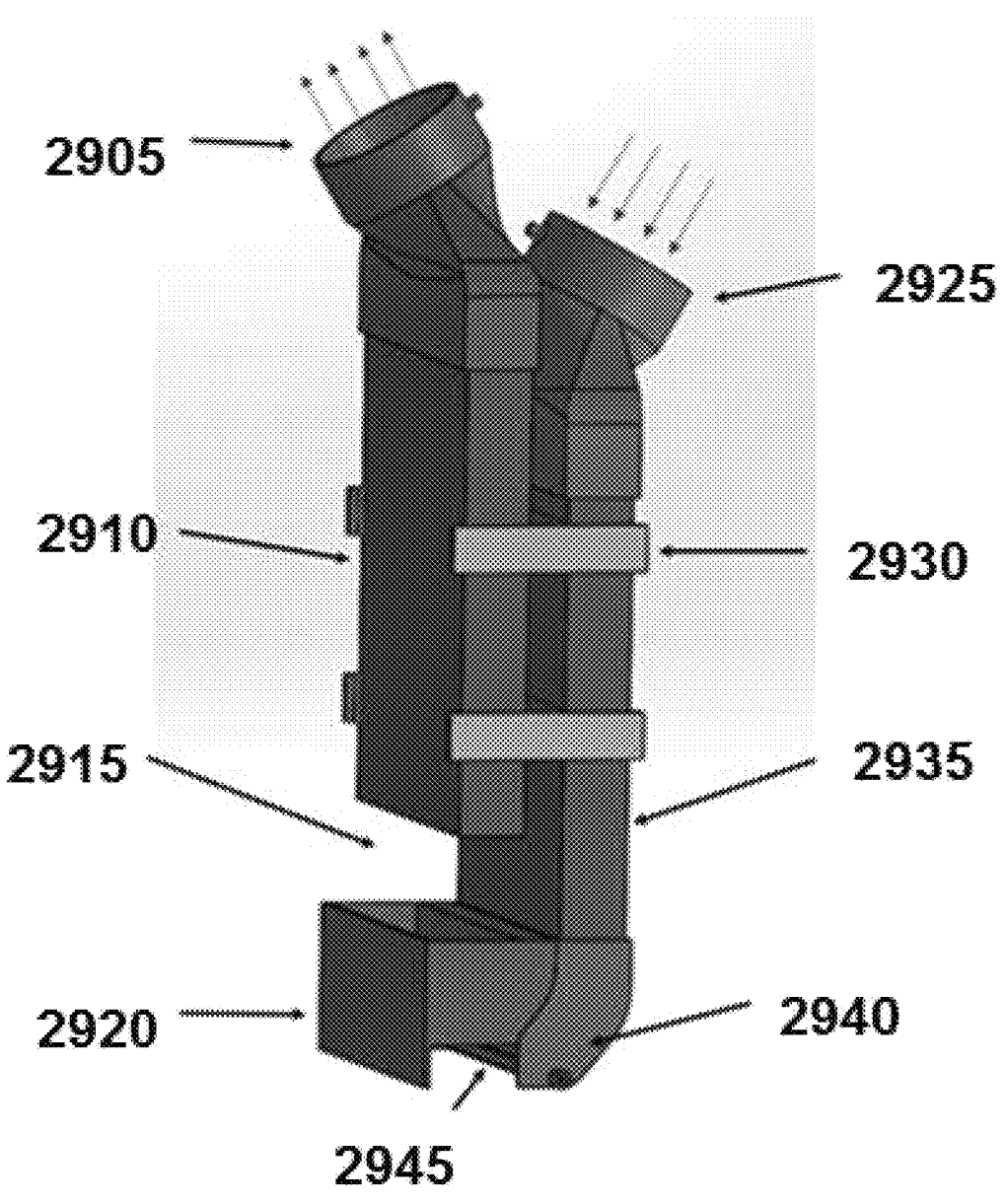
FIG. 29 illustrates a spray module with vacuum assisted spray.

FIG. 29 illustrates a spray module with vacuum assisted spray. Rectangular to circular spray adapter 2925 is from the binder tank. Rectangular to circular vacuum adapter 2905 connects to a vacuum tube. Arrows illustrate the direction of plume spray, as initially from the binder tank through adapter 2925 and finally out through the vacuum adapter 2905 toward the vacuum. Columns 2930, 2935, and 2910 are one method of controlling Y and Z spacing between the spray and vacuum. The extended length may be used to create uniform spray plume distribution across the new cross section. Spray mask 2940 and spray mask outlet 2945 are used to prevent excess plume from escaping in the X direction, and also to direct spray onto the powder bed. A wall 2920 may prevent excess plume from traveling forward in the positive Y direction. An angled spray outlet may help direct the spray toward the vacuum. An intentional space 2915 is left to alter the vacuum profile, including vacuum power.

Figure 30:
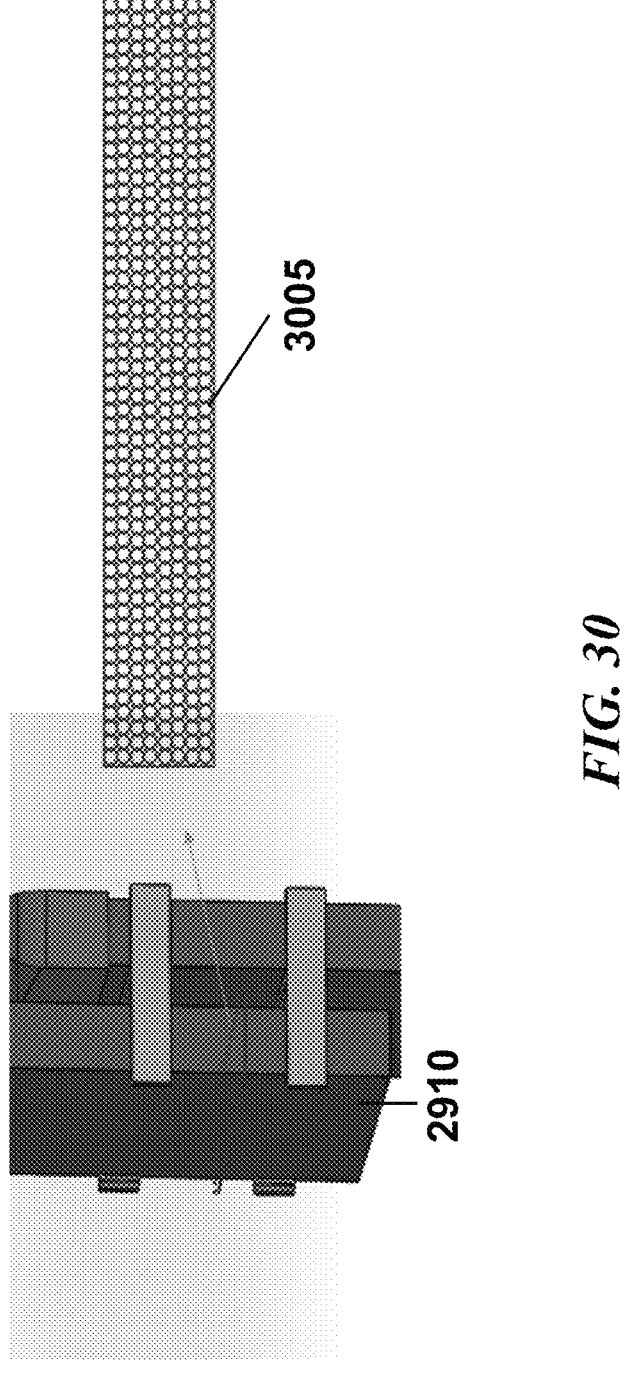
FIG. 30 illustrates one method in which a uniform flow may be achieved.

It may be desired to have uniform spray material travel from the binder tank or spray outlet to the spray mask outlet. FIG. 30 illustrates one method in which a uniform flow may be achieved. A cross-section 3005 is shown to have a honeycomb structure path that may be used to ensure an evenly distributed flow. The structure within column 2910 may be made up of circular, square, rectangular, pentagonal, or hexagonal tubes, such as in a honeycomb shape. The structure within the column may occupy at least about 10%, 20%, 30%, 40%, 50%, 60%, 70%, 80%, 90%, or 100% of the volume of the column.

The length of column 2910 may be used to give the plume time and distance to spread out from the spray outlet to the spray mask. In some cases, the length of a column between the binder tank and the spray mask may be at least about 1 millimeter (mm), 2 mm, 5 mm, 10 mm, 20 mm, 30 mm, 40 mm, 50 mm, 60 mm, 70 mm, 80 mm, 90 mm, 100 mm, 150 mm, 200 mm, 300 mm, 400 mm, 500 mm, 600 mm, 700 mm, 800 mm, 900 mm, 1000 mm, or more.

A system may comprise a spray tank or a binder tank, wherein the tank stores binder material. The spray tank may have a box design with a solenoid valve for filling. The spray tank may be stationary. The spray tank may be moved relative to the powder bed. The spray tank may be positioned over the powder bed or build plate. The spray tank may be parallel to the powder bed or build plate.

The distance between the bottom of the spray tank and the top of the powder bed may be at least about 0.01 millimeter (mm), 0.1 mm, 0.5 mm, 1 mm, 2 mm, 5 mm, 10 mm, 20 mm, 30 mm, 40 mm, 50 mm, 60 mm, 70 mm, 80 mm, 90 mm, 100 mm, 150 mm, 200 mm, 300 mm, 400 mm, 500 mm, 600 mm, 700 mm, 800 mm, 900 mm, 1000 mm, or more. The distance from the spray tank and the top of the powder bed may be adjustable.

The spray mechanism may comprise a deposition tool to deposit spray material or binder, a vacuum, and a fan. In some cases, the system comprises a spray, a vacuum, and a fan. A spray box vacuum solenoid may be used, and may be used to allow spray in and close to evacuate spray. The spray mechanism may comprise a vacuum break or a vacuum release system that may be located close to the spray box. The vacuum break may control spray velocity and mass flow rate. The vacuum break may be location upstream or downstream from the spray mechanism. The vacuum break may be used appropriately to avoid condensation. Hinges may be added to the spray box lid to prevent condensation on the lid or spray box walls.

The spray system may comprise a water pump, a rail system, clasps that may be removable, and a tow ball connection. A vacuum break may be used to monitor and control application of binder material to the powder bed. A vacuum or a fan may be used to actuate spray or binder onto the powder bed.

The outlet hose of a mist generator system (e.g., ultrasonic mist generator system) may have a diameter of at least about 1 mm, 2 mm, 5 mm, 10 mm, 20 mm, 30 mm, 40 mm, 50 mm, 60 mm, 70 mm, 80 mm, 90 mm, 100 mm, 150 mm, 200 mm, 300 mm, 400 mm, 500 mm, 600 mm, 700 mm, 800 mm, 900 mm, 1000 mm, or more.

The fan of the mist generator system (e.g., ultrasonic mist generator system) may have a diameter of at least about 1 millimeter (mm), 2 mm, 5 mm, 10 mm, 20 mm, 30 mm, 40 mm, 50 mm, 60 mm, 70 mm, 80 mm, 90 mm, 100 mm, 150 mm, 200 mm, 300 mm, 400 mm, 500 mm, 600 mm, 700 mm, 800 mm, 900 mm, 1000 mm, or more.

The air flow speed within the fan of a mist generator system (e.g., ultrasonic mist generator system) may be varied. The air flow speed may be at least about 0.01 meters cubed per second ($m^3$/s), 0.1 $m^3$/s, 1 $m^3$/s, 2 $m^3$/s, 3 $m^3$/s, 4 $m^3$/s, 5 $m^3$/s, 6 $m^3$/s, 7 $m^3$/s, 8 $m^3$/s, 9 $m^3$/s, 10 $m^3$/s, 15 $m^3$/s, 20 $m^3$/s, 30 $m^3$/s, 40 $m^3$/s, 50 $m^3$/s, 60 $m^3$/s, 70 $m^3$/s, 80 $m^3$/s, 90 $m^3$/s, 100 $m^3$/s, or more.

The amount of power needed to power a mist generator system (e.g., ultrasonic mist generator system) may be at least about 1 watt (W), 2 W, 3 W, 4 W, 5 W, 10 W, 25 W, 50 W, 75 W, 100 W, 200 W, 300 W, 400 W, 500 W, 600 W, 700 W, 800 W, 900 W, 1 kilowatt (kW), 2 kW, 3 kW, 4 kW, 5 kW, 6 kW, 7 kW, 8 kW, 9 kW, 10 kW, 20 kW, 30 kW, 40 kW, 50 kW, 60 kW, 70 kW, 80 kW, 90 kW, 100 kW, or more. A transducer may be used to convert energy from one form to another within the mist generator system.

Figure 11:
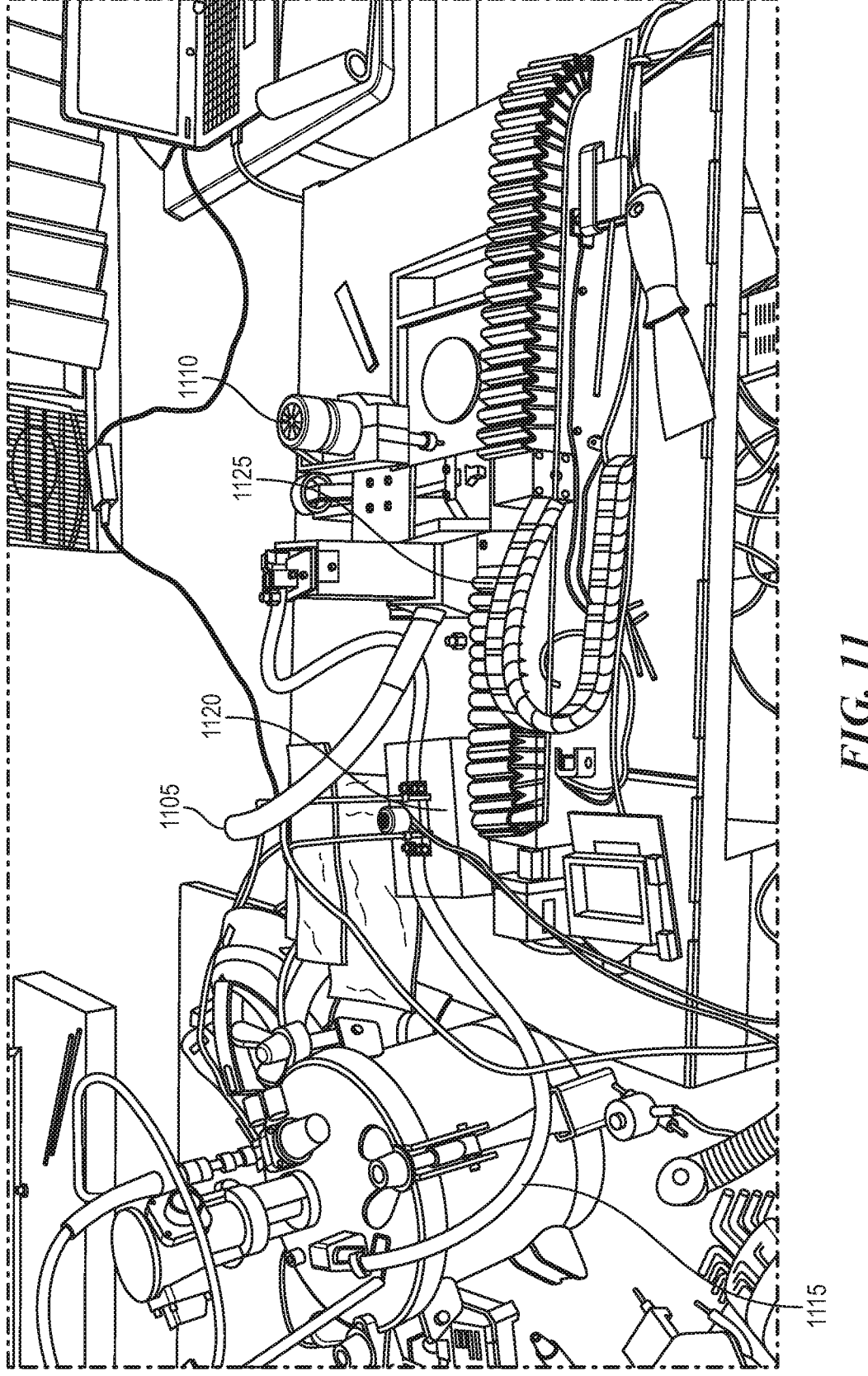
FIG. 11 illustrates a cutting system that may be used to remove excess material during the formation of a three-dimensional object.

FIG. 11 illustrates a cutting system or system set-up that may be used for the formation of a three-dimensional object and also for the removal of excess material during the formation of a three-dimensional object. A pressure pot 1115 is connected to the control valve 1120 that controls the pressure of the system. The control valve 1120 is connected to the masked spray system 1125 that sprays the powder bed or powder material with a binder. The plume vacuum line 1105 removes any excess binder that is not utilized in the spraying process. A CNC spindle 1110 is used to remove any excess material during the cutting and formation of the layers or material or the three-dimensional object.

In some cases, after a certain number of layers of powder material have been applied and cured, the container or box comprising the powder bed may be placed in a heated environment, such as an oven or furnace, to cure. The container or box may be heated to a temperature of at least about 25° C., 30° C., 40° C., 50° C., 60° C., 70° C., 80° C., 90° C., 100° C., 110° C., 120° C., 130° C., 140° C., 150° C., 160° C., 170° C., 180° C., 190° C., 200° C., 300° C., 400° C., 500° C., 600° C., 700° C., 800° C., 900° C., 1000° C., or more.

The container or box may be heated for a time period of at least about 1 minute, 2 minutes, 3 minutes, 4 minutes, 5 minutes, 6 minutes, 7 minutes, 8 minutes, 9 minutes, 10 minutes 30 minutes, 1 hour, 2 hours, 5 hours, 10 hours, 20 hours, 30 hours, 40 hours, 50 hours, 100 hours, or more.

Different heating elements may be used when manufacturing an object. A quartz tube heating element may be used. In some cases, at least 1, 3, 4, 5, 6, 7, 8, 9, 10, or more quartz tube heating elements are used during the formation of an object. A greater number of heating elements may speed up the curing process. The quartz tube heating element may have power of at least about 100 watt (W), 200 W, 300 W, 400 W, 500 W, 600 W, 700 W, 800 W, 900 W, 1000 W, 1500 W, 1800 W, 2000 W, 3000 W, 4000 W, 5000 W, or more.

The amount moisture in the container or box may decrease after curing. The amount of water in the container or box may be less than about 100,000 ppm, 10,000 ppm, 1000 ppm, 500 ppm, 400 ppm. 200 ppm. 100 ppm, 50 ppm, 10 ppm, 5 ppm, or 1 ppm.

After each cross-section of the three-dimensional object has been layered and cured, the entire three-dimensional object may be cured a second time. The object may be placed in a second container or box, and the container or box may be filled with larger or ceramic grits, such as aluminum oxide grit. The large ceramic grits may have a mesh size of at least about 4, 6, 8, 12, 16, 20, 30, 40, 50, 60, 70, 80, 100, 140, 200, 230, 270, 325, 400, 625, 1250, or 2500.

Metal powder may be added to the second container or box for infusion of the metal powder into the three-dimensional object.

The second container or box may be heated to a temperature of at least 25° C., 30° C., 40° C., 50° C., 60° C., 70° C., 80° C., 90° C., 100° C., 110° C., 120° C., 130° C., 140° C., 150° C., 160° C., 170° C., 180° C., 190° C., 200° C., 300° C., 400° C., 500° C., 600° C., 700° C., 800° C., 900° C., 1000° C., or more for a period of time of at least about 1 minute, 2 minutes, 3 minutes, 4 minutes, 5 minutes, 6 minutes, 7 minutes, 8 minutes, 9 minutes, 10 minutes 30 minutes, 1 hour, 2 hours, 5 hours, 10 hours, 20 hours, 30 hours, 40 hours, 50 hours, 100 hours, or more.

The three-dimensional object may have a roughness average (Ra) of 0.025 micrometers, 0.05 micrometers, 0.1 micrometers, 0.2 micrometers, 0.4 micrometers, 0.8 micrometers, 1.6 micrometers, 3.2 micrometers, 6.3 micrometers, 12.5 micrometers, 25 micrometers, or 50 micrometers. The three-dimensional object may have a roughness (N) of N1, N2, N3, N4, N5, N6, N7, N8, N9, N10, N11, or N12 grade number. The three-dimensional object may have a density of at least about 1 gram/centimeter cubed ($g/cm^3$), 2 $g/cm^3$, 3 $g/cm^3$, 4 $g/cm^3$, 5 $g/cm^3$, 6 $g/cm^3$, 7 $g/cm^3$, 8 $g/cm^3$, 9 $g/cm^3$, 10 $g/cm^3$, 15 $g/cm^3$, 20 $g/cm^3$, or more. The three-dimensional object may have a density of at least about 7 $g/cm^3$.

In some cases, the methods described herein nay be fully automated processes. In some cases, the methods described herein may not be fully automated processes and may require a worker.

The methods, apparatuses, and systems of the present disclosure may be used to form three-dimensional objects that may be used for various uses and applications. In some cases, uses and applications include, but are not limited to, machines, parts of machines, car parts, implants, hard tissue, soft tissue, fashion items, clothing, jewelry, home decorations, electronics, or electrical components.

A computer may be used to regulate and control various aspects of the methods of the present disclosure, such as, for example, methods of producing the three-dimensional object, including, but not limited to, the movement of the powder bed, movement of a powder material applicator, movement of a binding material applicator, a cutting unit, a heating unit, and a laser unit.

A computer may include machine instructions to generate tool path based on computer numerical control. The computer may convert a design produced by computer aided design (CAD) software into numbers. These numbers may control the movement of a printer with respect to spraying, cutting, heating, and all other electromechanical functions.

A three-dimensional printer may be set in a simulation mode. A software used to control the three-dimensional printer may be set in simulation mode. Simulation mode may not form a physical three-dimensional object. Simulation mode may estimate the amount of time necessary to form a single layer of a three-dimensional object, multiple layers of a three-dimensional object, or the entire three-dimensional object.

A print head tool path may be generated. A print head tool path may be generated to estimate the amount of time needed to form a layer or multiple layers of a three-dimensional object. The print head tool path may be adjusted to observe the affect the amount of print time needed to form a layer or multiple layers of a three-dimensional object. The print head tool path may be adjusted to change the amount of time needed to form a three-dimensional object.

A print head tool path may be optimized for a layer or multiple layers of powder material. The print head tool path may be optimized to generate the three-dimensional object in a shorter amount of time, or so that the three-dimensional object is substantially similar to the model design.

The computer may include machine instructions to perform geometric compensations based on statistical scaling. The computer may scale the original design produced by CAD software to compensate for sintering shrinkage. The computer may use a machine learning algorithm, such as a genetic learning algorithm. This may involve several trials to determine the proper compensations.

In tool path generation, an input may be a STereoLithography (STL) file, which is a standard file for 3D printing. In some cases, the file may comprise data of triangular mesh. Output of the tool path generation may be file in a GCode format, which is a control language for CNC machines. The GCode may be a way to tell the machine to move to various points at a desired speed, control the spindle speed and turn on and off various printer functions (spray, heat, etc). Examples of parameters for tool path generation include, but not limited to, tools size (e.g., diameter of the cutting bit), X scale factor (e.g., part scaling in the X-direction), Y scale factor (e.g., part scaling in the Y-direction), Z scale factor (e.g., part scaling in the Z-direction), layer thickness, penetration depth (e.g., the distance that the sprayed binder will penetrate in the Z-direction), parting line spacing (e.g., parting line spacing describes the horizontal and vertical grid spacing for the parting lines), hatch spacing (e.g., describes the tool path offset when hatching a layer), hatch cut speed (e.g., the XY speed at which the spindle moves while making the hatched cuts within a layer), boundary cut speed (e.g., the XY speed at which the spindle moves while making the boundary cut), move speed (e.g., the speed at which the spindle moves when it is not cutting), number of cuts per layer (e.g., the number of passes the cutting tool makes in order to cut through the entire "penetration depth;" for example, 3 cutting depths of 150 um may comprise the entire 450 um), depth of each cut (e.g., the depth of each cut made, in consideration of the "number of cuts per layer"), resolution of GCode (e.g., the distance between points in for a given layer in the GCode), and the first layer thickness.

Formation of a three-dimensional object may involve multiple parameters. The parameters may be related to tool path generation, building materials, layer thickness, size and shape of the three-dimensional object, or the method of forming the three-dimensional object. Each parameter may be controlled individually. A parameter may be controlled by a computer system, or may be programmed by a computer system. A parameter may undergo quality checks by a computer system or by manual observation or measurement.

A layer of powder material may be spread on the powder bed, and the layer thickness or spread powder quality may be measured. The layer of powder material may be measured by a feedback loop or images of each layer after spreading may be measured or observed. For example, a layer that does not meet the desired specification may be removed or spread with additional powder material before binder is applied. The image of a layer may be observed by an operator or by automatic image processing, such as, for example, a webcam or a single-lens reflex camera.

Certain parameters may be set or a system, such as via a user interface, for the formation of a three-dimensional object. Parameters that may be set include platform size (in the X, Y, and Z directions), scale factor (in the X, Y, and X scale), X center, Y center, Z bottom, tool size, layer thickness, penetration depth, parting line spacing, hatch spacing, fill loop minimum area, z no cut tolerance, bounding box offset, tool height offset, hatch cut speed, boundary cut speed, XY move speed, Z move speed, number of cuts per layer, depth of cut, resolution of GCode, first layer thickness, last layer thickness, tolerance z, hatch fill type, toolpath optimize type, inclusion of parting line across holes, inclusion of parting lines, inclusion of hatch vertical holes, cut top blocked regions, and hatch top blocked regions.

A system may comprise a start code and an end code. The start code and end code may be the same for all layers. A file, such as a text file, spreadsheet, or csv file, may comprise a list of different start and end codes for different layers. In some cases, every layer has a certain start code and end code. In some cases, every 5 layers has the same start code and end code. In some cases, every 10, 15, 20, 50, 100, 200, 300, 400, or 500 layers has the same start code and end code.

A printer may be connected to a central server, and the central serve may collect and generate an SPC chart (statistical process control chart) of data from individual printers. The server may also generate an SPC chart of individual pods, the factory, or several factories to ensure statistical process control over the entire system.

An algorithm may be used to operate the printer or system. A type-based algorithm may be used. Alternatively, a layer-based algorithm may be used. In some cases, partial slicing may be an option. A software program may be used during generation of a three-dimensional object, and various shortcuts may be used in the user-interface to provide ease of access to the user. A touch screen may be used to ease user or operator actuation.

Adaptive slicing may be used when generating a three-dimensional object. Adaptive slicing may be based on precise overhang or surface locations. Adaptive slicing may be based on the distance between the powder bed surface and overhangs so that the distance is within the desired range or tolerance. Layers may not be cut to support overhang features.

The user interface may feature macro buttons. The macro buttons may control functions such as clean bar, clean spindles, or return to the home page. Macro buttons may be used to ensure the user does not accidentally change parameters or halt the motion of the machine unintentionally or damage the system.

Some implementations may consider the penetration depth to be greater than the layer thickness. Subsequent layers may stick to each other. However, it may create a problem in that the over-penetration can ruin the previous layer. While in the XY plane, the technologies described herein may make a "fine pass" to define an edge precisely. In addition, if considering cutting the contour of the part for each layer, there may be no way to physically separate the part from the surroundings. The technologies described herein may employ a fundamentally new way to create tool paths through layer shifting. Step 1: The total cutting depth for a layer may equal the penetration depth, not the layer thickness. Step 2: The first layer height may be the height of the penetration depth. Step 3: The shape and size of the previous and next layers may be considered when cutting the current layer. The current cutting path may overlap the previous cutting path and the next cutting path. A cut may be created into the previous layer shape region, effectively shifting all the layers down by half a layer. Step 4: The final layer tool path may cover the entire area of the contour Some implementations may employ the following algorithm. A cut away area ($A_{CA}$) for a given current layer may be computed as: $A_{CA}=A_{BO}+A_{N-O}+A_{P-O}$, where ABU (Boundary Offset Area) describes the following boolean subtraction: $A_{BO}=A_{Off}-A_O$; $A_{Off}$ describes the area of the current layer with the included tool offset and $A_O$ describes the original current layer area; $A_{N-O}$ describes the following Boolean subtraction: $A_{N-C}=A_N-A_O$; $A_N$ describes the area of the next layer; $A_{P-O}$ describes the following Boolean subtraction: $A_{P-O}=A_P-A_O$; where $A_P$ describes the area of the previous layer. This algorithm may be implemented by way of machine-executable code executed by one or more computer processors.

Computer Control Systems

Figure 32:
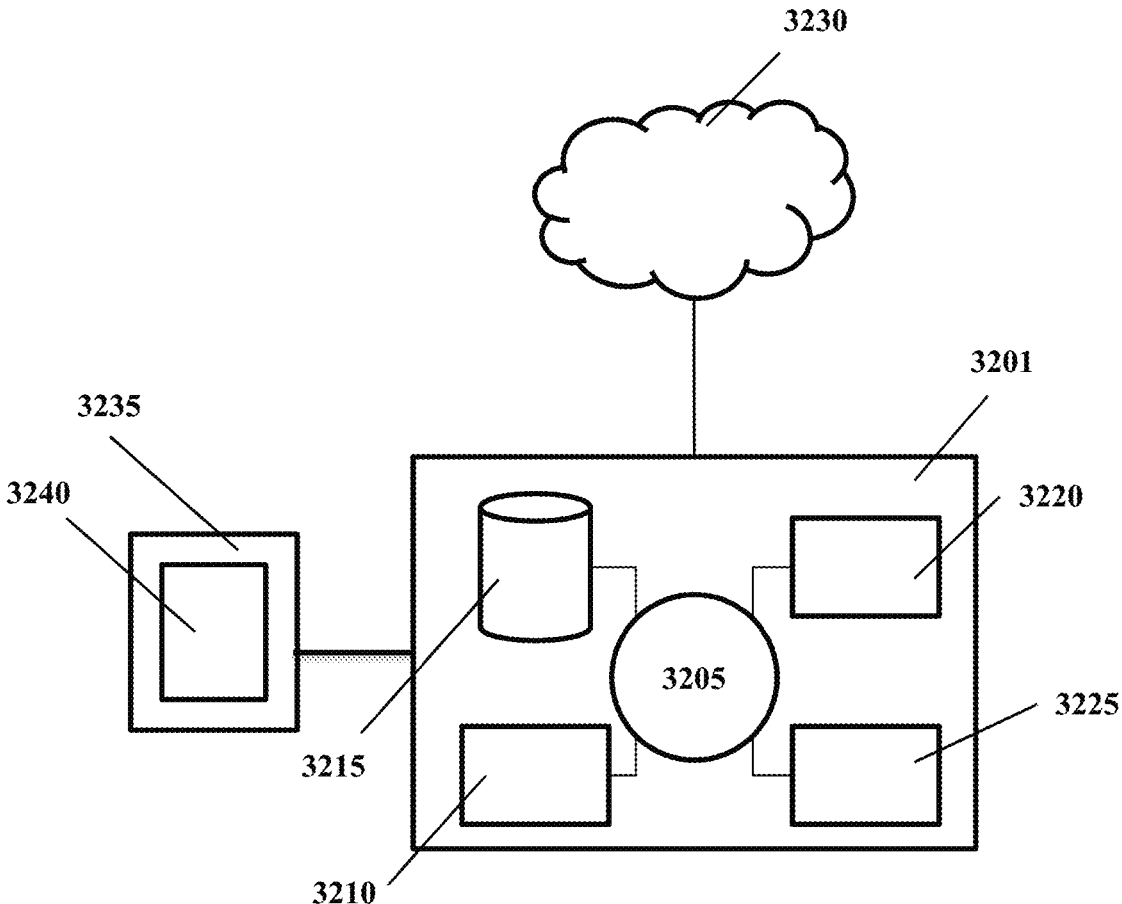
FIG. 32 shows a computer control system that is programmed or otherwise configured to implement methods provided herein.

The present disclosure provides computer control systems that are programmed to implement methods of the disclosure. FIG. 32 shows a computer control system 3201 that is programmed or otherwise configured to produce a three-dimensional object. The computer control system 3201 can regulate various aspects of the methods of the present disclosure, such as, for example, methods of producing the three-dimensional object, including, but not limited to, the movement of the powder bed, movement of a powder material applicator, movement of a binding substance applicator, a cutting tool, and a heating tool. The computer control system 3201 can be implemented on an electronic device of a user or a computer system that is remotely located with respect to the electronic device. The electronic device can be a mobile electronic device.

The computer system 3201 includes a central processing unit (CPU, also "processor" and "computer processor" herein) 3205, which can be a single core or multi core processor, or a plurality of processors for parallel processing. The computer control system 3201 also includes memory or memory location 3210 (e.g., random-access memory, read-only memory, flash memory), electronic storage unit 3215 (e.g., hard disk), communication interface 3220 (e.g., network adapter) for communicating with one or more other systems, and peripheral devices 3225, such as cache, other memory, data storage and/or electronic display adapters. The memory 3210, storage unit 3215, interface 3220 and peripheral devices 3225 are in communication with the CPU 3205 through a communication bus (solid lines), such as a motherboard. The storage unit 3215 can be a data storage unit (or data repository) for storing data. The computer control system 3201 can be operatively coupled to a computer network ("network") 3230 with the aid of the communication interface 3220. The network 3230 can be the Internet, an internet and/or extranet, or an intranet and/or extranet that is in communication with the Internet. The network 3230 in some cases is a telecommunication and/or data network. The network 3230 can include one or more computer servers, which can enable distributed computing, such as cloud computing. The network 3230, in some cases with the aid of the computer system 3201, can implement a peer-to-peer network, which may enable devices coupled to the computer system 3201 to behave as a client or a server.

The CPU 3205 can execute a sequence of machine-readable instructions, which can be embodied in a program or software. The instructions may be stored in a memory location, such as the memory 3210. The instructions can be directed to the CPU 3205, which can subsequently program or otherwise configure the CPU 3205 to implement methods of the present disclosure. Examples of operations performed by the CPU 3205 can include fetch, decode, execute, and writeback.

The CPU 3205 can be part of a circuit, such as an integrated circuit. One or more other components of the system 3201 can be included in the circuit. In some cases, the circuit is an application specific integrated circuit (ASIC).

The storage unit 3215 can store files, such as drivers, libraries and saved programs. The storage unit 3215 can store user data, e.g., user preferences and user programs. The computer system 3201 in some cases can include one or more additional data storage units that are external to the computer system 3201, such as located on a remote server that is in communication with the computer system 3201 through an intranet or the Internet.

The computer system 3201 can communicate with one or more remote computer systems through the network 3230. For instance, the computer system 3201 can communicate with a remote computer system of a user (e.g., a user controlling the manufacture of a three-dimensional object). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 3201 via the network 3230.

Methods as described herein can be implemented by way of machine (e.g., computer processor) executable code stored on an electronic storage location of the computer system 3201, such as, for example, on the memory 3210 or electronic storage unit 3215. The machine executable or machine readable code can be provided in the form of software. During use, the code can be executed by the processor 3205. In some cases, the code can be retrieved from the storage unit 3215 and stored on the memory 3210 for ready access by the processor 3205. In some situations, the electronic storage unit 3215 can be precluded, and machine-executable instructions are stored on memory 3210.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 3201, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 3201 can include or be in communication with an electronic display 3235 that comprises a user interface (UI) 3240 for providing, for example, parameters for producing the three-dimensional object. Examples of UI's include, without limitation, a graphical user interface (GUI) and web-based user interface.

EXAMPLES

Example 1

In a 1 meter (m) by 1 m by 1 m build box container at atmospheric temperature and pressure, a layer of stainless steel alloy powder material, spherical, 325 mesh, is deposited into a container, forming a powder bed. A stainless steel leveler is passed over the layer of powder material to ensure a level surface of powder material. After leveling, the uncured powder material has a layered thickness of 100 micrometers.

Purchased polyurethane is applied to a first area of the first layer of powder material via an ultrasonic nebulizer. A laser is then passed over the powder bed to heat and cure a first subsection of the first area. The subsection accounts for 50% of the first area. The subsection is in accordance with a corresponding cross-section of the model design of the three-dimensional object.

Another layer of powder material is then applied and leveled. A second layer of polyurethane is applied to a second area of the second layer of powder material. A laser is once again passed over the powder bed to cure a second subsection of the second area. The second subsection accounts for 50% of the second area. The second subsection is in accordance with a corresponding second cross-section of the model design of the three-dimensional object.

Layers of powder material are subsequently applied, leveled, and cured, until the number of layers is equivalent to the number of cross-sections of the model design.

The build box is placed in an oven or furnace under an argon atmosphere at a temperature of 600° C. for 60 minutes. After cooling, the unbounded powder material is then removed from the three-dimensional object via vacuum. The three-dimensional object is placed in another build box, filled with aluminum oxide grit, and placed in an oven or furnace at a temperature of 1200° C. for 60 minutes.

After cooling, the three-dimensional object is removed from the build box as a final product.

Example 2

In a 0.5 m by 0.5 m by 0.5 m build box container at atmospheric temperature and pressure, a layer of bronze powder material, spherical, 325 mesh, is deposited into a container, forming a powder bed. A stainless steel leveler is passed over the layer of powder material to ensure a level surface of powder material. After leveling, the uncured powder material has a layered thickness of 0.5 mm.

Purchased nail polish is applied to a first area of the first layer of powder material via an compressor based spray. A laser is then passed over the powder bed to heat and cure a first subsection of the first area. The subsection accounts for 80% of the first area. The subsection is in accordance with a corresponding cross-section of the model design of the three-dimensional object.

Another layer of powder material is then applied and leveled. A second layer of nail polish is applied to a second area of the second layer of powder material. A laser is once again passed over the powder bed to cure a second subsection of the second area. The second subsection accounts for 70% of the second area. The second subsection is in accordance with a corresponding second cross-section of the model design of the three-dimensional object.

Layers of powder material are subsequently applied, leveled, and cured, until the number of layers is equivalent to the number of cross-sections of the model design.

The build box is placed in an oven at a temperature of 500° C. for 60 minutes. After cooling, the unbounded powder material is then removed from the three-dimensional object via vacuum. The three-dimensional object is placed in another build box, filled with aluminum oxide grit, and bronze alloy, and placed in an oven at a temperature of 800° C. for 60 minutes.

After cooling, the three-dimensional object is removed from the build box and polished.

Example 3

Depending on the geometric features of the desired object, the cut speeds may be varied and optimized for speed and also for high resolution features.

Figures 24A, 24B, 24C:
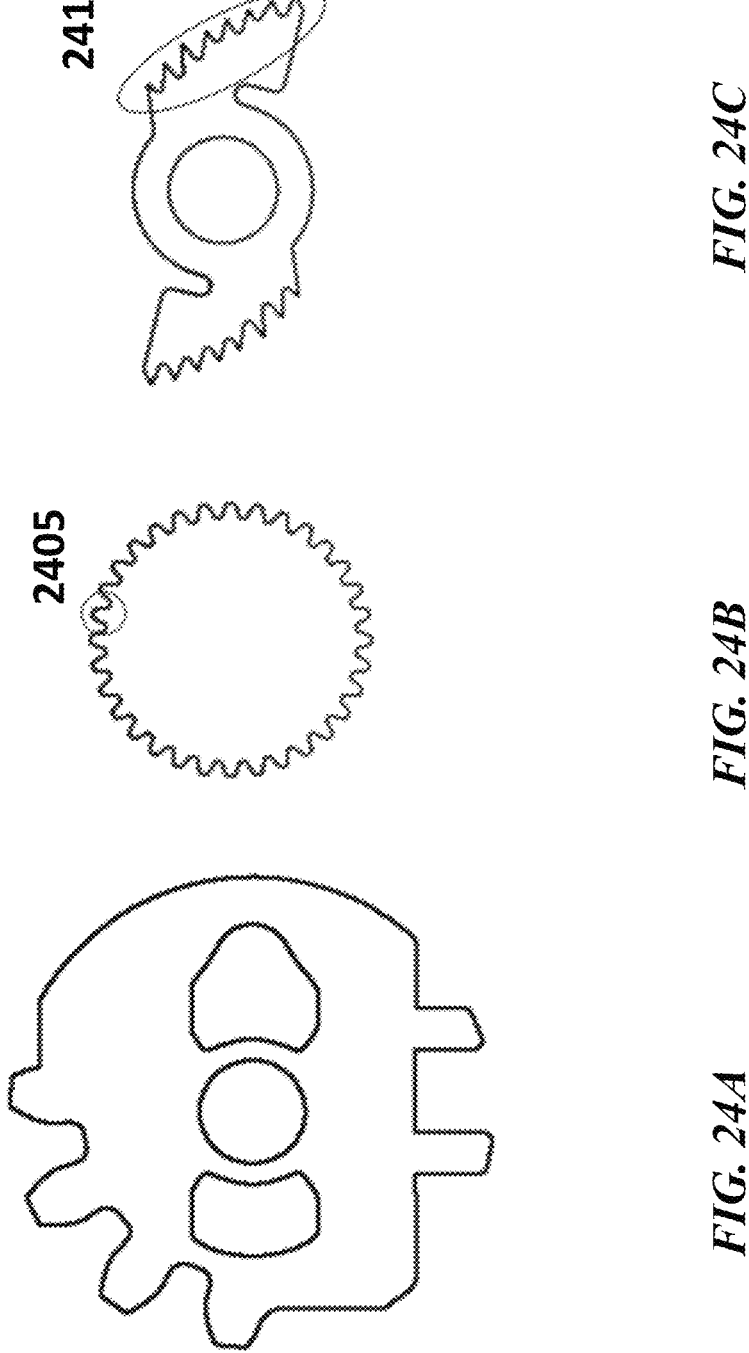
FIGS. 24A-24C illustrate three different desired printed parts.

FIGS. 24A-24C illustrate examples of three different parts.

The tool path for the part of FIG. 24A has standard sized features that are cut at relatively high linear cutting speeds. Cutting at high linear speeds allows parts to be completed quicker.

Given the smaller features of FIG. 24B, as shown within the outline 2405, the part is cut with a tool at relatively lower cutting speeds.

The part of FIG. 24C contains both standard sized features that are cut at a high cutting speed, and also smaller features, as shown within the outline 2410, that is cut with a tool at relatively lower cutting speeds.

Figure 25:
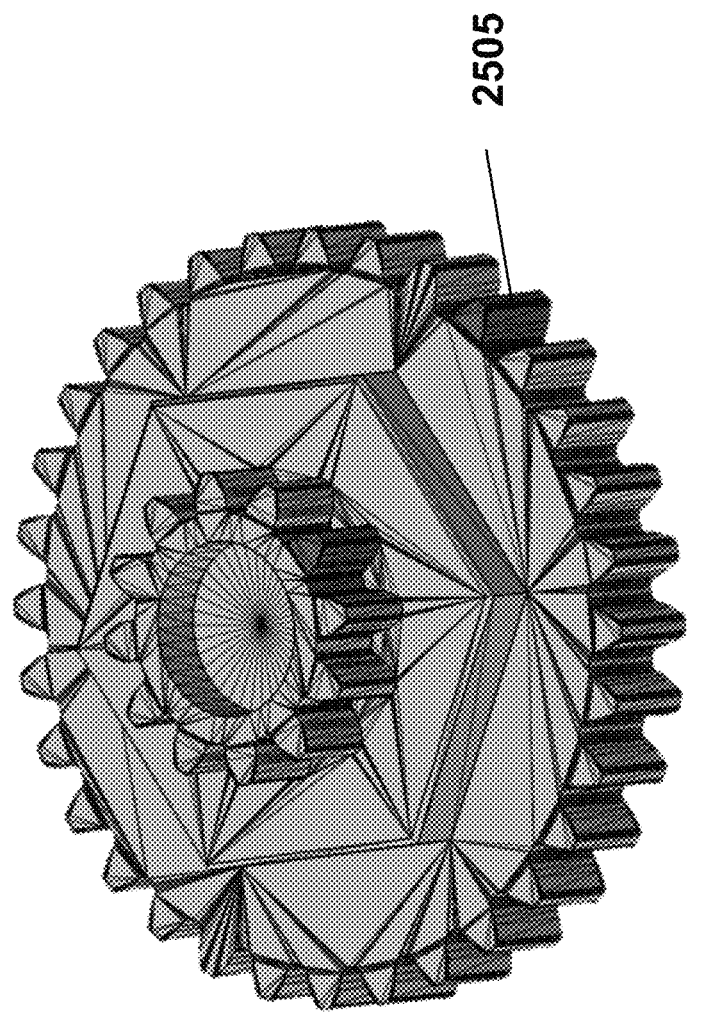
FIG. 25 illustrates a desired printed part that may be made with different cut speeds.

The part of FIG. 25 is made with a slow linear cut speed and a high rotational cut speed so that features such as 2505 are made precisely while minimizing production time.

Example 4

In a 0.5 m by 0.5 m by 0.5 m build box container at atmospheric temperature and pressure, a layer of powder material is deposited into a container, forming a powder bed.

Layers of powder material and binder are deposited onto the powder bed. The layers of powder material and binder are cut according to the model design.

Figure 13:
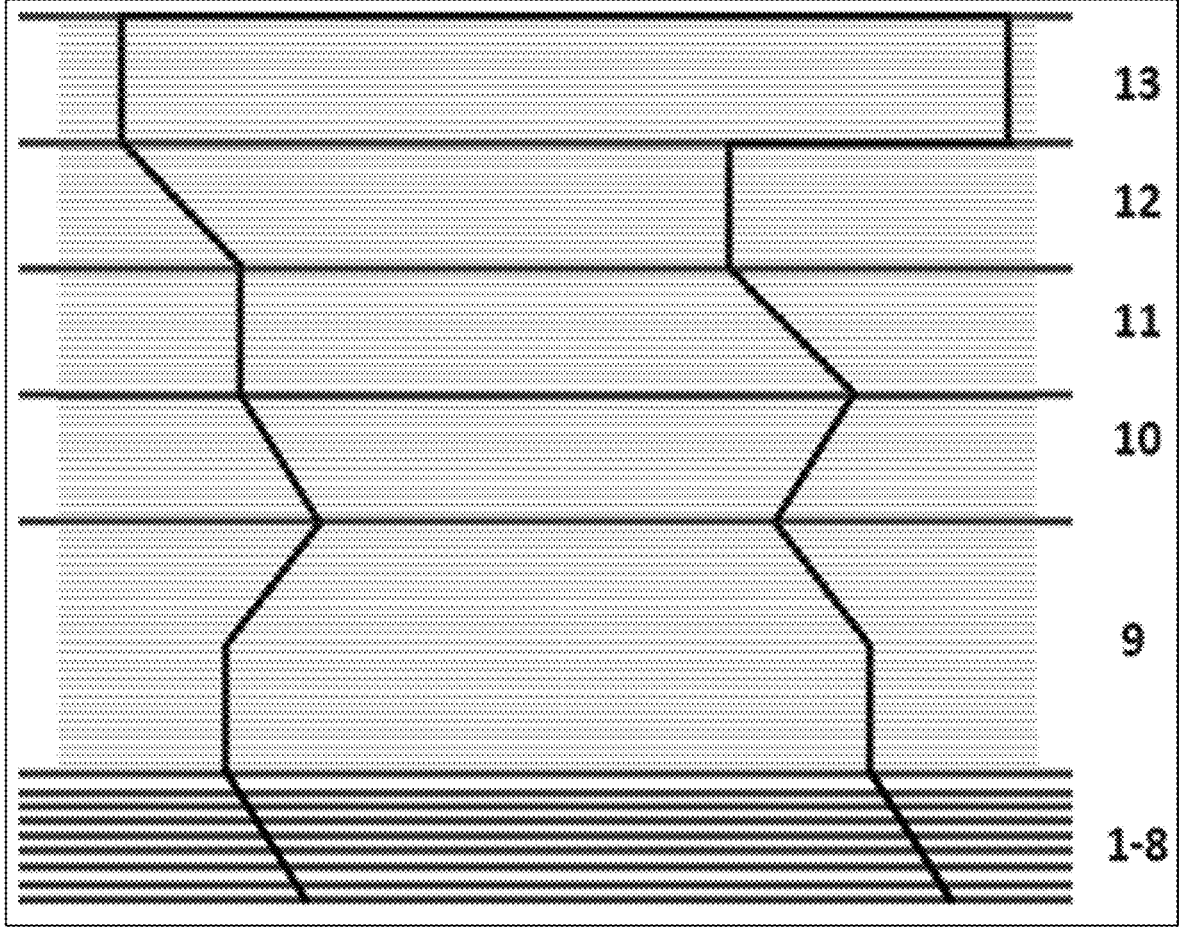
FIG. 13 illustrates an alternative cutting strategy to FIG. 12 that may be used to form the desired 3D object.

The desired 3D object is outlined in FIG. 13. Multiple slices form a layer, wherein the layers of the object are labeled numerically. The layers are cut by a single cutting pass, wherein Layers 1-8 have a layer thickness equivalent to the slice thickness. Layers 9-13 have a thickness that is larger than the slice thicknesses for that region. For Layers 9-13, a single cutting pass is made for each layer.

After the desired number of layers are made and cut, the three-dimensional object is removed from the build box and polished.

Example 5

Figure 31:
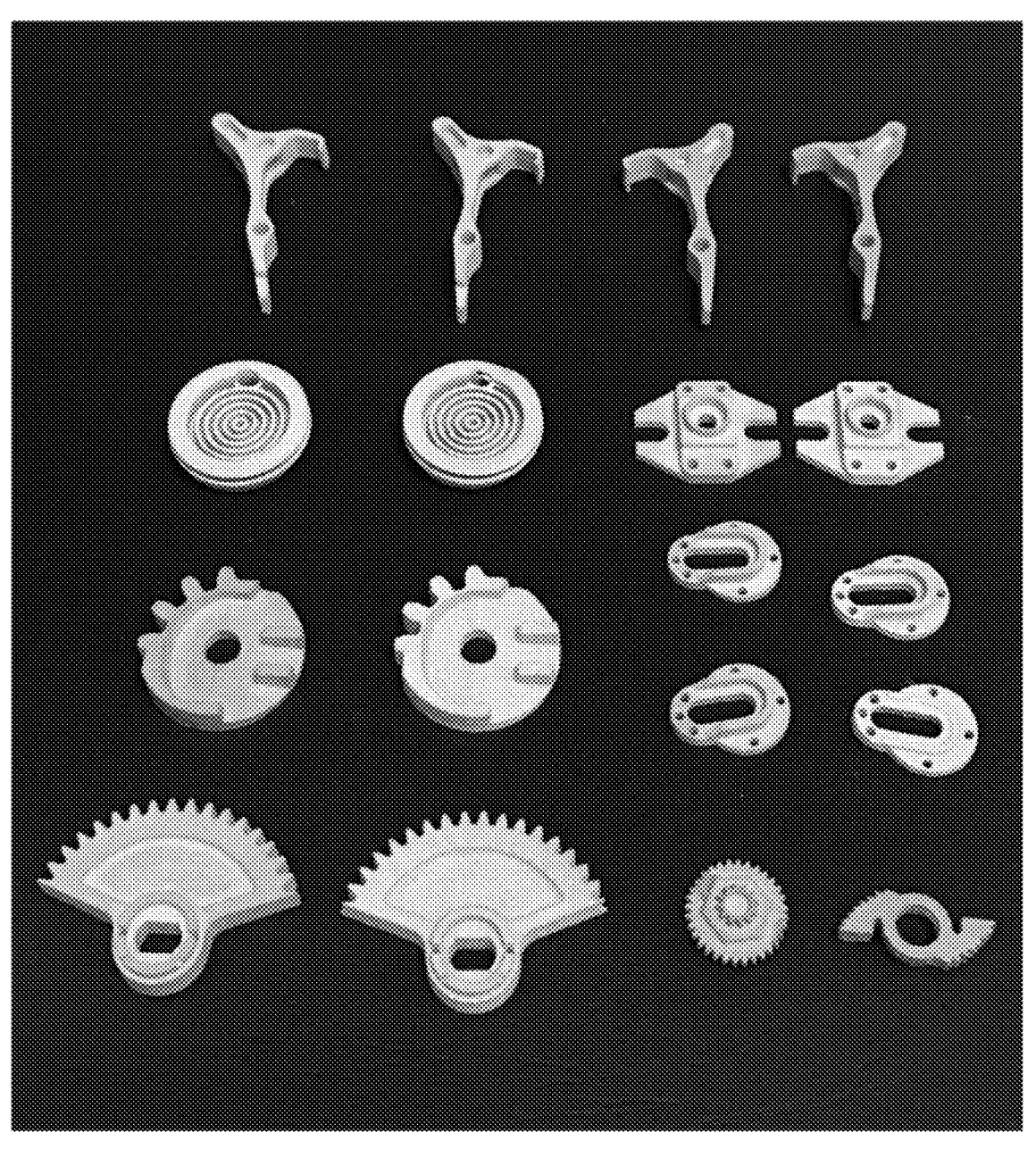
FIG. 31 illustrates multiple parts that may be formed with a method described herein.

FIG. 31 illustrates multiple parts that may be formed with methods and systems described herein. Such parts may be generated simultaneously in a single powder bed, or parts with similar shapes may be generated simultaneously in separate powder beds, for example using the multiple spindles of FIG. 33. The parts may be green parts, which may be further processed (e.g., by heating) to yield a final part.

Methods and systems of the present disclosure may be combined with or modified by other methods or systems, such as, for example, those described in U.S. Pat. No. 9,987,682, which is entirely incorporated herein by reference.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for simultaneously printing a plurality of three-dimensional objects, comprising:

an enclosure comprising a plurality of three-dimensional printing systems, wherein a printing system of said plurality of three-dimensional printing systems comprises:

a container configured to hold a powder bed comprising powder material;

a binder application unit comprising a spray head, wherein the binder application unit is configured to apply, layer by layer, a binding substance to the powder material in said powder bed; and at least one perimeter generator comprising a cutting tool, wherein the at least one perimeter generator is configured to generate one or more perimeters in the powder bed by removing, layer by layer, one or more portions of the powder material bound by the binding substance, wherein the container, the binder application unit, and the at least one perimeter generator are positioned to perform a method for simultaneously generating the plurality of three-dimensional objects located within an environment of the enclosure, the method including alternately:

applying, by the binder application unit, the binding substance to an area of a layer of the powder material in the powder bed to form an intermediate three-dimensional object held within the enclosure; and generating, by the at least one perimeter generator, at least one perimeter of one of the plurality of three-dimensional objects, which is supported by the container, by removing one or more portions of the area of the layer of the powder material in the intermediate three-dimensional object bound by the binding substance;

an environmental control unit operably coupled to the enclosure, wherein said environmental control unit comprises an air conditioner configured to regulate temperature of the environment in the enclosure; and one or more computer processors operatively coupled to the binder application unit and the at least one perimeter generator of each of the three-dimensional printing systems, the one or more computer processors being individually or collectively programmed to control each of the three-dimensional printing systems to perform the method.

2. The system of claim 1, wherein the binding substance is applied based on a model design of said one of the plurality of three-dimensional objects, and wherein said at least one perimeter is in accordance with said model design.

3. The system of claim 1, further comprising an energy source that is configured to provide an energy beam directed to at most a portion of said layer of the powder material.

4. The system of claim 3, wherein the method further comprises directing said energy source to provide said energy beam directed to at most a portion of said layer of the powder material.

5. The system of claim 3, wherein said energy source comprises at least one laser.

6. The system of claim 1, further comprising a feedback control unit for regulating a level of the binding substance in said binder application unit.

7. The system of claim 1, wherein said environmental control unit is configured to regulate humidity in said enclosure.

8. The system of claim 1, wherein said environmental control unit is configured to regulate an oxygen level in said enclosure.

9. The system of claim 1, wherein said environmental control unit further comprises a control panel configured to allow a user to control an environmental parameter of the environment within the enclosure.

10. The system of claim 1, further comprising a cleaning unit, wherein the cleaning unit comprises a cleaning tool configured to remove powder material from said plurality of three-dimensional objects subsequent to printing.

11. The system of claim 10, wherein said cleaning unit is external to the enclosure.

12. The system of claim 1, further comprising a powder dispenser configured to dispense said powder material.

13. The system of claim 1, further comprising a roller configured to remove excess powder material from said powder bed and/or adjust a top surface of said powder bed.

14. The system of claim 1, wherein said at least one perimeter generator is a multi-axis machine unit, a computer numeric control (CNC) spindle, a cutting tool bit, or a blade.

15. The system of claim 7, wherein said environmental control unit further comprises a dehumidifier configured to control said humidity in said enclosure.

16. The system of claim 1, further comprising a sensor configured to detect one or more of a humidity, temperature, or oxygen level in the enclosure.

17. A system for printing a plurality of three-dimensional objects, comprising:

a manufacturing apparatus including a powder dispenser configured to supply powder material to a powder bed, a binder application unit comprising a spray head and configured to apply a binding substance, and a plurality of cutting devices configured to generate one or more perimeters in the powder bed by removing, layer by layer, one or more portions of the powder material bound by the binding substance, wherein the powder dispenser, the binder application unit, and the plurality of cutting devices are positioned to perform a method for generating the plurality of three-dimensional objects located within an environment of an enclosure; and one or more computer processors operatively coupled to the manufacturing apparatus and configured to control the manufacturing apparatus to perform the method, wherein the one or more computer processors are individually or collectively programmed to:

(i) direct the binder application unit to apply the binding substance to a first area of a first layer of the powder material of the powder bed, (ii) direct a first set of cutting devices of the plurality of cutting devices to generate a plurality of perimeters in the first layer in the powder bed by removing, in accordance with a model design of each of the plurality of three-dimensional objects held within the enclosure, one or more portions of the first layer of the powder material bound by the binding substance, (iii) direct the powder dispenser to supply the powder material to deposit a second layer of the powder material, (iv) direct the binder application unit to apply the binding substance to a second area of the second layer of the powder material of the powder bed, and (v) direct a second set of cutting devices of the plurality of cutting devices to generate a plurality of perimeters in the second layer by removing, in accordance with the model design of each of the plurality of three-dimensional objects held within the enclosure, one or more portions of the second layer of the powder material bound by the binding substance, thereby simultaneously generating at least a portion of each of the plurality of three-dimensional objects within the enclosure.

18. The system of claim 1, wherein the area of the layer of the powder material is a first area of a first layer of the powder material, and the method further comprises:

applying the binding substance to a second area of a second layer of the powder material to form the intermediate three-dimensional object; and generating at least one perimeter of one of the plurality of three-dimensional objects comprises removing one or more portions of the first area of the first layer and one or more portions of the second area of the second layer of the powder material in the intermediate three-dimensional object bound by the binding substance.

19. The system of claim 1, wherein the spray head is an ultrasonic mist generator.

20. The system of claim 10, wherein the cleaning unit comprises a stage configured to vibrate to aid in removal of the powder material.

* * * * *